(12) United States Patent
Ichikawa et al.

(10) Patent No.: US 12,061,734 B2
(45) Date of Patent: Aug. 13, 2024

(54) INFORMATION PROCESSING APPARATUS AND INFORMATION PROCESSING METHOD

(71) Applicant: SONY GROUP CORPORATION, Tokyo (JP)

(72) Inventors: Miwa Ichikawa, Tokyo (JP); Jun Kimura, Tokyo (JP); Ai Nakada, Tokyo (JP); Soichiro Inatani, Tokyo (JP); Takuro Noda, Tokyo (JP); Kunihito Sawai, Tokyo (JP); Shingo Utsuki, Tokyo (JP); Kenji Sugihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 136 days.

(21) Appl. No.: 17/596,520

(22) PCT Filed: Jun. 3, 2020

(86) PCT No.: PCT/JP2020/022021
§ 371 (c)(1),
(2) Date: Dec. 13, 2021

(87) PCT Pub. No.: WO2020/255723
PCT Pub. Date: Dec. 24, 2020

(65) Prior Publication Data
US 2022/0236788 A1    Jul. 28, 2022

(30) Foreign Application Priority Data
Jun. 19, 2019   (JP) .................................. 2019-113717

(51) Int. Cl.
*G06F 3/01*    (2006.01)
*G06F 3/0346*  (2013.01)
(Continued)

(52) U.S. Cl.
CPC ............ *G06F 3/011* (2013.01); *G06F 3/0346* (2013.01); *G06F 3/04815* (2013.01); *G06F 3/04817* (2013.01); *G06T 19/006* (2013.01)

(58) Field of Classification Search
CPC ........ G06F 3/011; G06F 3/013; G06F 3/0346; G06F 3/04812; G06F 3/04815;
(Continued)

(56) References Cited

U.S. PATENT DOCUMENTS

2003/0132913 A1* 7/2003 Issinski .................. G06F 3/017
                                                    345/158
2013/0257720 A1    10/2013 Noda et al.
(Continued)

FOREIGN PATENT DOCUMENTS

CN    103365411 A    10/2013
CN    108604122 A    9/2018
(Continued)

OTHER PUBLICATIONS

International Search Report and Written Opinion of PCT Application No. PCT/JP2020/022021, issued on Jul. 21, 2020, 08 pages of ISRWO.

*Primary Examiner* — Nelson M Rosario
(74) *Attorney, Agent, or Firm* — CHIP LAW GROUP

(57) ABSTRACT

An information processing apparatus according to the present disclosure includes a display control unit that causes a display device to display a mark for a virtual object at an instruction position that is a position determined on the basis of a plurality of directions indicated by a user.

16 Claims, 29 Drawing Sheets

(51) Int. Cl.
    *G06F 3/04815*     (2022.01)
    *G06F 3/04817*     (2022.01)
    *G06T 19/00*     (2011.01)

(58) Field of Classification Search
    CPC ............. G06F 3/04817; G06F 3/04842; G06F 2203/0381; G06F 2203/0382; G06F 18/2411; G06F 3/017; G06T 19/006; G06V 40/113; G06V 40/28
    See application file for complete search history.

(56) References Cited

U.S. PATENT DOCUMENTS

| | | | | |
|---|---|---|---|---|
| 2015/0262004 | A1* | 9/2015 | Noda | .................. G06V 40/113 |
| | | | | 382/103 |
| 2017/0329515 | A1 | 11/2017 | Clement et al. | |
| 2018/0032230 | A1 | 2/2018 | Inomata et al. | |
| 2018/0341386 | A1 | 11/2018 | Inomata | |
| 2022/0225830 | A1* | 7/2022 | Verbrugge | ............ A47J 43/044 |

FOREIGN PATENT DOCUMENTS

| | | |
|---|---|---|
| EP | 3455697 A1 | 3/2019 |
| JP | 2012-252627 A | 12/2012 |
| JP | 2013-205983 A | 10/2013 |
| JP | 2018-018326 A | 2/2018 |
| JP | 2018-147375 A | 9/2018 |
| WO | 2017/196404 A1 | 11/2017 |
| WO | 2017/196928 A1 | 11/2017 |
| WO | 2017/213070 A1 | 12/2017 |
| WO | 2018/020735 A1 | 2/2018 |

\* cited by examiner

FIG.8

| INTER-SECTION DISPLAY MODE | INTER-SECTION (INSTRUC-TION POSITION) | MARK | TARGET INFORMATION | | | MASTER-SUBORDINATE INFORMATION | | |
|---|---|---|---|---|---|---|---|---|
| | | | DISTANCE | TARGET #1 | TARGET #2 | ... | MASTER-SUBORDI-NATE RELATION-SHIP | MAIN INSTRUC-TION COMPO-NENT | SUBORDI-NATE INSTRUC-TION COMPO-NENT |
| ON | IS1 | MK1 | D | PT1 (LN1) | PT2 (LN2) | ... | NO | - | - |
| | | | | | | ... | ... | ... | ... |

124

(INTERSECTION DISPLAY MODE ON)

(INTERSECTION DISPLAY MODE OFF)

(INTERSECTION DISPLAY MODE OFF)

(CASE WHERE THERE IS NO MASTER-SUBORDINATE RELATIONSHIP)

(CASE WHERE THERE IS MASTER-SUBORDINATE RELATIONSHIP)

(CASE WHERE THERE IS MASTER-SUBORDINATE RELATIONSHIP)

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/022021 filed on Jun. 3, 2020, which claims priority benefit of Japanese Patent Application No. JP 2019-113717 filed in the Japan Patent Office on Jun. 19, 2019. Each of the above-referenced applications is hereby incorporated herein by reference in its entirety.

FIELD

The present disclosure relates to an information processing apparatus, an information processing method, and an information processing program.

BACKGROUND

There has been provided a technology for pointing a target such as a position or a virtual object by a device such as a three-D (dimension) mouse or a controller or a user's body such as user's fingertip or eye (line of sight). For example, in a field of augmented reality (AR) or virtual reality (VR), an instruction on a virtual object in a three-dimensional space or a position where the virtual object is desired to be arranged is given by the device or the user's body.

CITATION LIST

Patent Literature

Patent Literature 1: WO 2017/213070 A

SUMMARY

Technical Problem

According to the related art as described above, by displaying a stereoscopic object that is arranged along a predetermined direction within a user's field of view and indicates a distance in the predetermined direction, pointing or an object operation is performed by user's line of sight. In the related art, in order to indicate a position to be pointed, a predetermined direction is determined in advance, and a position is further determined on the predetermined direction. In this manner, the related art is a case where the position is adjusted in a predetermined linear shape, and it is difficult to cope with a case where it is desired to adjust the position on a circumference of a round table.

As described above, in a case where a stereoscopic object is displayed, there are many restrictions on an instruction of a target such as a position or a virtual object by the user, and it is difficult to perform an instruction by the user or display according to the instruction. Therefore, it is desired to enable flexible display according to a user's instruction.

Therefore, the present disclosure proposes an information processing apparatus, an information processing method, and an information processing program capable of enabling flexible display according to a user's instruction.

Solution to Problem

According to the present disclosure, an information processing apparatus includes a display control unit that causes a display device to display a mark for a virtual object at an instruction position that is a position determined based on a plurality of directions indicated by a user.

BRIEF DESCRIPTION OF DRAWINGS

FIG. 8 is a diagram illustrating an example of an intersection displaying information storage unit according to the embodiment of the present disclosure.

DESCRIPTION OF EMBODIMENTS

Figure 1:
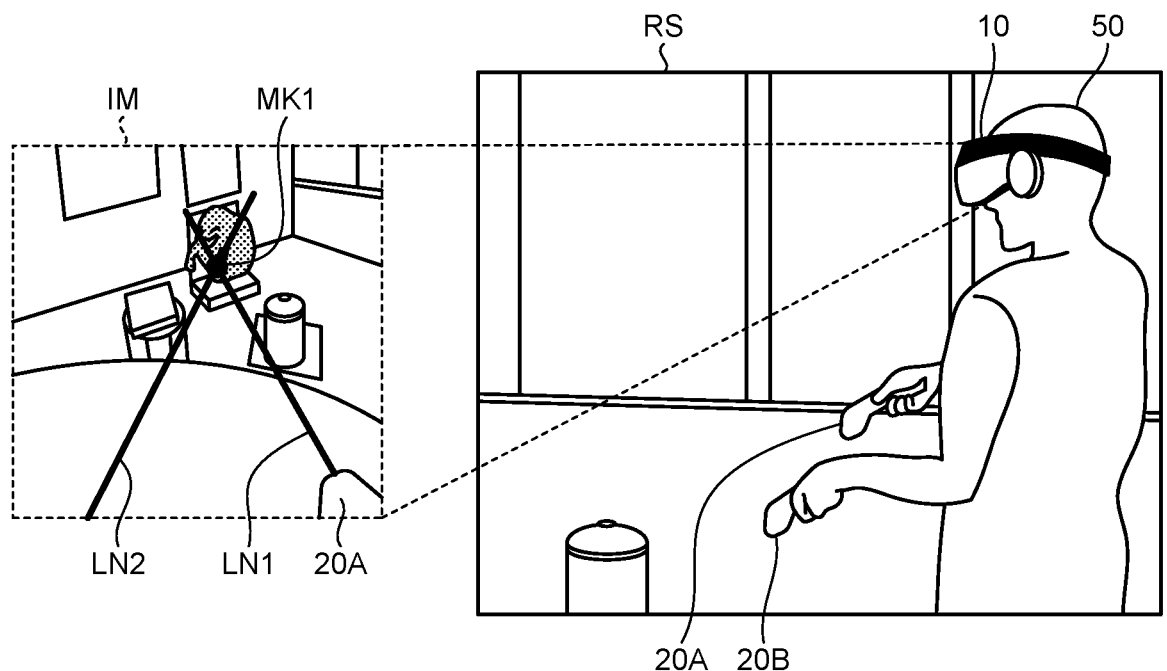
FIG. 1 is a diagram illustrating an example of information processing according to an embodiment of the present disclosure.

Hereinafter, embodiments of the present disclosure will be described in detail with reference to the drawings. Note that an information processing apparatus, an information processing method, and an information processing program according to the present application are not limited by the embodiments. In each of the following embodiments, the same parts are denoted by the same reference numerals, and redundant description will be omitted.

The present disclosure will be described according to the following order of items shown below.

1. Embodiments
1-1. Overview of information processing according to an embodiment of the present disclosure
1-2. Configuration of an information processing system according to an embodiment
1-3. Configuration of an information processing apparatus according to an embodiment
1-4. Procedure of information processing according to an embodiment
1-5. Intersection display
1-5-1. Procedure related to intersection display
1-5-2. Intersection display mode
1-5-3. Intersection display pattern
1-6. Master-subordinate relationship
1-6-1. Controller and line of sight
1-6-2. Finger pointing and line of sight
1-6-3. Intersection display example
1-7. Virtual object
1-7-1. Arrangement of a virtual object
1-7-2. Arrangement range of a virtual object
1-7-3. Arrangement position with an intersection
1-7-4. Movement of a virtual object
1-7-5. Procedure of moving a virtual object
1-7-6. Controller and line of sight
1-8. Line representation
1-9. Others
1-10. Other geometric targets (planes)
2. Other configuration examples
3. Effects according to the present disclosure
4. Hardware configuration 1. Embodiment

[1-1. Overview of Information Processing According to an Embodiment of the Present Disclosure]

FIG. 1 is a diagram illustrating an example of information processing according to an embodiment of the present disclosure. The information processing according to the embodiment of the present disclosure is realized by an information processing apparatus 100 illustrated in FIG. 1. The information processing apparatus 100 of an information processing system 1 is an information processing apparatus that executes information processing according to the embodiment.

The information processing system 1 (see FIG. 3) includes a display device 10, an information processing apparatus 100 (see FIG. 3) that controls display on the display device 10, a first controller 20A, and a second controller 20B. FIG. 1 illustrates a case where the display device 10 is a head mounted display (HMD). In FIG. 1, as illustrated in a real space RS, the display device 10 that is a head mounted display is worn on the head of a user 50, and an image according to display control is displayed by the information processing apparatus 100 on a display (for example, a display unit 15 (see FIG. 3)) of the display device 10 located in front of the eyes of the user 50.

Note that the display device 10 may be any head mounted display such as a non-transmissive HMD or a transmissive HMD as long as processing to be described later can be realized. Furthermore, the display device 10 is not limited to a head mounted display, and may be any device as long as information processing to be described later can be realized, and may be various devices such as an aerial projection display. Details of the configuration of the display device 10 will be described later.

In addition, FIG. 1 illustrates a case where the user 50 holds the first controller 20A in the right hand and holds the second controller 20B in the left hand. Hereinafter, when the first controller 20A and the second controller 20B are not distinguished, they may be referred to as a controller 20. The controller 20 is a device used by a user to indicate a direction. The user points in a desired direction by arranging the hand holding the controller 20 at a desired position or in a desired direction. For example, the controller 20 is used to indicate a position of a space such as augmented reality (AR), virtual reality (VR), mixed reality (MR), or the like displayed by the display device 10, or to indicate an object (also referred to as a "virtual object") in the space.

FIG. 1 illustrates a case where a line is used as an element (target) for causing the user to visually recognize the direction indicated by the user. For example, a line along the direction indicated by the user causes the user to visually recognize the direction indicated by the user. In FIG. 1, a line extending in a direction on which an instruction is given by the user with the controller 20 is displayed on the display device 10, so that the user visually recognizes the direction on which the instruction is given by the user with the controller 20. FIG. 1 illustrates a case where a line emitted from the controller 20 is a virtual beam displayed by the display device 10. For example, the display device 10 displays a line emitted from the controller 20 along an axis passing through a predetermined position of the controller 20 (for example, an origin 21A or an origin 21B in FIG. 28).

In addition, the line emitted from the controller 20 is not limited to the virtual beam displayed by the display device 10, and may be a beam (laser light) actually radiated by the controller 20. When the controller 20 actually emits laser light (a line), the controller 20 emits the laser light along a predetermined optical axis. Furthermore, an element for causing the user to visually recognize the direction indicated by the user is not limited to a line, and may be a plane or the like. Hereinafter, a line, a plane, or the like used for causing the user to visually recognize the direction indicated by the user may be collectively referred to as a geometric target. In addition, the direction instruction by the user is not limited to the device such as the controller 20, and may be the user's body or the like, but the details of this point will be described above. Hereinafter, the device, the body of the user, and the like used by the user to indicate the direction may be collectively referred to as an instruction component. The instruction component may be any as long as it is used by the user to indicate a direction.

An image IM in FIG. 1 is an image displayed in front of the eyes of the user 50 by the display of the display device 10 worn by the user 50. In the image IM in FIG. 1, a line LN1 corresponding to the direction indicated by the first controller 20A and a line LN2 corresponding to the direction indicated by the second controller 20B are displayed.

The user 50 changes a desired position and direction of a hand holding the controller 20 while confirming the position and direction of the line LN1 and the position and direction of the line LN2, thereby designating a position determined on the basis of the line LN1 and the line LN2 (hereinafter, also referred to as an "instruction position"). In the example of FIG. 1, the user 50 adjusts the direction and position of the controller 20 so that the vicinity of the central portion of the image IM1 (the vicinity of the central portion in front of the user's eyes) becomes the instruction position. Hereinafter, adjusting the direction and position of the controller 20 may be simply referred to as "adjustment of the controller 20".

Figure 2:
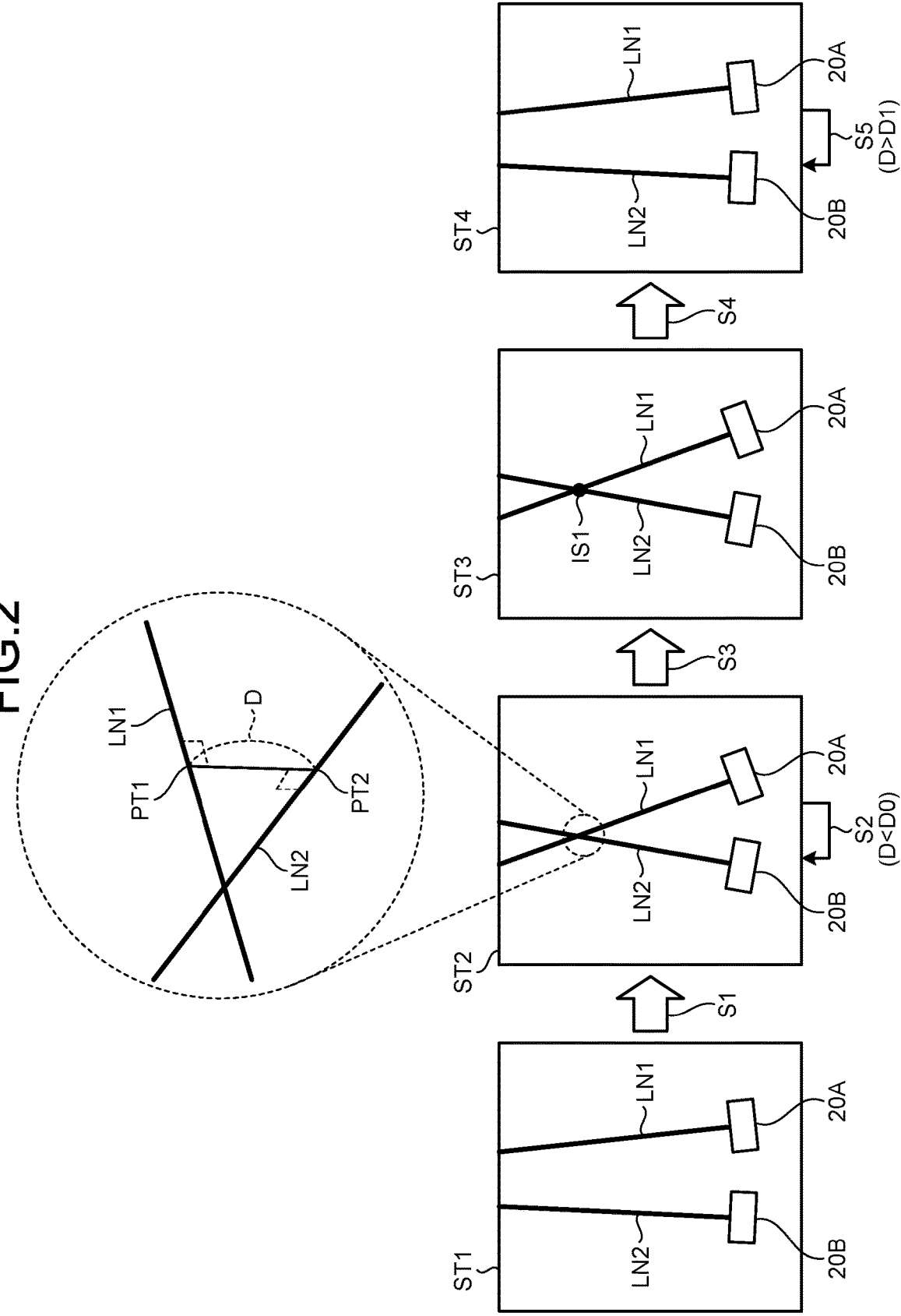
FIG. 2 is a diagram for explaining an example of information processing according to the embodiment of the present disclosure.

In the example of FIG. 1, the information processing apparatus 100 causes the display device 10 to display a mark for the virtual object with MK1 at the instruction position determined by the user 50 on the basis of the two directions indicated by the controller 20. Here, the information processing apparatus 100 determines whether to display the mark MK1 on the basis of a positional relationship between the two lines LN1 and LN2. This point will be described with reference to FIG. 2. FIG. 2 is a diagram for explaining an example of information processing according to the embodiment of the present disclosure. Each of states ST1 to ST4 illustrated in FIG. 2 indicates a change in the line LN1 or LN2 corresponding to a change in direction based on the adjustment of the controller 20 by the user 50. For example, the state ST3 illustrated in FIG. 2 indicates a state corresponding to the image IM1 on which the mark MK1 is displayed.

The information processing apparatus 100 acquires information (hereinafter also referred to as "controller information") indicating the position and direction of the controller 20 according to the operation of the user 50, and causes the display device 10 to display the lines LN1 and LN2 on the basis of the acquired controller information. Furthermore, the information processing apparatus 100 determines whether to display the mark for the virtual object on the basis of the positional relationship between the two lines LN1 and LN2. The information processing apparatus 100 calculates a distance between the two lines LN1 and LN2. Furthermore, the information processing apparatus 100 calculates the instruction position determined on the basis of the two lines LN1 and LN2 by calculation.

A state ST1 illustrated in FIG. 2 corresponds to, for example, a time point at which the user 50 holds the first controller 20A and the second controller 20B and starts an operation. The information processing apparatus 100 acquires from the controller 20 controller information indicating the position and direction of the controller 20, which corresponds to the state ST1, and causes the display device 10 to display the lines LN1 and LN2 on the basis of the acquired controller information.

Furthermore, the information processing apparatus 100 determines whether or not a distance D between the two lines LN1 and LN2 is less than a threshold D0. For example, the threshold D0 is a threshold used for determining whether to display an intersection of the two lines LN1 and LN2. The threshold D0 is a value of 0 or more. For example, the information processing apparatus 100 determines whether the distance D between the line LN1 of the first controller 20A and the line LN2 of the second controller 20B is less than the threshold D0. In a case where the distance D is less than the threshold D0, the information processing apparatus 100 determines to display the intersection. In the state ST1 illustrated in FIG. 2, since the distance D between the line LN1 of the first controller 20A and the line LN2 of the second controller 20B is equal to or more than the threshold D0, the information processing apparatus 100 determines not to display the intersection.

The user 50 adjusts the first controller 20A and the second controller 20B to designate desired positions (Step S1). The user 50 adjusts the first controller 20A and the second controller 20B so that the two lines LN1 and LN2 get closer. A state ST2 illustrated in FIG. 2 corresponds to a state after adjustment of the first controller 20A and the second controller 20B by the user 50. The information processing apparatus 100 acquires from the controller 20 controller information indicating the position and direction of the controller 20, which corresponds to the state ST2, and causes the display device 10 to display the lines LN1 and LN2 on the basis of the acquired controller information.

Then, the information processing apparatus 100 determines whether the distance D between the line LN1 of the first controller 20A and the line LN2 of the second controller 20B is less than the threshold D0. In the state ST2 illustrated in FIG. 2, since the distance D between the line LN1 of the first controller 20A and the line LN2 of the second controller 20B is less than the threshold D0, the information processing apparatus 100 determines to display the intersection (Step S2). Since the distance D between a point PT1 that is the nearest point of the line LN1 of the first controller 20A, and a point PT2 that is the nearest point of the line LN2 of the second controller 20B is less than the threshold D0, the information processing apparatus 100 determines to display the intersection.

Then, the information processing apparatus 100 displays the intersection (Step S3). The information processing apparatus 100 causes the display device 10 to display the intersection. First, the information processing apparatus 100 calculates a position of the intersection by calculation. In the state ST3 illustrated in FIG. 2, the information processing apparatus 100 calculates a midpoint between the point PT1 of the line LN1 and the point PT2 of the line LN2 as an intersection IS1. Note that the information processing apparatus 100 may calculate not only the midpoint of the nearest points but also various positions as intersections. For example, in a case where the point PT1 of the line LN1 and the point PT2 of the line LN2 overlap each other, the information processing apparatus 100 calculates the positions of the points PT1 and PT2 as the intersection IS1. For example, in a case where the position of the point PT1 of the line LN1 and the position of the point PT2 of the line LN2 coincide with each other, the information processing apparatus 100 calculates the positions of the points PT1 and PT2 as the intersection IS1. The information processing apparatus 100 causes the display device 10 to display the mark MK1 as illustrated in FIG. 1 at the position of the intersection IS1. That is, the information processing apparatus 100 causes the display device 10 to display the mark MK1 as the intersection IS1.

Then, the user 50 who displays the intersection IS1 and completes the desired operation adjusts the first controller 20A and the second controller 20B to end the display of the intersection IS1 (Step S4). The user 50 adjusts the first controller 20A and the second controller 20B such that the two lines LN1 and LN2 are separated.

Furthermore, the information processing apparatus 100 determines whether or not the distance D between the two lines LN1 and LN2 is larger than a threshold D1. For example, the threshold D1 is a threshold used for determining whether to stop displaying the intersection of the two lines LN1 and LN2. The threshold D1 is a value larger than the threshold D0. In this manner, by setting a value larger than the threshold D0 for starting the display of the intersection as the threshold D1 for ending the display of the intersection, it is possible to suppress continuation of the display and non-display of the intersection due to an error, a hand shake of the user, or the like.

In the state ST4 illustrated in FIG. 2, since the distance D between the line LN1 of the first controller 20A and the line LN2 of the second controller 20B is larger than the threshold D1, the information processing apparatus 100 determines to hide the intersection (Step S5). Specifically, since the distance D between the point PT1 that is the nearest point of the line LN1 of the first controller 20A, and the point PT2 that is the nearest point of the line LN2 of the second controller 20B is larger than the threshold D1, the information processing apparatus 100 determines to hide the intersection. As described above, a range between the threshold D0 and the threshold D1 is a play range when the intersection display mode is ON (in the intersection display mode). A dead band is formed between the threshold D0 and the threshold D1 when the intersection display mode is OFF (in the intersection non-display mode). The two lines come close to each other to enter the intersection display mode, and thereafter, the play range in which the intersection position can be adjusted is provided, so that the user 50 can concentrate on the adjustment of the intersection position.

As described above, the information processing apparatus 100 can easily indicate a desired position by indicating a position by the two lines. The information processing apparatus 100 can cause the display device 10 to display the mark MK1 at the intersection IS1 determined on the basis of the lines LN1 and LN2 corresponding to the two directions indicated by the user 50, thereby enabling flexible display according to the instruction of the user 50. Furthermore, the information processing apparatus 100 can change the display of the intersection according to the distance between the two lines, thereby enabling flexible display according to the user's instruction. The information processing system 1 enables the user 50 to freely designate a three-dimensional position in a three-dimensional space without restriction.

Since the position can be determined while dynamically changing the axis, the user can quickly specify the position anywhere in the three-dimensional space. In addition, the user can end the intersection display by bringing the two lines close to each other to create an intersection in a case where the user desires to designate a position, and by separating the lines or changing the directions of the lines in a case where the user desires to stop, so that the user's intention is intuitively reflected.

[1-2. Configuration of an Information Processing System According to an Embodiment]

Figure 3:
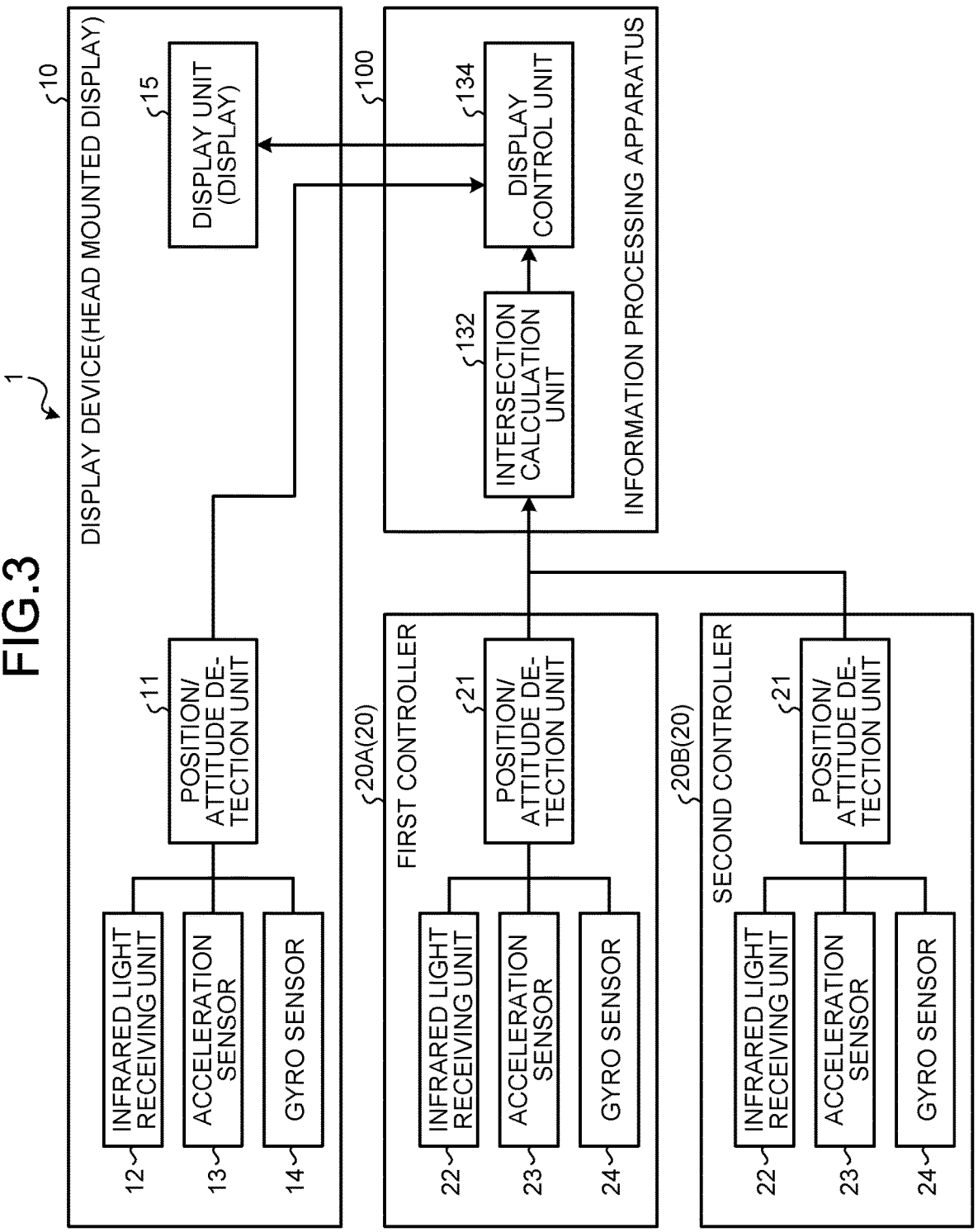
FIG. 3 is a diagram illustrating a configuration example of an information processing system according to an embodiment of the present disclosure.

An information processing system 1 illustrated in FIG. 3 will be described. As illustrated in FIG. 3, the information processing system 1 includes an information processing apparatus 100, a display device 10, a first controller 20A, and a second controller 20B. In FIG. 3, two controllers 20 of the first controller 20A and the second controller 20B are illustrated as an example of direction instruction components, but the information processing system 1 may include more than three direction instruction components.

The information processing system 1 is a system in which information processing related to augmented reality (AR), virtual reality (VR), or mixed reality (MR) is executed. For example, the information processing system 1 is a system for displaying or editing AR or VR content.

The information processing apparatus 100, the display device 10, and the controller 20 are communicably connected in a wired or wireless manner via a predetermined network (not illustrated). FIG. 3 is a diagram illustrating a configuration example of an information processing system according to an embodiment of the present disclosure. Note that the information processing system 1 illustrated in FIG. 3 may include a plurality of display devices 10 and a plurality of information processing apparatuses 100.

The information processing apparatus 100 is an information processing apparatus that causes the display device 10 to display a mark for a virtual object at an instruction position that is a position determined on the basis of a plurality of directions indicated by a user. The information processing apparatus 100 controls display on the display device 10 using the controller information acquired from the controller 20. The information processing apparatus 100 controls display of the display device 10 by using information (display device information) regarding the position and attitude of the display device 10 acquired from the display device 10.

The display device 10 is a computer (information processing device) for displaying information. For example, the display device 10 is a head mounted display, and is used to display information to the user.

The display device 10 includes a position/attitude detection unit 11, an infrared light receiving unit 12, an acceleration sensor 13, a gyro sensor 14, and a display unit 15. The position/attitude detection unit 11 detects the position and attitude of the display device 10 on the basis of various sensor information acquired from the sensors included in the display device 10, such as the outer line light receiving unit 12, the acceleration sensor 13, and the gyro sensor 14. The position/attitude detection unit 11 controls the sensors included in the display device 10, such as the outer line light receiving unit 12, the acceleration sensor 13, and the gyro sensor 14, to detect various information regarding the position and attitude of the display device 10, such as the position, direction, and inclination of the display device 10. The attitude detection unit 11 outputs information (display device information) about the position and attitude of the display device 10 to a display control unit 134. For example, the display device 10 transmits various information regarding the position and attitude of the display device 10 to the information processing apparatus 100. For example, the position/attitude detection unit 11 may be realized by various processors such as a central processing unit (CPU), a graphics processing unit (GPU), and a field programmable gate array (FPGA).

The display unit 15 is a display that displays various information under the control of the display control unit 134. For example, the display device 10 acquires various information from the information processing apparatus 100, and displays the acquired information on the display unit 15. The display unit 15 displays a mark for a virtual object at an instruction position determined on the basis of a plurality of directions indicated by the user according to the control by the display control unit 134. The display unit 15 displays the content generated by the display control unit 134.

Note that, in a case where a user's line of sight is used to designate the direction, the display device 10 may include a line-of-sight detection unit that detects a line-of-sight position of the user. The line-of-sight detection unit detects a line of sight of the user by appropriately using various technologies related to line-of-sight detection. As a technique of the line-of-sight detection, for example, a method of detecting a line of sight on the basis of a position of a moving point (for example, a point corresponding to a moving part in the eye such as the iris or the pupil) of the eye with respect to a reference point (for example, a point corresponding to a non-moving part in the eye such as the inner corner of the eye or corneal reflex) of the eye may be used. Note that the detection of the line of sight is not limited to the above, and the line of sight of the user may be detected using any line-of-sight detection technique.

The controller 20, which is the first controller 20A or the second controller 20B, is a device used by a user to indicate a direction. The controller 20 is a controller used in the field of AR and VR. The controller 20 is used to execute a user's operation on the AR or VR space. The controller 20 is used to indicate a position of a space such as AR or VR displayed by the display device 10 or indicate a virtual object in the space.

The controller 20 includes a position/attitude detection unit 21, an infrared light receiving unit 22, an acceleration sensor 23, and a gyro sensor 24. The position/attitude detection unit 21 detects the position and attitude of the controller 20 on the basis of various sensor information acquired from the sensors included in the controller 20, such as the outer line light receiving unit 22, the acceleration sensor 23, and the gyro sensor 24. The position/attitude detection unit 21 controls the sensors included in the controller 20, such as the outer line light receiving unit 22, the acceleration sensor 23, and the gyro sensor 24, to detect various information regarding the position and attitude of the controller 20, such as the position, direction, and inclination of the controller 20. The attitude detection unit 11 outputs information (controller information) regarding the position and the attitude of the controller 20 to an intersection calculation unit 132. For example, the controller 20 transmits various information regarding the position and attitude of the controller 20 to the information processing apparatus 100. For example, the position/attitude detection unit 21 may be realized by various processors such as a CPU, a GPU, and an FPGA.

In addition, when the controller 20 emits an actual beam, the controller 20 has a configuration (such as a light output unit) that emits laser light.

[1-3. Configuration of an Information Processing Apparatus According to an Embodiment]

Figure 4:
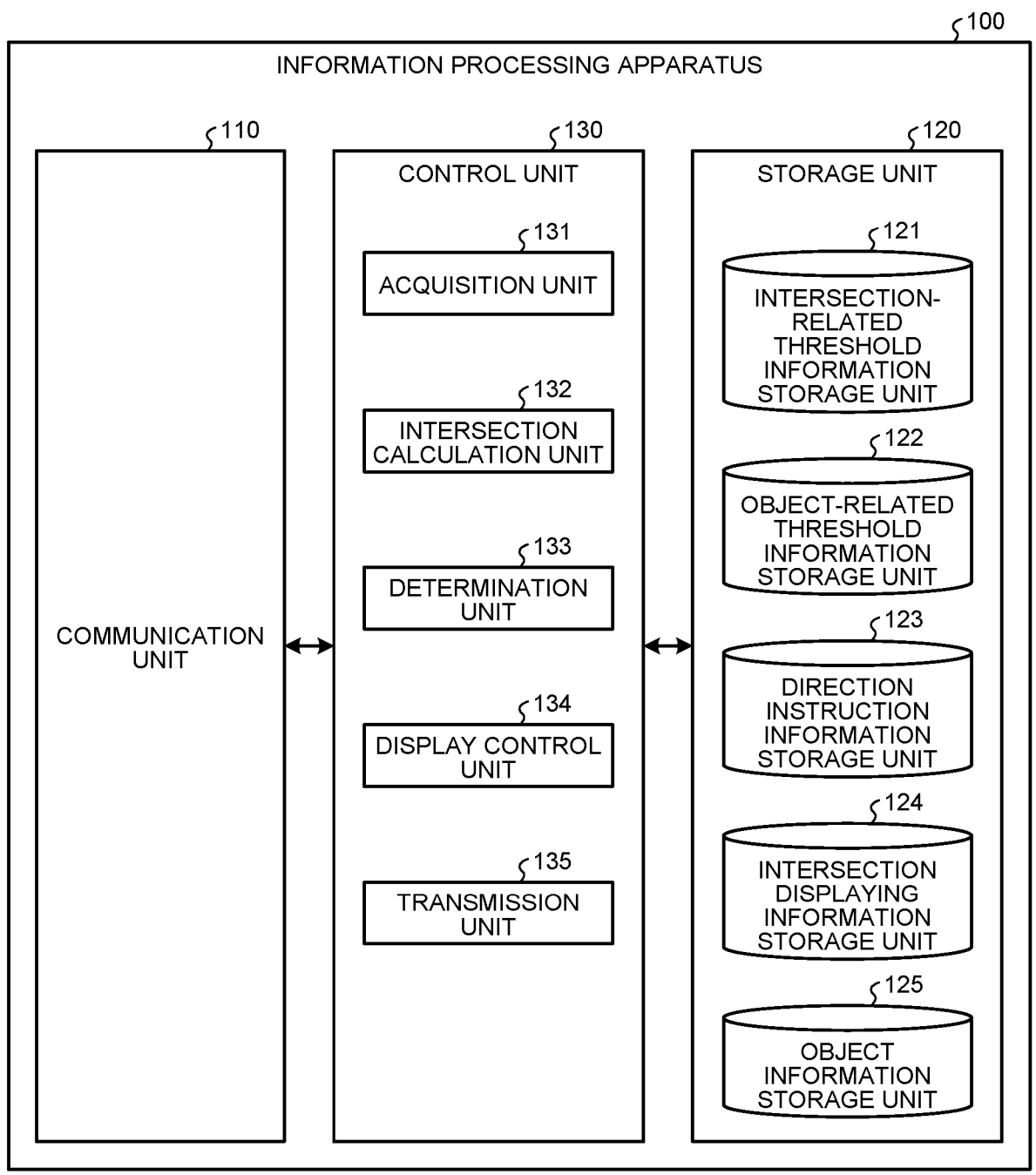
FIG. 4 is a diagram illustrating a configuration example of an information processing apparatus according to an embodiment of the present disclosure.

Next, a configuration of an information processing apparatus 100 that is an example of an information processing apparatus that executes information processing according to an embodiment will be described. FIG. 4 is a diagram illustrating a configuration example of the information processing apparatus 100 according to the embodiment of the present disclosure.

As illustrated in FIG. 4, the information processing apparatus 100 includes a communication unit 110, a storage unit 120, and a control unit 130. Note that the information processing apparatus 100 may include an input unit (for example, a keyboard, a mouse, or the like) that receives various operations from an administrator or the like of the information processing apparatus 100, and a display unit (for example, a liquid crystal display or the like) for displaying various information.

The communication unit 110 is realized by, for example, an NIC, a communication circuit, or the like. Then, the communication unit 110 is connected to a predetermined network (not illustrated) in a wired or wireless manner, and transmits and receives information to and from other information processing devices such as the controller 20 and the display device 10.

The storage unit 120 is realized by, for example, a semiconductor memory element such as a random access memory (RAM) or a flash memory, or a storage device such as a hard disk or an optical disk. As illustrated in FIG. 4, the storage unit 120 according to the embodiment includes an intersection-related threshold information storage unit 121, an object-related threshold information storage unit 122, a direction instruction information storage unit 123, an intersection displaying information storage unit 124, and an object information storage unit 125.

Figure 5:
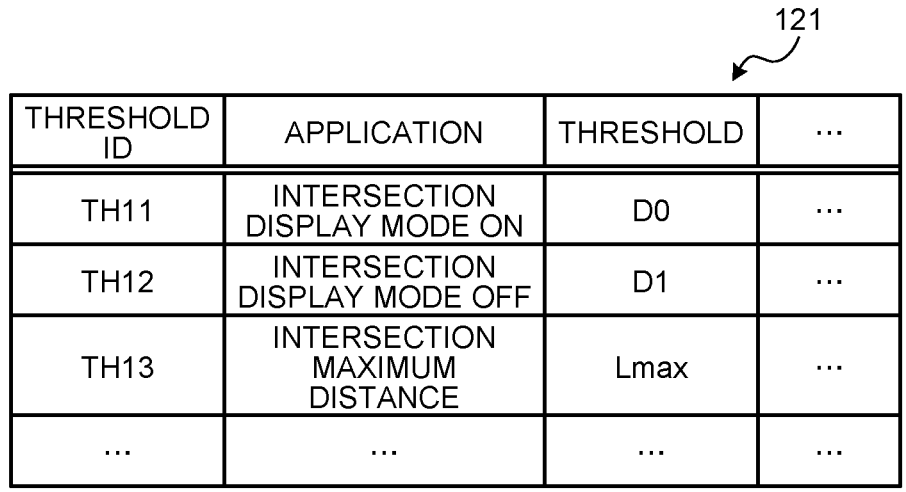
FIG. 5 is a diagram illustrating an example of an intersection-related threshold information storage unit according to the embodiment of the present disclosure.

The intersection-related threshold information storage unit 121 according to the embodiment stores various information on a threshold related to the intersection. For example, the intersection-related threshold information storage unit 121 stores various information on a threshold used for determining whether or not to display an intersection. FIG. 5 is a diagram illustrating an example of an intersection-related threshold information storage unit according to the embodiment of the present disclosure. The intersection-related threshold information storage unit 121 illustrated in FIG. 5 includes items such as "threshold ID", "application", and a "threshold".

The "threshold ID" indicates identification information for identifying the threshold. The "application" indicates application of the threshold. The "threshold" indicates a specific value of the threshold identified by the corresponding threshold ID. Note that, in the example illustrated in FIG. 5, an abstract code such as "D0" or "Lmax" is illustrated as the "threshold", but information indicating a specific value (number) such as "0.8" or "5" is stored in the "threshold".

In the example of FIG. 5, the application of a threshold (first threshold) identified by threshold ID "TH11" is application "intersection display mode ON", which indicates that the threshold is used for determining whether to turn on an intersection display mode. For example, the threshold (first threshold) identified by the threshold ID "TH11" is a threshold used for determining whether to display a mark indicating an intersection. The value of the threshold (first threshold) identified by the threshold ID "TH11" indicates a threshold D0. In addition, the application of a threshold (second threshold) identified by threshold ID "TH12" is application "intersection display mode OFF", which indicates that the threshold is used for determining whether to turn off the intersection display mode. For example, the threshold (second threshold) identified by the threshold ID "TH12" is a threshold used for determining whether to hide the mark indicating the intersection. The value of the threshold (second threshold) identified by the threshold ID "TH12" indicates a threshold D1.

In addition, the application of a threshold (third threshold) identified by threshold ID "TH13" is application "intersection maximum distance", which indicates that the threshold is used for determining whether to display an intersection. For example, the threshold (third threshold) identified by the threshold ID "TH13" is a threshold used for determining whether the distance is within a range in which the mark indicating the intersection is displayed. The value of the threshold (third threshold) identified by the threshold ID "TH13" indicates a threshold Lmax.

Note that the intersection-related threshold information storage unit 121 is not limited to the above, and may store various information depending on the purpose.

Here, the threshold D0 and the threshold D1 may be appropriately set. The threshold D0 and the threshold D1 may be set by appropriately using various information as long as a magnitude relationship between the threshold D0 and the threshold D1 is satisfied. For example, the information processing apparatus 100 may set values of the threshold D0 or the threshold D1 according to a distance from the controller 20, the hand, or the like of an operator (for example, the user 50) to the intersection. For example, the information processing apparatus 100 may set the values of the threshold D0 and the threshold D1 such that the values of the threshold D0 and the threshold D1 are small when it is closer to the operator and the values of the threshold D0 and the threshold D1 are large when it is farther from the operator. For example, as the threshold D1, a value calculated by "distance to intersection point×tan (5 deg.)" may be used as a guide. For example, as disclosed in the following document, since the maximum angle of hand shaking is about 5 degrees, the value calculated as described above may be used.

Basic study on stabilized laser pointer <https://www.cst-.nihon-u.ac.jp/research/gakujutu/54/pdf/E-7.pdf>

In addition, for example, in a case where the threshold D0 is assumed to be 2 m, since the threshold D1 is about 17 cm, the threshold DO may be set to about 1/10 (about 2 cm) thereof. Note that the threshold D0 may be a small value because the two lines may intersect even instantaneously.

Figure 6:
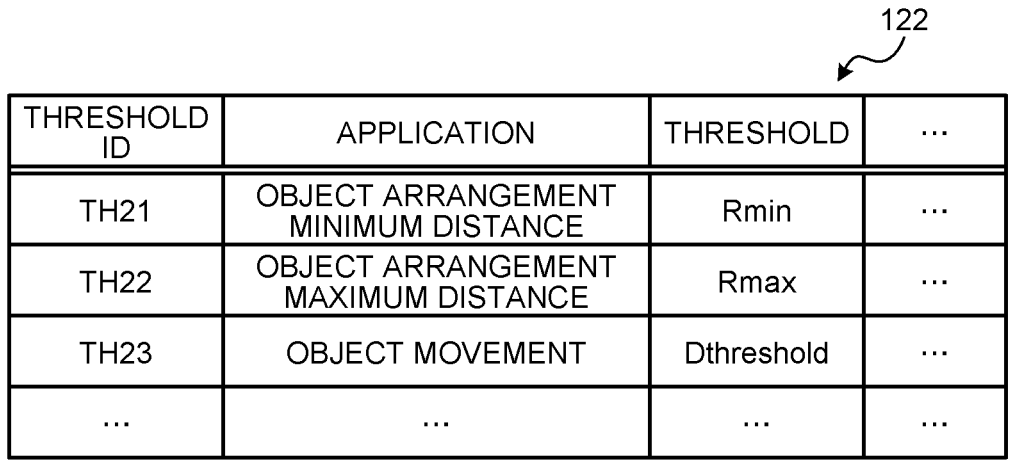
FIG. 6 is a diagram illustrating an example of an object-related threshold information storage unit according to the embodiment of the present disclosure.

The object-related threshold information storage unit 122 according to the embodiment stores various information on a threshold related to an object. For example, the object-related threshold information storage unit 122 stores various information on a threshold used for determination of display of an object. FIG. 6 is a diagram illustrating an example of an object-related threshold information storage unit according to the embodiment of the present disclosure. The object-related threshold information storage unit 122 illustrated in FIG. 6 includes items such as "threshold ID", "application", and a "threshold".

The "threshold ID" indicates identification information for identifying the threshold. The "application" indicates application of the threshold. The "threshold" indicates a specific value of the threshold identified by the corresponding threshold ID. Note that, in the example illustrated in FIG. 6, an abstract code such as "Rmax" or "Dthreshold" is illustrated as the "threshold", but information indicating a specific value (number) such as "0.8" or "5" is stored in the "threshold".

In the example of FIG. 6, the application of a threshold (fourth threshold) identified by threshold ID "TH21" is application "object arrangement minimum distance", which indicates that the threshold is used for determination of the minimum distance for arranging the object. For example, the threshold (fourth threshold) identified by the threshold ID "TH21" is a threshold used for determining whether an arrangement position of a virtual object is within a range of the minimum distance. The value of the threshold (fourth threshold) identified by the threshold ID "TH21" indicates a threshold Rmin.

In addition, the application of a threshold (fifth threshold) identified by threshold ID "TH22" is an "object arrangement maximum distance", which indicates that the threshold is used for determination of the maximum distance for arranging the object. For example, the threshold (fifth threshold) identified by the threshold ID "TH22" is a threshold used for determining whether an arrangement position of the virtual object is within a range of the maximum distance. The value of the threshold (fifth threshold) identified by the threshold ID "TH22" indicates a threshold Rmax.

In addition, the application of a threshold (sixth threshold) identified by threshold ID "TH23" is application "object movement", which indicates that the threshold is used for determination as to whether to move the object. For example, the threshold (sixth threshold) identified by the threshold ID "TH23" is a threshold used for determining whether to move the object in accordance with a change in the position of the intersection. The value of the threshold (sixth threshold) identified by the threshold ID "TH23" indicates a threshold Lmax.

Note that the object-related threshold information storage unit 122 is not limited to the above, and may store various information depending on the purpose.

Figure 7:
FIG. 7 is a diagram illustrating an example of a direction instruction information storage unit according to the embodiment of the present disclosure.

The direction instruction information storage unit 123 according to the embodiment stores various information regarding the indication of a direction. FIG. 7 is a diagram illustrating an example of a direction instruction information storage unit according to the embodiment of the present disclosure. For example, the direction instruction information storage unit 123 stores various information corresponding to each direction. The direction instruction information storage unit 123 illustrated in FIG. 7 includes items such as "direction instruction ID", an "instruction component", and a "type".

The "direction instruction ID" indicates identification information for identifying each direction. For example, the "direction instruction ID" indicates identification information for identifying each direction indicated by a user. The "instruction component" indicates information for identifying a component used by the user to indicate (give an instruction on) a direction. The "instruction component" stores information for identifying a device (apparatus) such as a controller used by the user to give an instruction on a direction or an element related to a user's body. For example, in a case where the instruction on a direction is given by a user's line of sight, a "line of sight" may be stored in the "instruction component". Furthermore, for example, in a case where the instruction on a direction is given by a user's finger, a "finger" may be stored in the "instruction component".

The "type" indicates a type (kind) of the instruction component. For example, the "type" indicates a type of a component used by the user to indicate (given an instruction on) a direction, such as a device (apparatus) such as a controller or an element related to the user's body. For example, when the instruction on a direction is given by the controller, a "controller", a "device", or the like is stored in the "type". For example, in a case where the instruction on a direction is given by a user's line of sight, a "line of sight", a "body", and the like are stored in the "type". Furthermore, for example, in a case where the instruction on a direction is given by a user's finger, a "finger", a "body", and the like are stored in the "type".

The example of FIG. 7 indicates that a direction (direction DG1) identified by the direction instruction ID "DG1" is the first controller 20A that is an instruction component identified by "20A". The type of the first controller 20A indicating the direction DG1 indicates a controller.

Further, it is indicated that a direction (direction DG2) identified by the direction instruction ID "DG2" is the second controller 20B that is an instruction component identified by "20B". The type of the second controller 20B indicating the direction DG2 indicates a controller.

Note that the direction instruction information storage unit 123 is not limited to the above, and may store various information depending on the purpose.

The intersection displaying information storage unit 124 according to the embodiment stores various information regarding intersection display. The intersection displaying information storage unit 124 stores various information used for the intersection display. FIG. 8 is a diagram illustrating an example of an intersection displaying information storage unit according to the embodiment of the present disclosure. The intersection displaying information storage unit 124 illustrated in FIG. 8 includes items such as an "intersection display mode", an "intersection (instruction position)", a "mark", "target information", and "master-subordinate information".

The "intersection display mode" indicates whether the intersection display mode is ON or OFF. The "intersection (instruction position)" indicates a position of an intersection. The "mark" indicates a mark displayed at a position corresponding to the instruction position.

In the "target information", information indicating a geometric target corresponding to a direction is stored. The "target information" includes items such as a "distance", a "target #1", and a "target #2". The "distance" indicates a distance (target distance) between the targets. The "target #1" and the "target #2" indicate geometric targets corresponding to directions. Note that the "target information" is not limited to the "target #1" and the "target #2", and may include items such as a "target #3" according to the number of targets.

The "master-subordinate information" includes items such as a "master-subordinate relationship", a "main instruction component", and a "subordinate instruction component". The "master-subordinate relationship" indicates the presence or absence of a master-subordinate relationship between components that indicate each direction.

The "main instruction component" indicates a main instruction component. For example, the "main instruction component" indicates that a direction (geometric target) indicated by the instruction component is main. In a case where the first controller 20A is the main instruction component in the example of FIG. 1, "20A" is stored in the "main instruction component".

The "subordinate instruction component" indicates a subordinate instruction component. For example, the "subordinate instruction component" indicates that a direction (geometric target) indicated by the instruction component is subordinate. In a case where the second controller 20B is the main instruction component in the example of FIG. 1, "20B" is stored in the "subordinate instruction component".

The example of FIG. 8 indicates that the intersection display mode is "ON" and is a mode for displaying a mark indicating an intersection. Further, it is indicated that the intersection (instruction position) is "IS1" and the intersection is the intersection IS1. In addition, it is indicated that the mark is "MK1" and the mark displayed at a position corresponding to the intersection IS1 is the mark MK1.

In addition, it is indicated that the first target is the point PT1 of the line LN1, the second target is the point PT2 of the line LN2, and the distance between the targets is a distance D. It is indicated that there is no master-subordinate relationship, and the main instruction component and the subordinate instruction component are not set.

Note that the intersection displaying information storage unit 124 is not limited to the above, and may store various information depending on the purpose.

Figure 9:
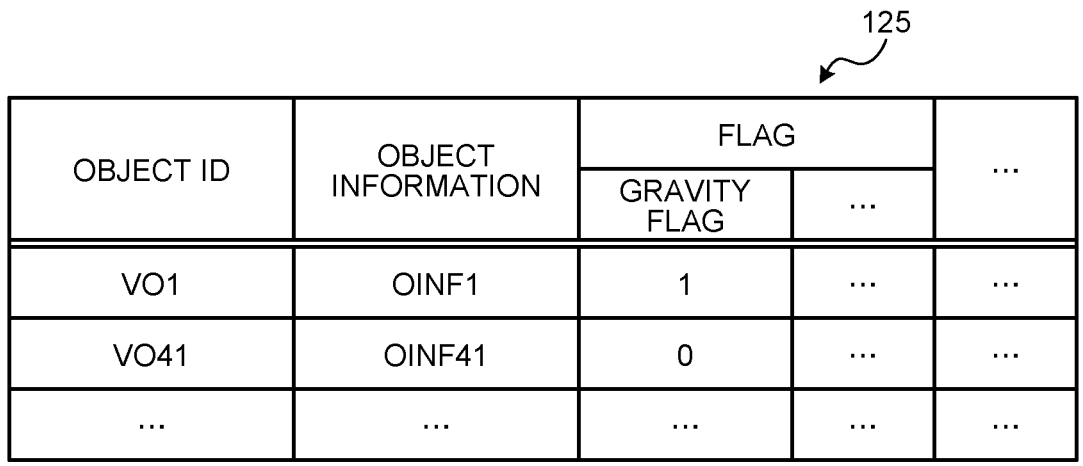
FIG. 9 is a diagram illustrating an example of an object information storage unit according to the embodiment of the present disclosure.

The object information storage unit 125 according to the embodiment stores various information regarding an object. For example, the object information storage unit 125 stores various information regarding a virtual object. FIG. 9 is a diagram illustrating an example of an object information storage unit according to the embodiment of the present disclosure. The object information storage unit 125 illustrated in FIG. 9 includes items such as "object ID", "object information", and a "flag". The "flag" includes an item such as a "gravity flag". Note that the "flag" is not limited to the "gravity flag", and any flag such as a "transparent flag" may be included as long as the flag is assigned to the object.

The "object ID" indicates identification information for identifying an object. The "object ID" indicates identification information for identifying a virtual object. Furthermore, the "object information" indicates object information corresponding to an object identified by the object ID. Note that, in the example illustrated in FIG. 9, the "object information" illustrates an abstract code such as "OINF1", but various information related to a size, shape, and the like of the object is stored in the "object information". The "flag" indicates a flag corresponding to the object identified by the object ID. The "gravity flag" indicates whether or not the gravity flag is assigned to the object identified by the object ID.

In the example of FIG. 9, an object (virtual object VO1) identified by object ID "VO1" indicates that the object information is "OINF1". The virtual object VO1 indicates that the gravity flag is "1". That is, it is indicated that the virtual object VO1 is affected by gravity in determining the arrangement position. In this case, for example, in a case where the virtual object VO1 is arranged in midair, it indicates that the virtual object is arranged at a position falling in a gravity direction from the position.

Furthermore, an object (virtual object VO41) identified by object ID "VO41" indicates that the object information is "OINF41". The virtual object VO41 indicates that the gravity flag is "0". That is, it is indicated that the virtual object VO41 is not affected by gravity in determining the arrangement position. In this case, for example, in a case where the virtual object VO41 is arranged in midair, it indicates that the virtual object remains at the position.

Note that the object information storage unit 125 is not limited to the above, and may store various information depending on the purpose.

Returning to FIG. 4, the description will be continued. The control unit 130 is implemented by, for example, using a central processing unit (CPU), a micro processing unit (MPU), or the like to execute a program (for example, an information processing program such as a determination program according to the present disclosure) stored inside the information processing apparatus 100 with a RAM or the like as a work area. Furthermore, the control unit 130 is realized by, for example, an integrated circuit such as an application specific integrated circuit (ASIC) or an FPGA.

As illustrated in FIG. 4, the control unit 130 includes an acquisition unit 131, an intersection calculation unit 132, a determination unit 133, a display control unit 134, and a transmission unit 135, and implements or executes a function and an action of information processing described below. Note that an internal configuration of the control unit 130 is not limited to the configuration illustrated in FIG. 4, and may be another configuration as long as information processing to be described later is performed. Furthermore, a connection relationship of the processing units included in the control unit 130 is not limited to the connection relationship illustrated in FIG. 4, and may be another connection relationship.

The acquisition unit 131 acquires various information. The acquisition unit 131 acquires various information from an external information processing apparatus. The acquisition unit 131 acquires various information from the controller 20. The acquisition unit 131 acquires various information from other information processing device such as the display device 10.

The acquisition unit 131 acquires various information from the storage unit 120. The acquisition unit 131 acquires various information from the intersection-related threshold information storage unit 121, the object-related threshold information storage unit 122, the direction instruction information storage unit 123, the intersection displaying information storage unit 124, or the object information storage unit 125.

The acquisition unit 131 acquires various information calculated by the intersection calculation unit 132. The acquisition unit 131 acquires various information decided by the determination unit 133. The acquisition unit 131 acquires various information received by the display control unit 134.

In the example of FIG. 2, the acquisition unit 131 acquires controller information indicating an attitude such as a position and a direction of the controller 20 according to the motion of the user 50. The acquisition unit 131 acquires, from the controller 20, controller information indicating an attitude such as a position and a direction of the controller 20 corresponding to the state ST1. The acquisition unit 131 acquires, from the controller 20, controller information indicating an attitude such as a position and a direction of the controller 20 corresponding to the state ST2.

The intersection calculation unit 132 performs various types of calculation processing. The intersection calculation unit 132 performs calculation processing related to an intersection. The intersection calculation unit 132 calculates various information. The intersection calculation unit 132 calculates various information on the basis of information from an external information processing apparatus or information stored in the storage unit 120. The intersection calculation unit 132 calculates various information from the storage unit 120. The intersection calculation unit 132 calculates various information from the intersection-related threshold information storage unit 121, the object-related threshold information storage unit 122, the direction instruction information storage unit 123, the intersection displaying information storage unit 124, or the object information storage unit 125. The intersection calculation unit 132 specifies various information. The intersection calculation unit 132 stores a simulation result in the object-related threshold information storage unit 122. The intersection calculation unit 132 generates various information. The intersection calculation unit 132 generates various information on the basis of the calculated information.

In the example of FIG. 2, the intersection calculation unit 132 calculates the distance between the two lines LN1 and LN2. The intersection calculation unit 132 calculates an instruction position determined based on the two lines LN1 and LN2 by calculation. The intersection calculation unit 132 calculates a position of the intersection by calculation. The intersection calculating unit 132 calculates a midpoint between the point PT1 of the line LN1 and the point PT2 of the line LN2 as an intersection IS1.

The determination unit 133 determines various information. The determination unit 133 decides various information. The determination unit 133 specifies various information. For example, the determination unit 133 determines various information on the basis of information from an external information processing apparatus or information stored in the storage unit 120. The determination unit 133 determines various information on the basis of information from other information processing devices such as the controller 20 and the display device 10. The determination unit 133 determines various information on the basis of information stored in the intersection-related threshold information storage unit 121, the object-related threshold information storage unit 122, the direction instruction information storage unit 123, the intersection displaying information storage unit 124, or the object information storage unit 125.

The determination unit 133 determines various information on the basis of the various information acquired by the acquisition unit 131. The determination unit 133 determines various information on the basis of the various information calculated by the intersection calculation unit 132. The determination unit 133 determines various information on the basis of the various information received by the display control unit 134. The determination unit 133 decides various information on the basis of the various information acquired by the acquisition unit 131. The determination unit 133 determines various information on the basis of the various information calculated by the intersection calculation unit 132. The determination unit 133 decides various information on the basis of the various information received by the display control unit 134.

The determination unit 133 extracts various information. The determination unit 133 selects various information. The determination unit 133 extracts various information on the basis of information from an external information processing apparatus or information stored in the storage unit 120. The determination unit 133 extracts various information from the storage unit 120. The determination unit 133 extracts various information from the intersection-related threshold information storage unit 121, the object-related threshold information storage unit 122, the direction instruction information storage unit 123, the intersection displaying information storage unit 124, or the object information storage unit 125.

The determination unit 133 extracts various information on the basis of the various information acquired by the acquisition unit 131. Furthermore, the determination unit 133 extracts various information on the basis of the various information decided by the determination unit 133. The determination unit 133 extracts various information on the basis of the various information received by the display control unit 134. The determination unit 133 changes various information on the basis of the decision. The various information is updated based on the information acquired by the acquisition unit 131.

The determination unit 133 determines whether to display a mark on the basis of a positional relationship between the two geometric targets. When a target distance, which is a distance between the two geometric targets, is less than a first threshold, the determination unit 133 determines to display the mark. When the mark is displayed, in a case where the target distance is equal to or less than a second threshold larger than the first threshold, the determination unit 133 determines to continue displaying the mark, and in a case where the target distance exceeds the second threshold, determines not to display the mark. The determination unit 133 determines whether to display a mark on the basis of a display distance that is a distance between an instruction component giving an instruction on one of the two directions and an instruction position. When the display distance exceeds the third threshold, the determination unit 133 determines not to display the mark.

In the example of FIG. 2, the determination unit 133 determines whether to display the mark MK1 on the basis of the positional relationship between the two lines LN1 and LN2. The determination unit 133 determines whether the distance D between the two lines LN1 and LN2 is less than the threshold D0. The determination unit 133 determines whether the distance D between the line LN1 of the first controller 20A and the line LN2 of the second controller 20B is less than the threshold D0. When the distance D is less than the threshold D0, the determination unit 133 determines to display the intersection. In the state ST1 illustrated in FIG. 2, since the distance D between the line LN1 of the first controller 20A and the line LN2 of the second controller 20B is equal to or more than the threshold D0, the determination unit 133 determines not to display the intersection.

The determination unit 133 determines whether the distance D between the line LN1 of the first controller 20A and the line LN2 of the second controller 20B is less than the threshold D0. In the state ST2 illustrated in FIG. 2, since the distance D between the line LN1 of the first controller 20A and the line LN2 of the second controller 20B is less than the threshold D0, the determination unit 133 determines to display the intersection. Since the distance D between the point PT1 that is the nearest point of the line LN1 of the first controller 20A, and the point PT2 that is the nearest point of the line LN2 of the second controller 20B, is less than the threshold D0, the determination unit 133 determines to display the intersection.

The determination unit 133 determines whether the distance D between the two lines LN1 and LN2 is larger than the threshold D1. In the state ST4 illustrated in FIG. 2, since the distance D between the line LN1 of the first controller 20A and the line LN2 of the second controller 20B is larger than the threshold D1, the determination unit 133 determines to display the intersection. Since the distance D between the point PT1 that is the nearest point of the line LN1 of the first controller 20A, and the point PT2 that is the nearest point of the line LN2 of the second controller 20B is larger than the threshold D1, the determination unit 133 determines to hide the intersection.

The display control unit 134 controls display of various information. The display control unit 134 controls display of various information on the display device 10. The display control unit 134 controls display of various information on the display device 10 using various technologies related to display of a device that displays information. The display control unit 134 controls display of various information on the display device 10 using various technologies related to display on a head mounted display. The display control unit 134 controls display of various information on the display device 10 using various technologies related to virtual reality (VR) and augmented reality (AR). The display control unit 134 generates an image or the like including control information for controlling a display pattern. The display control unit 134 generates the image IM1 in FIG. 1.

The display control unit 134 controls display of various information on the display device 10 by using information (instruction component information) indicating an attitude such as a position and a direction of the instruction component and information (display device information) regarding an attitude such as a position and a direction of the display device 10. The display control unit 134 controls display of various information on the display device 10 by using information (controller information) indicating an attitude such as a position and a direction of the controller 20 and information (display device information) regarding an attitude such as a position and a direction of the display device 10. The display control unit 134 controls the display of the line of the controller 20 using the controller information and the display device information. The display control unit 134 controls display of the virtual object on the display unit 15 of the display device 10 using the controller information and the display device information.

The display control unit 134 uses the controller information and the display device information to control drawing of the lines and virtual objects of the controller 20. The display control unit 134 may perform processing of generating a stereoscopic object (stereoscopic image) including a left-eye image and a right-eye image to be displayed on the display unit 15 of the display device 10 as a drawing. Then, the display control unit 134 displays the generated stereoscopic object on the display unit 15 of the display device 10. The display control unit 134 controls drawing of a mark on a portion corresponding to a position determined by a direction pointed by the instruction component. The display control unit 134 controls display of a line of the controller 20 on the display unit 15 of the display device 10 on the basis of the information of a line of sight of the user 50.

The display control unit 134 controls display on the basis of various information acquired from an external information processing apparatus. The display control unit 134 controls display on the basis of various information acquired from the controller 20. The display control unit 134 controls display on the basis of various information stored in the storage unit 120. The display control unit 134 controls display on the basis of various information stored in the intersection-related threshold information storage unit 121, the object-related threshold information storage unit 122, the direction instruction information storage unit 123, the intersection displaying information storage unit 124, or the object information storage unit 125.

The display control unit 134 receives various information on the basis of the various information acquired by the acquisition unit 131. The display control unit 134 receives various information on the basis of the various information calculated by the intersection calculation unit 132. The display control unit 134 receives various information on the basis of the various information decided by the determination unit 133.

The display control unit 134 causes the display device 10 to display a mark for a virtual object at an instruction position that is a position determined on the basis of a plurality of directions indicated by the user. The display control unit 134 causes the display device 10 to display the mark at an instruction position determined on the basis of a plurality of geometric targets corresponding to each of the plurality of directions. The display control unit 134 causes the display device 10 to display the mark at an instruction position determined on the basis of a positional relationship among the plurality of geometric targets.

The display control unit 134 causes the display device 10 to display the mark at an instruction position determined based on two geometric targets corresponding to each of the plurality of directions which are two directions. The display control unit 134 causes the display device 10 to display the mark at an instruction position determined on the basis of a first geometric target along a first direction and a second geometric target along a second direction among the plurality of directions which are two directions. When the determination unit 133 determines to display the mark, the display control unit 134 causes the display device 10 to display the mark.

The display control unit 134 causes the display device 10 to display the virtual object at an instruction position based on a relationship between the two geometric targets. The display control unit 134 causes the display device 10 to display the mark at an instruction position determined on the basis of two points determined from each of the two geometric targets. The display control unit 134 causes the display device 10 to display the mark at an instruction position determined on the basis of the two points at which a distance between the two geometric targets is the shortest. When the positions of the two points coincide with each other, the display control unit 134 causes the display device 10 to display the mark by using the positions of the two points as an instruction position. In a case where the positions of the two points are different, the display control unit 134 causes the display device 10 to display the mark by using a position on a line segment connecting the two points as an instruction position.

The display control unit 134 causes the display device 10 to display the virtual object at an arrangement position that is a position based on the instruction position. In a case where the instruction position is located between a first distance that is a distance from the instruction component giving an instruction on one of the plurality of directions to a first position and a second distance that is a distance from the instruction component to a second position farther than the first position, the display control unit 134 causes the display device 10 to display the virtual object with the instruction position as the arrangement position. When the instruction position is the first distance or less, the display control unit 134 causes the display device 10 to display the virtual object with the first position as the arrangement position. When the instruction position is the second distance or more, the display control unit 134 causes the display device 10 to display the virtual object with the second position as the arrangement position.

The display control unit 134 causes the display device 10 to display the mark at an instruction position determined on the basis of a plurality of lines corresponding to each of the plurality of directions. The display control unit 134 causes the display device 10 to display the mark at an instruction position determined based on a plurality of geometric targets including a plane corresponding to at least one direction among the plurality of directions. The display control unit 134 causes the display device 10 to display the mark at an instruction position determined on the basis of a plurality of directions including at least one direction on which an instruction is given by a controller held by the user. The display control unit 134 causes the display device 10 to display the mark at an instruction position determined on the basis of a plurality of directions including at least one direction on which an instruction is given by a body of the user. The display control unit 134 causes the display device 10 to display the mark at an instruction position determined on the basis of a plurality of directions including at least one direction on which an instruction is given by a line of sight of the user. The display control unit 134 causes the display device 10 to display the mark at an instruction position determined on the basis of a plurality of directions including at least one direction on which an instruction is given by a finger of the user.

In the example of FIG. 1, the display control unit 134 causes the display device 10 to display a mark for the virtual object with MK1 at an instruction position determined by the user 50 on the basis of the two directions indicated by the controller 20. The display control unit 134 causes the display device 10 to display the lines LN1 and LN2 on the basis of the controller information acquired by the acquisition unit 131.

In the example of FIG. 2, the display control unit 134 causes the display device 10 to display the lines LN1 and LN2 on the basis of the controller information corresponding to the state ST1 acquired by the acquisition unit 131. The display control unit 134 causes the display device 10 to display the lines LN1 and LN2 on the basis of the controller information corresponding to the state ST2 acquired by the acquisition unit 131. The display control unit 134 causes the display device 10 to display the intersection. The display control unit 134 causes the display device 10 to display the mark MK1 as illustrated in FIG. 1 at the intersection IS1 as the intersection IS1.

The transmission unit 135 provides various information to an external information processing apparatus. The transmission unit 135 transmits various information to an external information processing apparatus. For example, the transmission unit 135 transmits various information to other information processing devices such as the controller 20 and the display device 10. The transmission unit 135 provides the information stored in the storage unit 120. The transmission unit 135 transmits the information stored in the storage unit 120.

The transmission unit 135 provides various information on the basis of information from other information processing devices such as the controller 20 and the display device 10. The transmission unit 135 provides various information on the basis of information stored in the storage unit 120. The transmission unit 135 provides various information on the basis of information stored in the intersection-related threshold information storage unit 121, the object-related threshold information storage unit 122, the direction instruction information storage unit 123, the intersection displaying information storage unit 124, or the object information storage unit 125.

The transmission unit 135 transmits various information on the basis of the various information acquired by the acquisition unit 131. The transmission unit 135 transmits various information on the basis of the various information calculated by the intersection calculation unit 132. The transmission unit 135 transmits various information on the basis of the various information decided by the determination unit 133.

The transmission unit 135 transmits to the display device 10 information for controlling the display device 10 by the display control unit 134. The transmission unit 135 transmits to the display device 10 control information generated by the display control unit 134 to control the display device 10.

[1-4. Procedure of Information Processing According to an Embodiment]

Figure 10:
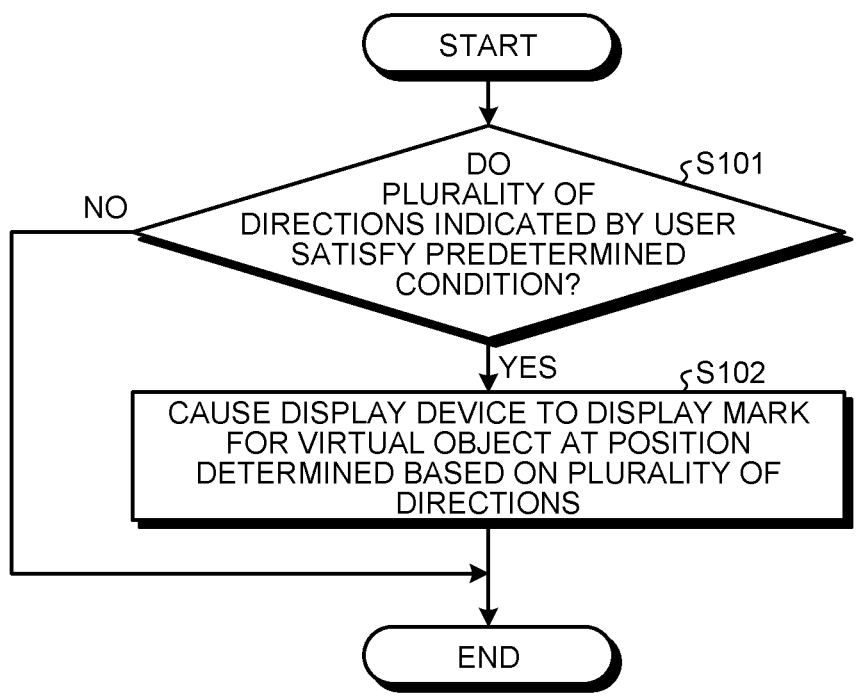
FIG. 10 is a flowchart illustrating a procedure of information processing according to an embodiment of the present disclosure.

Next, a procedure of information processing according to the embodiment will be described with reference to FIG. 10. FIG. 10 is a flowchart illustrating a procedure of information processing according to the embodiment of the present disclosure. Specifically, FIG. 10 is a flowchart illustrating a procedure of decision processing by the information processing apparatus 100.

As illustrated in FIG. 10, the information processing apparatus 100 determines whether a plurality of directions indicated by the user satisfy a predetermined condition (Step S101). For example, it is determined whether two directions indicated by the user satisfy a predetermined condition.

In a case where the plurality of directions indicated by the user satisfy the predetermined condition (Step S101: Yes), the information processing apparatus 100 causes the display device to display a mark for a virtual object at a position determined on the basis of the plurality of directions (Step S102). For example, in a case where the two directions indicated by the user satisfy a predetermined condition, the information processing apparatus 100 causes the display device 10 to display a mark for a virtual object at a position determined on the basis of the two directions.

In a case where the plurality of directions indicated by the user do not satisfy the predetermined condition (Step S101: No), the information processing apparatus 100 ends the processing without causing the display device to display the mark.

[1-5. Intersection Display]

Next, the intersection display will be described in detail with reference to FIGS. 11, 12A, 12B, 12C, 13A, 13B, and 13C.

[1-5-1. Procedure Related to Intersection Display]

Figure 11:
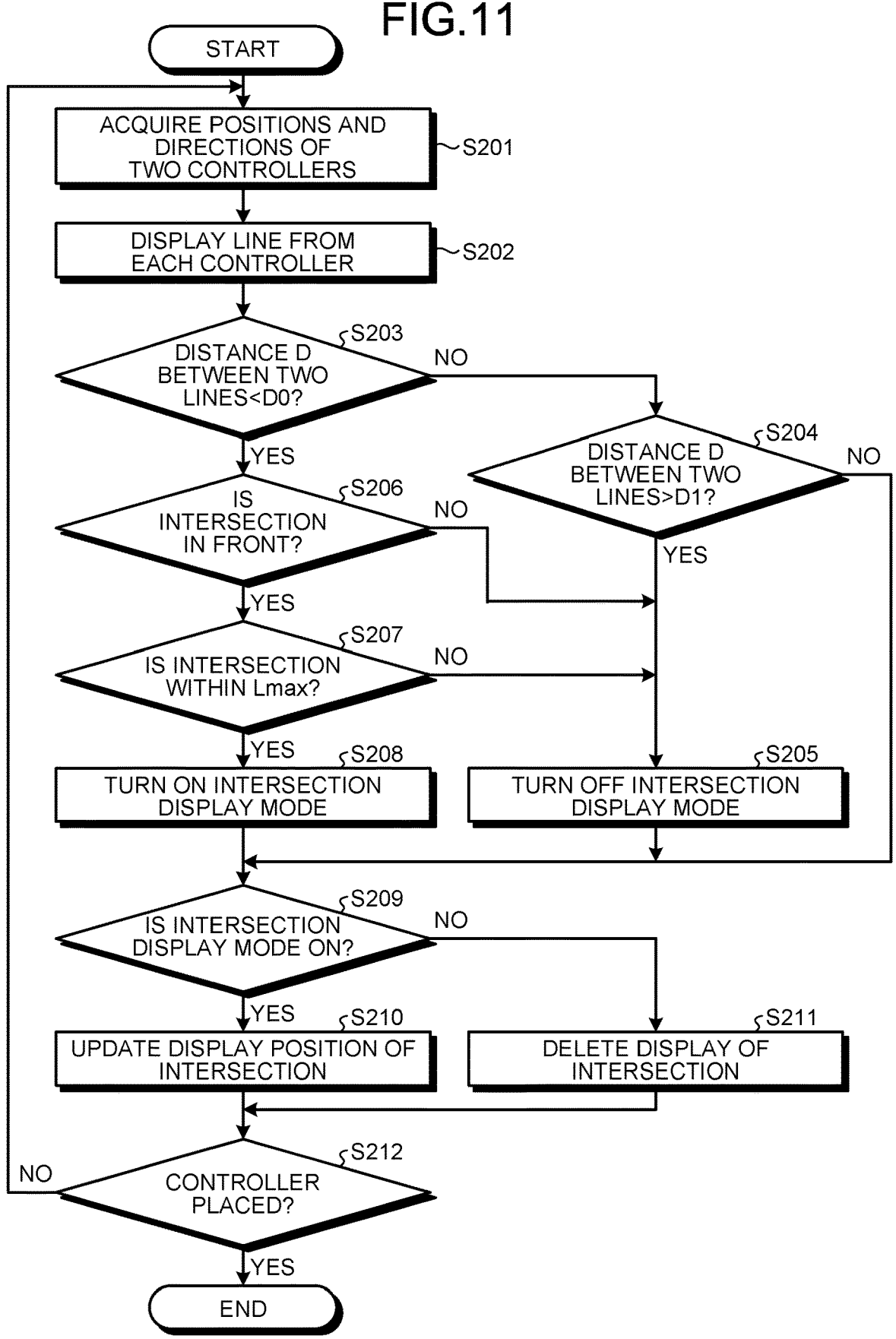
FIG. 11 is a flowchart illustrating a procedure related to intersection display of the present disclosure.

First, a procedure related to intersection display will be described with reference to FIG. 11. FIG. 11 is a flowchart illustrating a procedure related to intersection display of the present disclosure. Note that, in the following description, the information processing system 1 will be described as a main body of processing, but each processing illustrated in FIG. 11 may be performed by any device included in the information processing system 1 such as the information processing apparatus 100 or the display device 10 according to the device configuration of the information processing system 1. In FIG. 11, a case where the instruction component is two controllers will be described as an example.

The information processing system 1 acquires the positions and directions of the two controllers (Step S201). For example, the information processing apparatus 100 acquires information indicating the positions and directions of the first controller 20A and the second controller 20B.

The information processing system 1 displays a line from each controller (Step S202). For example, the information processing apparatus 100 controls display on the display device 10 such that lines are displayed from the first controller 20A and the second controller 20B.

The information processing system 1 determines whether the distance D between the two lines is less than the threshold D0 (Step S203). For example, the information processing apparatus 100 determines whether the distance D between the line LN1 of the first controller 20A and the line LN2 of the second controller 20B is less than the threshold D0.

In a case where the distance D between the two lines is not less than the threshold D0 (Step S203: No), the information processing system 1 determines whether the distance D between the two lines is larger than the threshold D1 (Step S204). For example, in a case where the distance D between the line LN1 of the first controller 20A and the line LN2 of the second controller 20B is equal to or larger than the threshold D0, the information processing apparatus 100 determines whether the distance D is larger than the threshold D1.

In a case where the distance D between the two lines is not larger than the threshold D1 (Step S204: No), the information processing system 1 executes the processing of Step S209. That is, in a case where the distance D between the two lines is equal to or less than the threshold D1, the information processing system 1 maintains ON when the intersection display mode is ON, maintains OFF when the intersection display mode is OFF, and executes the processing of Step S209. For example, in a case where the distance D between the line LN1 of the first controller 20A and the line LN2 of the second controller 20B is equal to or less than the threshold D1, the information processing apparatus 100 executes the processing of Step S209.

When the distance D between the two lines is larger than the threshold D1 (Step S204: Yes), the information processing system 1 turns off the intersection display mode (Step S205), and then executes the processing of Step S209. For example, in a case where the distance D between the two lines is larger than the threshold D1, the information processing apparatus 100 changes to OFF if the intersection display mode is ON, maintains OFF if the intersection display mode is OFF, and executes the processing of Step S209.

In a case where the distance D between the two lines is less than the threshold D0 (Step S203: Yes), the information processing system 1 determines whether the intersection is in front (Step S206). For example, in a case where the distance D between the two lines is less than the threshold D0, the information processing apparatus 100 determines whether the intersection IS1 is in front of the first controller 20A. For example, in a case where the distance D between the two lines is less than the threshold D0, the information processing apparatus 100 may determine whether the intersection IS1 is in front of the second controller 20B.

In a case where the intersection is not in front (Step S206: No), the information processing system 1 turns off the intersection display mode (Step S205), and then executes the processing of Step S209. For example, in a case where the intersection IS1 is not in front of the first controller 20A, the information processing apparatus 100 changes to OFF if the intersection display mode is ON, maintains OFF if the intersection display mode is OFF, and executes the processing of Step S209.

In a case where the intersection is in front (Step S206: Yes), the information processing system 1 determines whether the intersection is within Lmax (Step S207). For example, in a case where the intersection IS1 is in front of the first controller 20A, the information processing apparatus 100 determines whether a distance from the first controller 20A to the intersection IS1 is within the threshold Lmax.

If the intersection is not within Lmax (Step S207: No), the information processing system 1 turns off the intersection display mode (Step S205), and then executes the processing of Step S209. For example, in a case where the distance from the first controller 20A to the intersection IS1 is larger than the threshold Lmax, the information processing apparatus 100 changes to OFF if the intersection display mode is ON, maintains OFF if the intersection display mode is OFF, and executes the processing of Step S209.

When the intersection is within Lmax (Step S207: Yes), the information processing system 1 turns on the intersection display mode (Step S208). For example, in a case where the distance from the first controller 20A to the intersection IS1 is within the threshold Lmax, the information processing apparatus 100 turns on the intersection display mode.

In addition, the information processing system 1 determines whether the intersection display mode is ON (Step S209). For example, the information processing apparatus 100 determines whether the intersection display mode in the intersection displaying information storage unit 124 (see FIG. 8) is ON.

When the intersection display mode is ON (Step S209: Yes), the information processing system 1 updates a display position of the intersection (Step S210). For example, in a case where the intersection display mode is ON, the information processing apparatus 100 displays the intersection in a case where the intersection is not displayed, and updates the display position of the intersection in a case where the intersection is being displayed.

When the intersection display mode is not ON (Step S209: No), the information processing system 1 deletes the display of the intersection (Step S211). For example, in a case where the intersection display mode is OFF, the information processing apparatus 100 maintains the intersection non-display in a case where the intersection is non-display, and deletes the display of the intersection in a case where the intersection is being displayed.

In addition, the information processing system 1 determines whether the controller is placed (Step S212). For example, the information processing apparatus 100 determines whether the user has placed the first controller 20A or the second controller 20B.

In a case where it is determined that the controller has been placed (Step S212: Yes), the information processing system 1 ends the processing. For example, in a case where it is determined that the user has placed the first controller 20A or the second controller 20B, the information processing apparatus 100 ends the processing.

In a case where it is not determined that the controller has been placed (Step S212: No), the information processing system 1 returns to Step S201 and repeats the processing. For example, in a case where it is determined that the user has not placed the first controller 20A or the second controller 20B, the information processing apparatus 100 returns to Step S201 and repeats the processing.

[1-5-2. Intersection Display Mode]

Figure 12A:
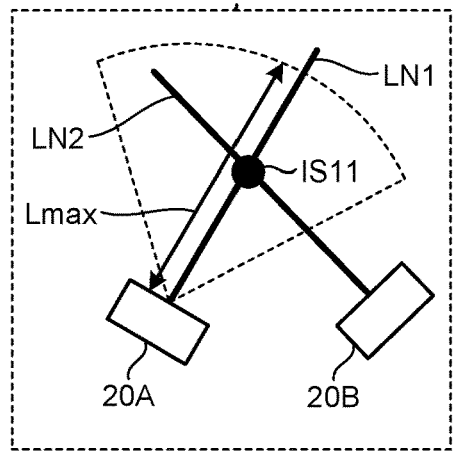
FIG. 12A is a view illustrating an example of an intersection display mode of the present disclosure.
Figure 12B:
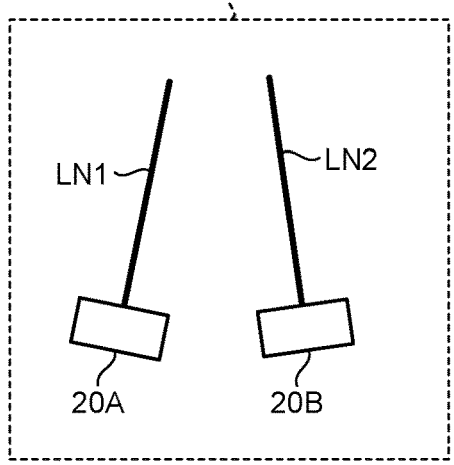
FIG. 12B is a view illustrating an example of an intersection display mode of the present disclosure.
Figure 12C:
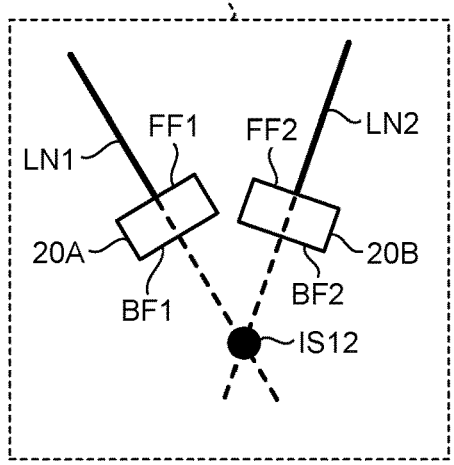
FIG. 12C is a view illustrating an example of an intersection display mode of the present disclosure.

Next, the intersection display mode will be described with reference to FIGS. 12A, 12B, and 12C. FIGS. 12A, 12B, and 12C are diagrams illustrating an example of the intersection display mode of the present disclosure. Each of FIGS. 12A, 12B, and 12C illustrate an example in which the intersection display mode is ON or OFF. Specifically, FIG. 12A illustrates an example when the intersection display mode is ON. Each of FIGS. 12B and 12C illustrates an example in which the intersection display mode is OFF.

First, a case where the intersection display mode is ON will be described with reference to FIG. 12A. In FIG. 12A, since the distance D between the two lines LN1 and LN2 is less than the threshold D0, the information processing apparatus 100 calculates the intersection IS11 of the two lines LN1 and LN2. The information processing apparatus 100 determines whether the distance from the first controller 20A to the intersection IS11 is within the threshold Lmax. The threshold Lmax is used to determine whether the distance is within a range in which an intersection is displayed.

Here, the information processing apparatus 100 turns on the intersection display mode in a case where a first condition that the distance D between the two lines is less than the threshold D0, a second condition that the intersection is in front of the controller 20, and a third condition that the distance from the controller 20 to the intersection is within the threshold Lmax are satisfied. In FIG. 12A, the information processing apparatus 100 turns on the intersection display mode because the distance D between the two lines LN1 and LN2 is less than the threshold D0, the intersection IS11 is in front of the first controller 20A, and the distance from the first controller 20A to the intersection IS11 is within the threshold Lmax. Note that, although the case where the first controller 20A satisfies the condition has been described above, the information processing apparatus 100 may turn on the intersection display mode in a case where both the first controller 20A and the second controller 20B satisfy the condition. In addition, the front side of the controller 20 herein corresponds to a direction facing one side among directions of axes (directions) passing through predetermined positions (for example, the origin 21A and the origin 21B in FIG. 28) of the controller 20.

For example, when the controller 20 emits laser light, a side from which the laser light is emitted corresponds to the front. In addition, which side of the controller 20 is set to the front may be appropriately set by the shape of the controller 20, the usage, or the like for the user. For example, when the user holds, a side facing a target when the user points to the target may be set as the front side of the controller 20. For example, a front side of the first controller 20A corresponds to a side that a front face FF1 in FIG. 12C faces. In addition, in the case of the first controller 20A, a side facing a back face BF1 on an opposite side to the front face FF1 corresponds to a rear side. For example, a front side of the second controller 20B corresponds to a side facing a front face FF2 in FIG. 12C. In the case of the second controller 20B, a side facing a back face BF2 opposite to the front face FF1 corresponds to the rear side.

For example, the information processing apparatus 100 may specify which direction is in front of the controller 20 by the controller information indicating the position and direction of the controller 20. Furthermore, the information processing apparatus 100 may be set such that the line extends only in front of the controller 20. For the expression of lines and the like, various techniques described in the following documents and the like may be used.

OutlinAR: an assisted interactive model building system with reduced computational effort <http://citeseerx.ist.psu.edu/viewdoc/download?doi=10.1.1.212.9258&rep=rep1&type=pdf>

Next, a case where the intersection display mode is OFF according to the distance D between the two lines will be described with reference to FIG. 12B. FIG. 12B illustrates a state after FIG. 12A in which the intersection display mode is ON, and illustrates a state in which the first controller 20A and the second controller 20B are adjusted such that the two lines LN1 and LN2 are separated. The information processing apparatus 100 determines whether the distance D between the lines LN1 and LN2 is larger than the threshold D1. In FIG. 12B, the information processing apparatus 100 determines that the distance D between the two lines LN1 and LN2 is larger than the threshold D1, and turns off the intersection display mode. That is, the information processing apparatus 100 changes the intersection display mode from ON to OFF.

Next, a case where the intersection display mode is OFF according to the distance D between the two lines will be described with reference to FIG. 12C. In FIG. 12C, since the distance D between the two lines LN1 and LN2 is less than the threshold D0, the information processing apparatus 100 calculates the intersection IS12 of the two lines LN1 and LN2. Here, in FIG. 12C, the front face FF1 of the first controller 20A and the front face FF2 of the second controller 20B face in directions away from each other. That is, the back face BF1 of the first controller 20A and the back face BF2 of the second controller 20B face directions approaching each other. Therefore, in FIG. 12C, the intersection IS12 is located on the rear side of the controller 20.

Therefore, the information processing apparatus 100 determines that the second condition that the intersection IS2 is in front of the controller 20 is not satisfied. In FIG. 12C, since there is no intersection IS12 in front of the first controller 20A, the information processing apparatus 100 turns off the intersection display mode. Although the case where the first controller 20A satisfies the condition has been described above, the information processing apparatus 100 may turn off the intersection display mode in a case where at least one of the first controller 20A and the second controller 20B does not satisfy the condition. For example, in a case where the intersection display mode is ON and the state of FIG. 12B or 12C is entered, the information processing apparatus 100 exits from the intersection display mode and changes the intersection display mode from ON to OFF.

As described above, the information processing apparatus 100 displays the lines indicating the directions of the controllers 20 from the positions of the two controllers 20 held by the user. In addition, the information processing apparatus 100 points a position desired to be designated by the two controllers and creates an intersection. The information processing apparatus 100 enters the intersection display mode when the two lines are closer than a certain distance (threshold D0) in front of the controllers 20. Furthermore, the information processing apparatus 100 displays an intersection at a midpoint of the nearest points of the lines. Furthermore, when the controllers are parallel to each other, the intersection becomes infinite, and thus the information processing apparatus 100 sets in advance the maximum distance (threshold Lmax) from the controller to the intersection position. In a case where the distance between the two lines exceeds the threshold D1 or comes closer than the threshold D0 behind the controllers 20 to form an intersection, the information processing apparatus 100 exits from the intersection display mode.

[1-5-3. Intersection Display Pattern]

Figure 13A:
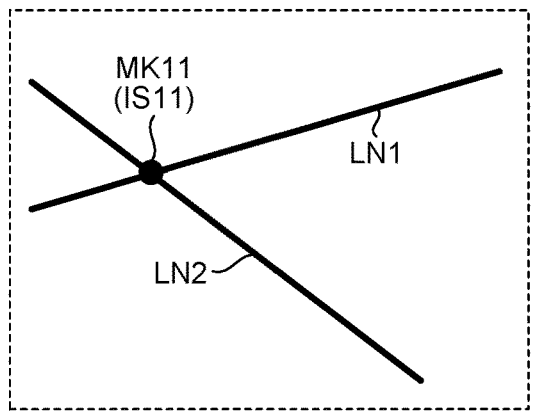
FIG. 13A is a view illustrating an example of a pattern of intersection display of the present disclosure.
Figure 13B:
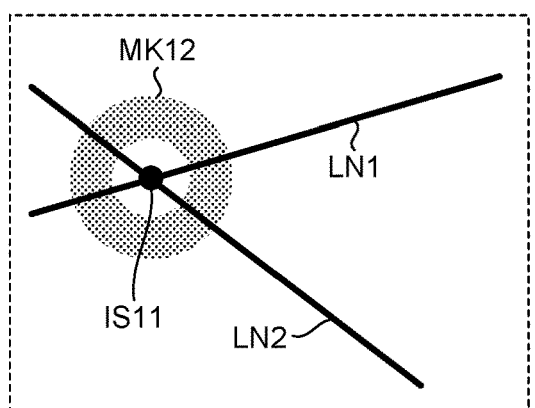
FIG. 13B is a view illustrating an example of a pattern of intersection display of the present disclosure.
Figure 13C:
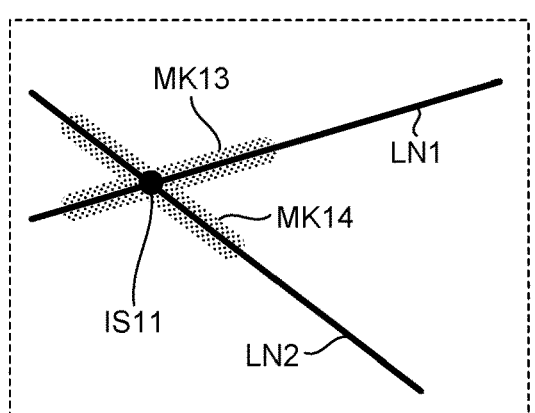
FIG. 13C is a view illustrating an example of a pattern of intersection display of the present disclosure.

Next, a pattern of intersection display will be described with reference to FIGS. 13A, 13B, and 13C. FIGS. 13A, 13B, and 13C are diagrams illustrating an example of a pattern of intersection display of the present disclosure. Each of FIGS. 13A, 13B, and 13C illustrate an example of a display pattern of an intersection by various marks. FIGS. 13A, 13B, and 13C illustrate a state in which the intersection display mode is ON.

First, a display pattern of an intersection by a point mark will be described with reference to FIG. 13A. In FIG. 13A, by displaying a dotted mark MK11 at a position overlapping the intersection IS11, the intersection IS11 is displayed. The information processing apparatus 100 causes the display device 10 to display the mark MK11 as the intersection IS11. In this manner, the information processing system 1 may indicate a point (intersection) with a sphere or light.

Next, a display pattern of the intersection by a ring mark will be described with reference to FIG. 13B. In FIG. 13B, a mark MK12 is displayed so that the center of the annular mark MK12 overlaps the intersection IS11, whereby the mark MK12 is displayed so that the position of the intersection IS11 can be easily seen. The information processing apparatus 100 controls the display device 10 so as to display the mark MK12 of the ring (circular ring) with an empty center with a position of the intersection IS11 as a center.

Next, a display pattern of the intersection by setting portions within a predetermined range from the intersection (hereinafter, also referred to as "neighboring portions") of the lines to a display pattern different from other portions will be described with reference to FIG. 13C. In FIG. 13C, marks MK13 and MK14 are displayed in the portions of the lines LN1 and LN2 near the intersection IS11, so that the marks MK13 and MK14 are displayed such that a portion of the intersection IS11 is easily recognized. The information processing apparatus 100 causes the display device 10 to display the mark MK13 in a superimposed manner in a portion in the vicinity of the line LN1 and display the mark MK14 in a superimposed manner in a portion in the vicinity of the line LN2. The marks MK13 and MK14 are not limited to figures and indicate that a display pattern is different from that of other portions. For example, the marks MK13 and MK14 may be in a display pattern of being illuminated or may be in a display pattern of being changed to a color different from the other portions of the lines LN1 and LN2. In addition, the marks MK13 and MK14 may be displayed in a display pattern in which the color becomes dark when approaching and becomes light when moving away.

[1-6. Master-Subordinate Relationship]

Note that there may be a master-subordinate relationship between the instruction components. As described above, the plurality of instruction components may include a main component (main instruction component) and a subordinate component (subordinate instruction component). This point will be described with reference to FIGS. 14 and 15.

[1-6-1. Controller and Line of Sight]

First, a procedure related to intersection display in a case where there is a master-subordinate relationship between a controller and an instruction component that is a line of sight will be described with reference to FIG. 14. In this manner, the instruction component indicating a direction may be a combination of the controller and another type of instruction component.

Figure 14:
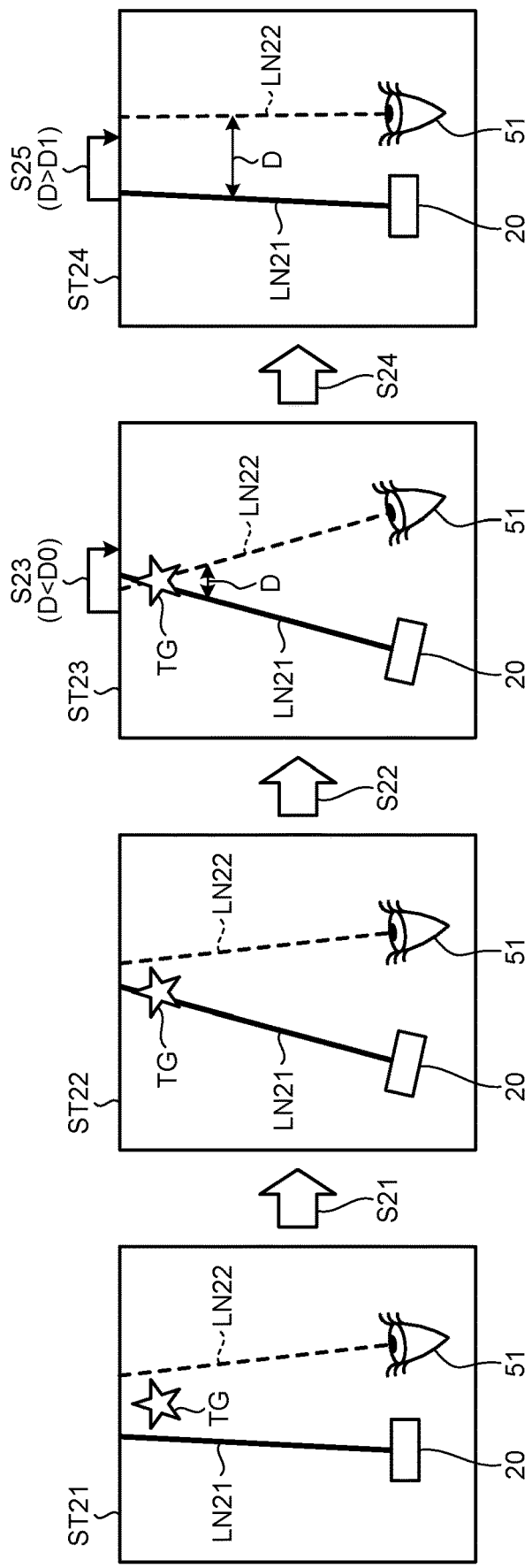
FIG. 14 is a view illustrating an example of intersection display using a line of sight of the present disclosure.

FIG. 14 is a diagram illustrating an example of intersection display using a line of sight according to the present disclosure. Specifically, FIG. 14 illustrates a case where the controller 20 held by the user 50 is the main instruction component, and the line of sight of eyes 51 of the user 50 is the subordinate instruction component. Note that, in the following description, the information processing system 1 will be described as a main body of processing, but each processing illustrated in FIG. 14 may be performed by any device included in the information processing system 1 such as the information processing apparatus 100 or the display device 10 according to the device configuration of the information processing system 1.

Each of states ST21 to ST24 illustrated in FIG. 14 indicates a change in the line LN21 or the line of sight LN22 (hereinafter simply referred to as "line LN22") corresponding to a change in direction based on the adjustment of the controller 20 or the eyes 51 (line of sight) by the user 50. In FIG. 14, a position desired to be pointed by the user 50 is indicated by a target TG, but the target TG is illustrated for description and is not information displayed on the display device 10. FIG. 14 illustrates a case where a coordinate position (target TG) in the air is designated.

The state ST21 illustrated in FIG. 14 indicates, for example, a state in which the user 50 holds one controller 20 and the line LN21 is displayed from the controller 20. The information processing apparatus 100 causes the display device 10 to display the line LN21 from the controller 20 held by the user 50.

The user 50 adjusts the controller 20 to designate a desired position (Step S21). As a result, the user 50 attempts to point to a position desired to be designated by the line LN21 of the controller 20. The state ST22 illustrated in FIG. 14 corresponds to a state in which the line LN21 passes through the position of the target TG by the adjustment of the controller 20 by the user 50. The information processing apparatus 100 acquires controller information indicating the position and direction of the controller 20 corresponding to the state ST22 from the controller 20, and causes the display device 10 to display the line LN21 on the basis of the acquired controller information.

Furthermore, the user 50 directs the eyes 51 (line of sight) toward the target TG (Step S22). As a result, the user 50 causes the eyes 51 (line of sight) to face the target TG. The state ST23 illustrated in FIG. 14 corresponds to a state in which the line LN22 corresponding to the eye 51 (line of sight) passes through the position of the target TG by the adjustment of the eye 51 (line of sight) by the user 50. Note that the line LN22 indicated by a dotted line in FIG. 14 may not be displayed. That is, the information processing apparatus 100 may or may not cause the display device 10 to display the line LN22.

Then, the information processing apparatus 100 determines whether the distance D between the line LN21 of the controller 20 and the line LN22 of the eye 51 (line of sight) is less than the threshold D0. In the state ST2 illustrated in FIG. 14, since the distance D between the line LN21 of the controller 20 and the line LN22 of the eye 51 (line of sight) is less than the threshold D0, the information processing apparatus 100 determines to display the intersection (Step S23).

In this manner, the information processing apparatus 100 enters the intersection display mode in a case where the distance D between the line LN21 of the controller 20 and the line LN22 of the eye 51 (line of sight) is within a certain distance (threshold D0). In addition, when (the line or the like of) the controller 20 becomes parallel, the intersection becomes infinite, and thus, the maximum distance (threshold Lmax) of the intersection position is set in advance. In addition, since the line of sight constantly moves slightly, the information processing apparatus 100 causes the display device 10 to display the intersection at the nearest point on the line LN21 of the controller 20. In addition, since focusing cannot be performed in a place where there is nothing due to a human visual adjustment mechanism, the information processing system 1 first displays a line of the controller 20 so that the user 50 can designate a position by a line of sight. As described above, even if the direction of the controller 20 becomes parallel to make the intersection, the user 50 can operate without losing sight of the intersection because the intersection does not go far.

Then, the user 50 adjusts the controller 20 and the eyes 51 (line of sight) (Step S24). The user 50 adjusts the controller 20 and the eyes 51 (line of sight) such that the two lines LN21 and LN22 are separated from the target TG.

Furthermore, the information processing apparatus 100 determines whether the distance D between the two lines LN21 and LN22 is larger than the threshold D1. In the state ST24 illustrated in FIG. 14, since the distance D between the line LN21 of the controller 20 and the line LN22 of the eye 51 (line of sight) is larger than the threshold D1, the information processing apparatus 100 determines to hide the intersection (Step S25). Then, the information processing apparatus 100 turns off the intersection display mode. As described above, in a case where the distance D between the two lines LN21 and LN22 of the controller 20 and the eye 51 (line of sight) exceeds the threshold D1, the information processing apparatus 100 exits from the intersection display mode. Furthermore, similarly to FIG. 12C, in a case where the intersection is located behind the controller 20, the information processing apparatus 100 exits from the intersection display mode. In addition, in a case where the distance D is closer than the threshold D0 behind the controller 20 and an intersection is formed, the mode exits from the intersection display mode. In a case where the intersection is located behind the controller 20, the information processing apparatus 100 turns off the intersection display mode. In addition, the information processing system 1 ends the processing when the user 50 places the controller 20.

Note that the values of the threshold D0 and the threshold D1 may be changed according to a combination of types (controller, line of sight, etc.) of instruction components indicating directions.

[1-6-2. Pointing and Line of Sight]

As noted above, the instruction components may be of various types. For example, the instruction component may not include the controller 20. For example, a finger 52 (see FIG. 26) or the eye 51 (line of sight) may be used as the instruction component. This point will be described. Note that FIG. 14 is similar except that the instruction component is changed from the controller 20 to the finger 52 of the user 50, and thus description thereof is appropriately omitted.

As described above, in a case where a hand (finger) is used to give an instruction on a direction, the information processing system 1 may detect a mode (position, direction, or the like) of finger pointing of the user by a predetermined sensor that detects a shape or the like of the hand of the user. For example, the information processing system 1 may detect a mode (position, direction, or the like) of finger pointing of the user by an image sensor.

First, the user 50 makes the hand have a shape pointing in a direction. As a result, a line is displayed from the hand (finger 52) of the user 50. Then, the user 50 points to a position desired to be designated by hand. The information processing system 1 enters the intersection display mode in a case where a distance between the line of the hand and a straight line of the line of sight is within the certain distance (threshold D0). In a case where the distance between the two lines of the hand and the line of sight exceeds the threshold D1 or the distance is closer than the threshold D0 behind the hand and an intersection is formed, the information processing system 1 exits from the intersection display mode. In addition, when the shape indicating the direction of the hand is stopped, the information processing system 1 ends the processing.

[1-6-3. Intersection Display Example]

Figure 15:
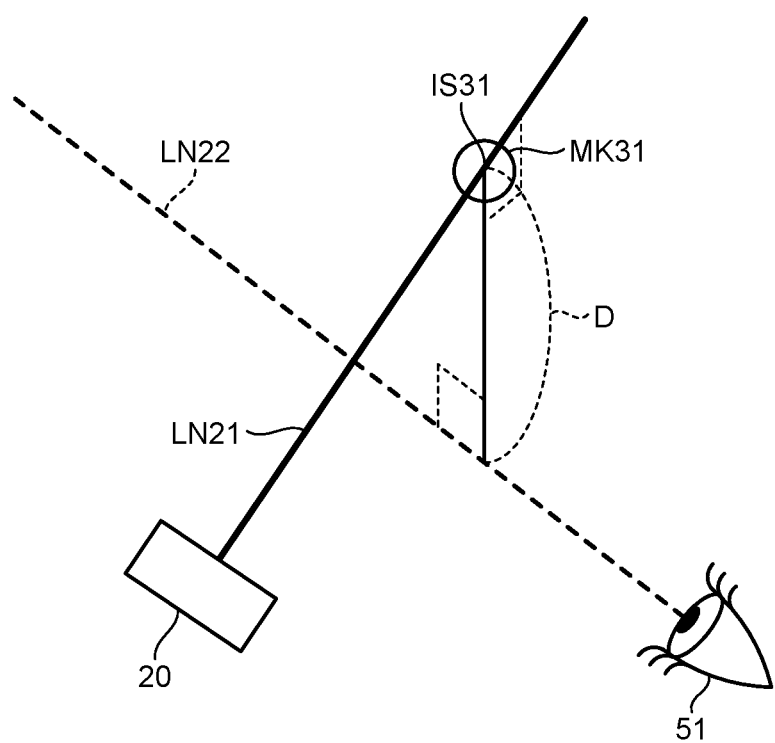
FIG. 15 is a view illustrating an example of intersection display in a case where there is a master-subordinate relationship according to the present disclosure.

Next, intersection display in a case where there is a master-subordinate relationship between instruction components will be described with reference to FIG. 15. FIG. 15 is a diagram illustrating an example of intersection display in a case where there is a master-subordinate relationship according to the present disclosure. Specifically, FIG. 15 illustrates an example of a case where the information processing apparatus 100 causes the display device 10 to display an intersection at the nearest point on the line LN21 of the controller 20.

In FIG. 15, the information processing apparatus 100 calculates the nearest point of the line LN21 as an intersection IS31. For example, the information processing apparatus 100 calculates, as the intersection IS31, an end point (nearest point) on a line LN21 side to be a calculation target of the distance D between the line LN21 and the line LN22. Then, the information processing apparatus 100 causes the display device 10 to display a mark MK31 at the position of the intersection IS31 on the line LN21. As described above, in a case where there is a master-subordinate relationship between the instruction components, the information processing apparatus 100 may set a position corresponding to the line of the main instruction component as the intersection.

[1-7. Virtual Object]

Here, arrangement of virtual objects will be described with reference to FIGS. 16 to 19.

[1-7-1. Arrangement of a Virtual Object]

Figure 16:
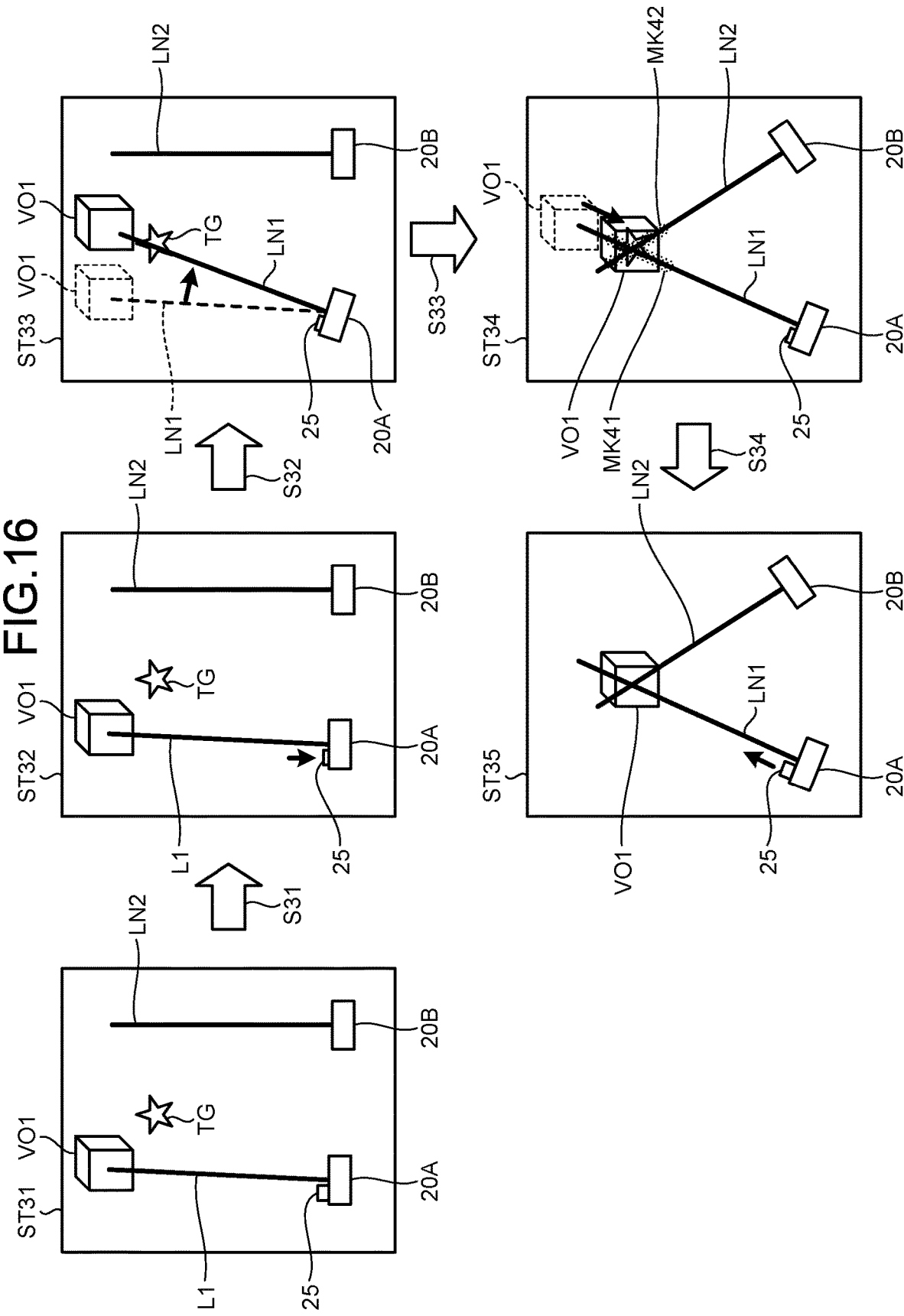
FIG. 16 is a view illustrating an example of an arrangement of a virtual object of the present disclosure.

First, a procedure related to arrangement of a virtual object will be described with reference to FIG. 16. FIG. 16 is a diagram illustrating an example of an arrangement of a virtual object of the present disclosure. Specifically, FIG. 16 is a diagram illustrating processing for arranging a virtual object VO1 at a desired position. In addition, in FIG. 17, a position where the user 50 desires to arrange the virtual object VO1 is illustrated as a target TG, but the target TG is illustrated for description and is not information displayed on the display device 10.

Each of states ST31 to ST34 illustrated in FIG. 16 indicates a change in the line LN1, the line LN2, or the virtual object VO1 corresponding to a change in direction based on the adjustment of the controller 20 by the user 50. The example of FIG. 16 illustrates a case where the first controller 20A has a button 25. Note that descriptions of points similar to those in FIG. 2 will be omitted as appropriate.

As illustrated in the state ST31 of FIG. 16, the user 50 points to the virtual object VO1 by the line LN1 of the first controller 20A (Step S31). In the state ST31 illustrated in FIG. 16, the virtual object VO1 to be selected by the first controller 20 (first controller 20A) is pointed. The information processing apparatus 100 acquires controller information indicating the position and direction of the controller 20 corresponding to the state ST31 from the controller 20, and causes the display device 10 to display the lines LN1 and LN2 on the basis of the acquired controller information.

In the state ST32 illustrated in FIG. 16, the user 50 presses the button 25 of the first controller 20A to select the virtual object VO1. As a result, the information processing apparatus 100 determines that the first controller 20A has grasped the virtual object VO1. For example, the information processing apparatus 100 associates the virtual object VO1 with the first controller 20A and changes a grasping flag of the first controller 20A. As a result, the information processing apparatus 100 controls the display device 10 such that the virtual object VO1 is arranged (fixed) on the line LN1 of the first controller 20A and moves in conjunction with the movement of the line LN1.

The user 50 adjusts the first controller 20A to designate a desired position (Step S32). The user 50 points in a direction of a position desired to be designated by the first controller 20A. As illustrated in the state ST33 of FIG. 16, the user 50 adjusts the first controller 20A such that the line LN1 passes through the target TG. In the state ST33 of FIG. 16, since the virtual object VO1 is fixed on the line LN1 of the first controller 20A, the position of the virtual object VO1 is also changed according to a change of the position of the line LN1. In the state ST33 of FIG. 16, the position of the virtual object VO1 moves in a direction approaching the second controller 20B (rightward direction) according to the change of the position of the line LN1.

Note that the information processing apparatus 100 controls the display device 10 to change and display a display pattern of the virtual object while the position of the virtual object is moving. For example, when moving and arranging the virtual object, the information processing apparatus 100 may weaken the display of the moving virtual object. For example, the information processing apparatus 100 weakens the display of the moving virtual object by increasing the transmittance of the moving virtual object. As described above, when the virtual object is moved and arranged, by weakening the display of the virtual object being moved, the user can move the virtual object while confirming the arrangement and positional relationship with an object in the real world and a virtual object arranged around.

Furthermore, for example, when moving and arranging the virtual object, the information processing apparatus 100 may enhance the display of the virtual object being moved. As described above, by enhancing the display of the virtual object that is moving, the user can make the virtual object stand out (enhance visibility) in a similar virtual object or can easily arrange the virtual object in a depth direction.

Then, the user 50 adjusts the second controller 20B to designate a desired position (Step S33). The user 50 brings the second controller 20 (second controller 20B) close to a position (target TG) to be moved on the first controller 20 (first controller 20A) to create an intersection display mode. As illustrated in the state ST34 of FIG. 16, the user 50 adjusts the second controller 20B such that the line LN2 passes through a desired position (corresponding to the target TG) on the line LN1 of the first controller 20A.

Then, the information processing apparatus 100 determines whether the distance D between the line LN1 of the first controller 20A and the line LN2 of the second controller 20B is less than the threshold DO. In the state ST32 illustrated in FIG. 16, since the distance D between the line LN1 of the first controller 20A and the line LN2 of the second controller 20B is less than the threshold DO, the information processing apparatus 100 determines to turn on the intersection display mode. For example, as in FIGS. 12A, 12B, and 12C, the information processing apparatus 100 determines to turn on the intersection display mode because the intersection is located in the range of the distance Lmax in front of the first controller 20A. The information processing apparatus 100 causes the display device 10 to display a mark MK41 in a superimposed manner in a portion in the vicinity of the line LN1 and display a mark MK42 in a superimposed manner in a portion in the vicinity of the line LN2. In this manner, the user 50 adjusts the position of the intersection by the two controllers 20. Furthermore, the information processing apparatus 100 calculates the intersection such that the intersection moves on the line LN1 of the first controller (first controller 20A). In addition, when the controllers are parallel, the distance becomes infinite, and thus the maximum distance is set in advance, which will be described later.

Then, the information processing apparatus 100 causes the display device 10 to display the virtual object VO1 at the position of the intersection between the line LN1 and the line LN2. As a result, the virtual object VO1 moves to the position of the intersection of the line LN1 and the line LN2.

The user 50 who has arranged the virtual object VO1 at the position desired to be arranged releases the finger from the button 25 of the first controller 20A and arranges the virtual object VO1 at the designated position (Step S34). As a result, the information processing apparatus 100 determines that the grasping of the virtual object VO1 by the first controller 20A has been released. Note that, in a case where the virtual object VO1 is a virtual object following gravity, such as a plant or a chair, the information processing apparatus 100 arranges the virtual object on a desk or a floor. Furthermore, in a case where the virtual object VO1 is a virtual object that does not follow gravity, such as a ghost or a bird, the information processing apparatus 100 arranges the virtual object on a space. For example, the information processing apparatus 100 executes any of the above processes according to a gravity flag of the virtual object VO1.

Furthermore, when an intersection is created far away, a position of the virtual object rapidly changes. Therefore, the information processing apparatus 100 may create an intersection within a certain range from the controller 20, but details of this point will be described later. Furthermore, for a certain range, the distance may be changed between the front and the back of the virtual object. Furthermore, the information processing apparatus 100 may cause the display device 10 to display a line of the controller 20 grasping the virtual object (hereinafter also referred to as a "grasping line") and a line of the controller 20 not grasping the virtual object (hereinafter also referred to as a "non-grasping line") in different display patterns. For example, the information processing apparatus 100 may change the appearance such as the color and thickness of the grasping line and the non-grasping line to make it easy to understand which one the grasping line and the non-grasping line are grasping. For example, the information processing apparatus 100 may set the color of the grasping line to red and the color of the non-grasping line to black. For example, the information processing apparatus 100 may make the grasping line thicker than the non-grasping line.

Furthermore, as described above, various display patterns may be used during the movement of the virtual object. For example, the information processing apparatus 100 may display the virtual object as it is even while moving. The information processing apparatus 100 displays the virtual object as it is in a case where it is desired to arrange the virtual object while confirming the arrangement and positional relationship with an object in the real world or a virtual object arranged around.

Furthermore, for example, the information processing apparatus 100 may weaken the display of the virtual object being moved. For example, the information processing apparatus 100 displays only an outline of the virtual object or makes it translucent. The information processing apparatus 100 displays an outline of the virtual object or makes it translucent in a case where it is desired to perform trajectory and position adjustment during movement while confirming arrangement and positional relationship with an object in the real world and a virtual object arranged around. For example, the information processing apparatus 100 may turn off the display of the virtual object. In this case, the information processing apparatus 100 may display only the intersection. The information processing apparatus 100 puts emphasis on the trajectory and position adjustment during movement, and deletes the display of the virtual object in a case where it is desired to make the movement easily viewable.

Furthermore, for example, the information processing apparatus 100 may enhance the display of the virtual object being moved. The information processing apparatus 100 may enhance the hue or increase the luminance value. The information processing apparatus 100 may be combined with additional display such as an icon. In a case where similar objects are arranged, the information processing apparatus 100 highlights the selected virtual object for easy understanding. Furthermore, in a case where it is desired to arrange the virtual objects at the back of the place where the virtual objects are arranged, the information processing apparatus 100 makes it easy to arrange the virtual objects at the back of the virtual objects by suppressing the color tone or increasing the transmittance of other virtual objects.

[1-7-2. Arrangement Range of a Virtual Object]

Figure 17:
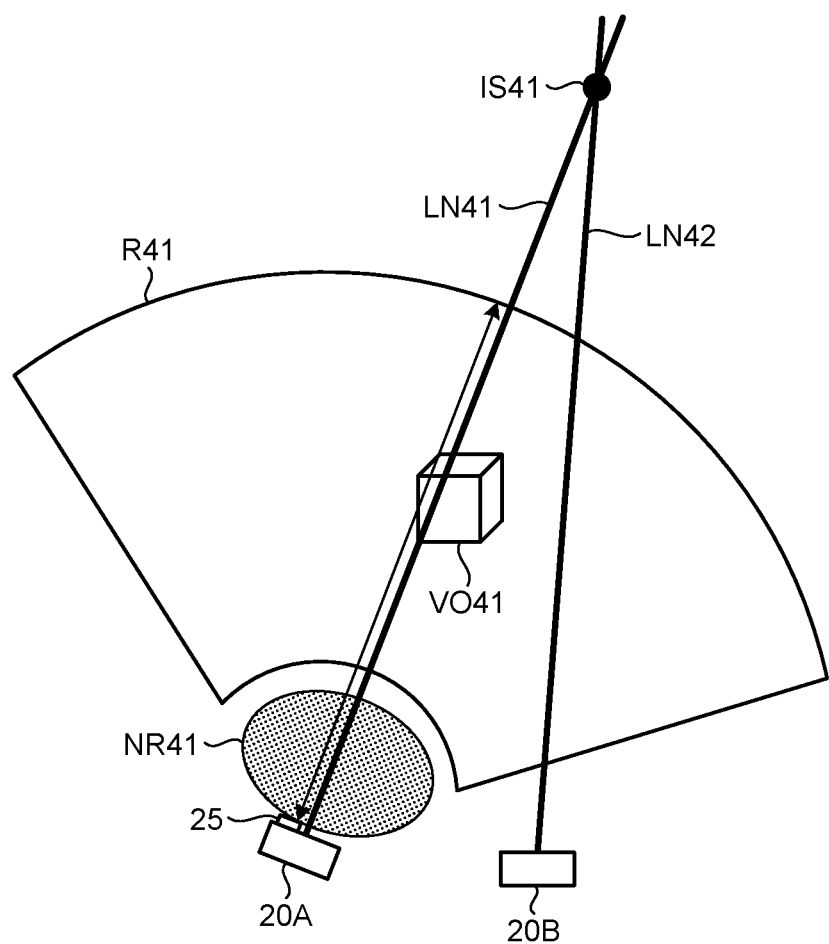
FIG. 17 is a view illustrating an example of an arrangement range of a virtual object of the present disclosure.

Next, an arrangement range of a virtual object will be described with reference to FIG. 17. FIG. 17 is a diagram illustrating an example of an arrangement range of a virtual object of the present disclosure. Note that descriptions of points similar to those in FIG. 16 will be omitted as appropriate.

As described above, in a case where the intersection is located far from the controller 20, the position of the virtual object rapidly changes. Therefore, the information processing apparatus 100 generates an intersection in a case where the intersection is within a certain distance from the controller 20. Furthermore, even if the position of the virtual object is too near, that is, too close to the controller 20, it is difficult to see the virtual object. Therefore, in a case where the position of the intersection is not in the vicinity of the controller 20, the information processing apparatus 100 generates the intersection.

In the example of FIG. 17, in a case where the calculated position of the intersection is within a predetermined range (range R41) from the first controller 20A, the information processing apparatus 100 generates the intersection. In a case where there is a position of the intersection in the range R41 excluding the vicinity NR41 of the first controller 20A and the distance of the first controller 20A, the information processing apparatus 100 generates an intersection. That is, the information processing apparatus 100 does not turn on the intersection display mode in a case where the position of the intersection is near the NR41 of the first controller 20A or far from the first controller 20A.

As described above, when the virtual object is moved, it is possible to prevent the virtual object from flying far with the direction of the controller being parallel, and a situation in which it is difficult for the controller to grasp the virtual object due to an intersection at hand does not occur. By limiting the range in which the intersection is displayed to the range R41, the information processing apparatus 100 can suppress the virtual object from flying far even in a case where the lines of the instruction components such as the controller 20 are parallel, and can suppress the virtual object from being difficult to grasp due to the intersection at hand of the user 50.

For example, when the two lines are parallel or close to parallel, the pointed position (intersection) is infinity or close to infinity, which causes a problem that an unintended position is obtained or the pointed position is not noticed. In addition, in a case where the position is designated far away, the position is displaced by a small movement, and thus there is a problem that it is difficult to designate the position. As described above, the information processing apparatus 100 can solve the above problems by limiting the range in which the intersection is displayed to the range R41.

[1-7-3. Arrangement Position with an Intersection]

Figure 18:
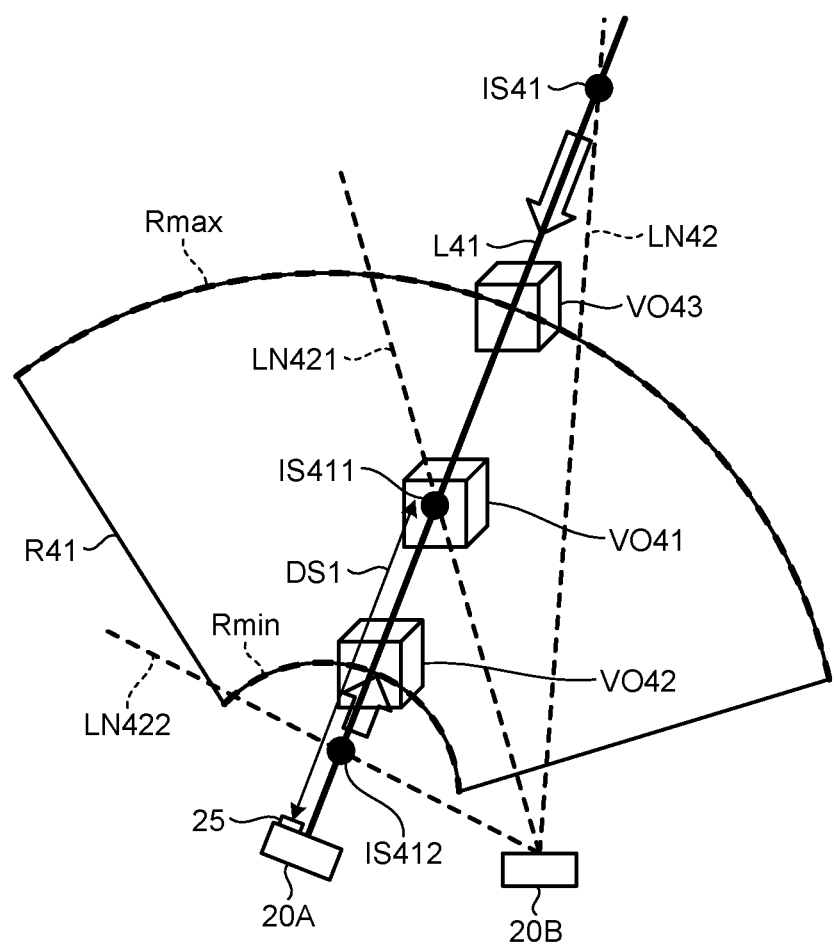
FIG. 18 is a view illustrating a relationship between an arrangement position of a virtual object and an intersection of the present disclosure.

Next, a relationship between an arrangement position of a virtual object and an intersection will be described with reference to FIG. 18. FIG. 18 is a diagram illustrating a relationship between an arrangement position of a virtual object and an intersection of the present disclosure. Note that descriptions of points similar to those in FIGS. 16 and 17 will be omitted as appropriate.

The information processing apparatus 100 determines a display position of the virtual object according to the distance (also referred to as "distance R") from the controller 20 to the intersection. In a case where the distance R is larger than the threshold Rmin and smaller than the threshold Rmax, the information processing apparatus 100 determines the position of the intersection (distance R) as the display position of the virtual object. As described above, in a case where the intersection (for example, the instruction position) is located between the first distance (threshold Rmin), which is the distance from the controller 20 to the first position, and the second distance (threshold Rmax), which is the distance from the controller 20 to the second position more distant than the first position, the information processing apparatus 100 arranges the virtual object at the position of the intersection (distance R).

In the example of FIG. 18, in a case where the intersection is an intersection IS411 between the line L41 of the first controller 20A and the line L421 of the second controller 20B, the information processing apparatus 100 arranges a virtual object VO41 at the position of the intersection IS411. For example, since the distance R (corresponding to a symbol DS1 in FIG. 18) between the first controller 20A and the intersection IS411 is larger than the threshold Rmin and smaller than the threshold Rmax, the information processing apparatus 100 causes the display device 10 to display the virtual object VO41 at the position of the intersection IS411.

Furthermore, in the example of FIG. 18, in a case where the intersection is an intersection IS412 between the line L41 of the first controller 20A and the line L422 of the second controller 20B, the information processing apparatus 100 arranges a virtual object VO42 at the position of the threshold Rmin. For example, since the distance R between the first controller 20A and the intersection IS412 is equal to or less than the threshold Rmin, the information processing apparatus 100 causes the display device 10 to display the virtual object VO42 at the position where the distance from the first controller 20A is the threshold Rmin on the line LN41. In a case where the intersection (for example, the instruction position) is equal to or less than the first distance (threshold Rmin), the information processing apparatus 100 causes the display device 10 to display the virtual object with the first position as the arrangement position.

As described above, in a case where the distance from the controller 20 to the intersection is equal to or less than the threshold Rmin, the information processing apparatus 100 sets the display position of the virtual object as the position of the threshold Rmin, and thus, it is possible to suppress that there is an intersection at hand of the user 50 and it is difficult to grasp the virtual object.

Furthermore, in the example of FIG. 18, in a case where the intersection is an intersection IS41 between the line L41 of the first controller 20A and the line L42 of the second controller 20B, the information processing apparatus 100 arranges a virtual object VO43 at the position of the threshold Rmax. For example, since the distance R between the first controller 20A and the intersection IS41 is equal to or greater than the threshold Rmax, the information processing apparatus 100 causes the display device 10 to display the virtual object VO43 at the position where the distance from the first controller 20A is the threshold Rmax on the line LN41. In a case where the intersection (for example, the instruction position) is greater than or equal to the second distance (threshold Rmax), the information processing apparatus 100 causes the display device 10 to display the virtual object with the second position as an arrangement position.

As described above, in a case where the distance from the controller 20 to the intersection is equal to or greater than the threshold Rmax, the information processing apparatus 100 can suppress the virtual object from flying far by setting the display position of the virtual object as the position of the threshold Rmax.

[1-7-4. Movement of a Virtual Object]

Figure 19:
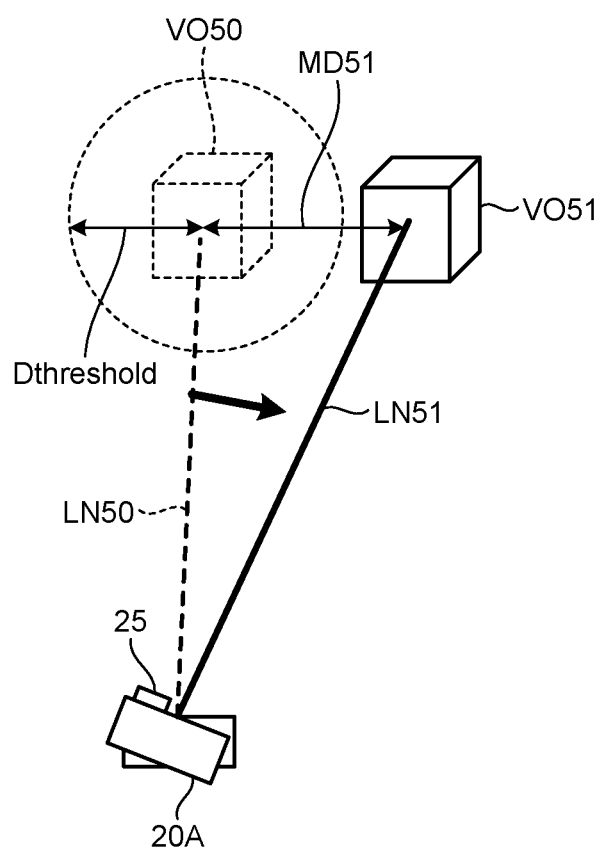
FIG. 19 is a view illustrating an example of movement of a virtual object of the present disclosure.

Next, movement of a virtual object will be described with reference to FIG. 19. FIG. 19 is a diagram illustrating an example of movement of a virtual object according to the present disclosure. Specifically, FIG. 19 is a diagram illustrating an example of finally arranging a virtual object. Note that descriptions of points similar to those in FIGS. 16 to 18 will be omitted as appropriate.

A virtual object VO50 in FIG. 19 indicates a virtual object located at a position before movement (position before change). In addition, a virtual object VO51 in FIG. 19 indicates a virtual object located at a position (changed position) after the movement. Note that the virtual object VO50 and the virtual object VO51 are for indicating a difference in the positions of the virtual objects, and are the same virtual objects. Hereinafter, when the virtual object VO50 and the virtual object VO51 are not distinguished from each other, they are described as a "virtual object VO5".

FIG. 19 illustrates a state in which the user 50 presses the button 25 of the first controller 20A to select the virtual object VO50, and the information processing apparatus 100 determines that the virtual object VO50 is grasped by the first controller 20A. As a result, the information processing apparatus 100 controls the display device 10 such that the virtual object VO50 is arranged (fixed) on the line LN50 of the first controller 20A and moves in conjunction with the movement of the line LN50. Note that, in FIG. 19, the virtual object VO50 and the line LN50 corresponding to a pre-change position are indicated by dotted lines.

Here, the information processing apparatus 100 determines whether to move the position of the virtual object VO5 according to the movement of the line LN50 of the first controller 20A using the threshold Dthreshold. The threshold Dthreshold is a ceremony status used for determining the movement of the object. The information processing apparatus 100 moves the position of the virtual object in a case where a moving distance (hereinafter referred to as "moving distance MD") of the virtual object is equal to or more than the threshold Dthreshold. In the example of FIG. 19, the information processing apparatus 100 moves the position of the virtual object VO5 in a case where the position of the virtual object VO5 is moved from the position of the virtual object VO50 by the threshold Dthreshold or more in response to the position change of the line LN50 of the first controller 20A.

For example, in a case where the moving distance MD of the virtual object VO5 is less than the threshold Dthreshold, the information processing apparatus 100 causes the display device 10 to return to the position before the movement (the position of the virtual object VO50 in FIG. 19). As a result, the information processing apparatus 100 can absorb minute hand shaking and displacement.

For example, in a case where the moving distance MD (corresponding to the symbol MD51 in FIG. 19) of the virtual object VO50 is equal to or more than the threshold Dthreshold, the information processing apparatus 100 arranges the virtual object VO5 (the virtual object VO51 in FIG. 19) at the position after the movement (the position after the change). In the example of FIG. 19, the information processing apparatus 100 arranges the virtual object VO5 at the position of the virtual object VO51 in response to the change of the position of the line of the first controller 20A from the line LN50 to the line LN51.

As described above, the information processing apparatus 100 can absorb minute hand shaking or displacement by executing the movement of the virtual object using a threshold such as the threshold Dthreshold.

Note that, in a case where the virtual object has the "gravity" flag, the information processing apparatus 100 controls the display device 10 such that the virtual object falls in the gravity direction from the position (position after the change) of the virtual object after movement. For example, in a case where the virtual object is arranged on a floor, a desk, or the like by gravity, such as a plant or a chair, the information processing apparatus 100 controls the display device 10 such that the virtual object falls in a gravity direction from the position of the virtual object.

Furthermore, in a case where there is no "gravity" flag in the virtual object, the information processing apparatus 100 controls the display device 10 such that the virtual object is arranged at the position (position after the change) of the virtual object after the movement. For example, in a case of a ghost, a bird, a butterfly, or the like that can freely move in the air, the information processing apparatus 100 controls the display device 10 such that the virtual object is arranged at the position of the virtual object.

[1-7-5. Procedure of Moving a Virtual Object]

Figure 20:
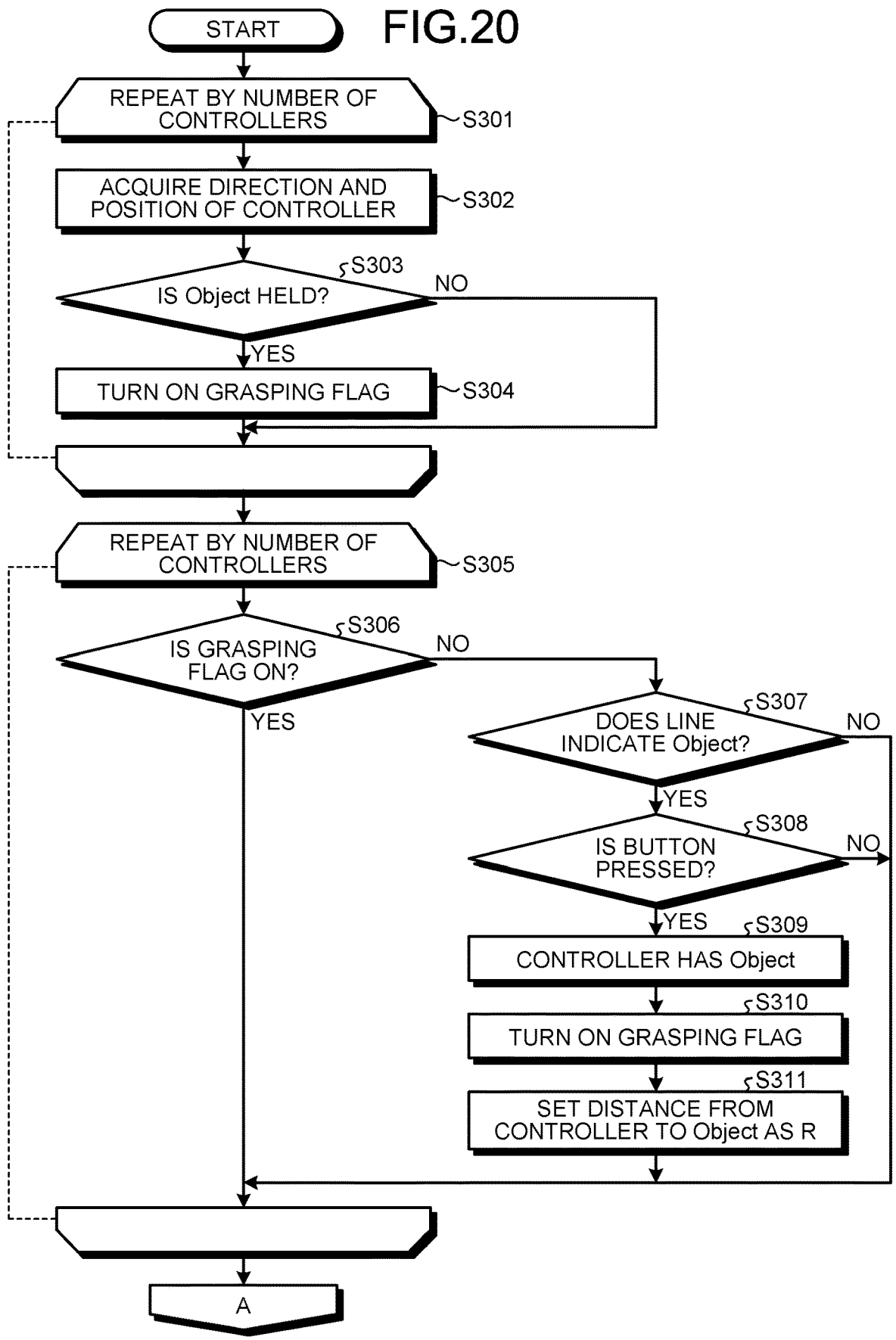
FIG. 20 is a flowchart illustrating a procedure of virtual object movement according to the present disclosure.
Figure 21:
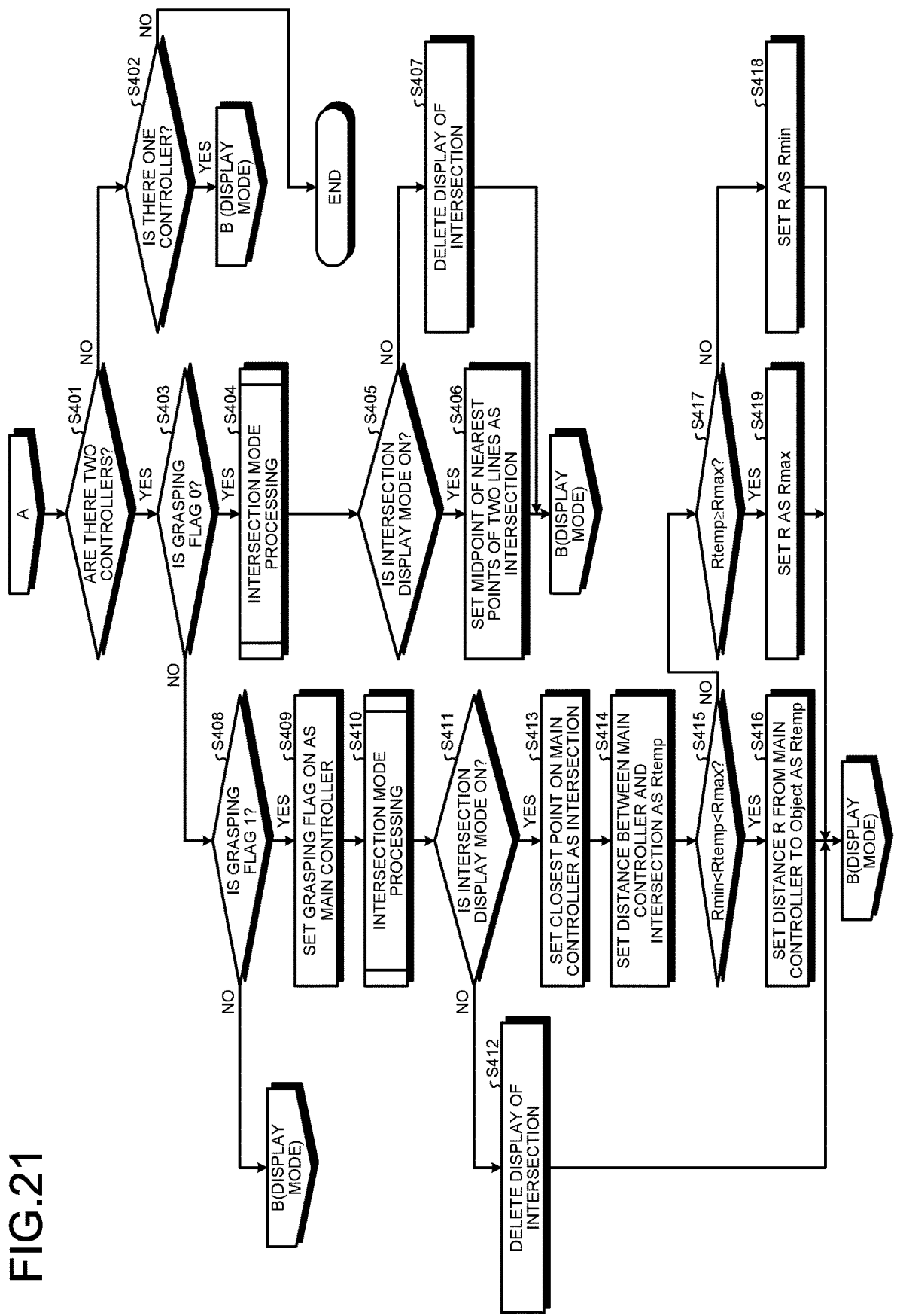
FIG. 21 is a flowchart illustrating a procedure of virtual object movement according to the present disclosure.
Figure 22:
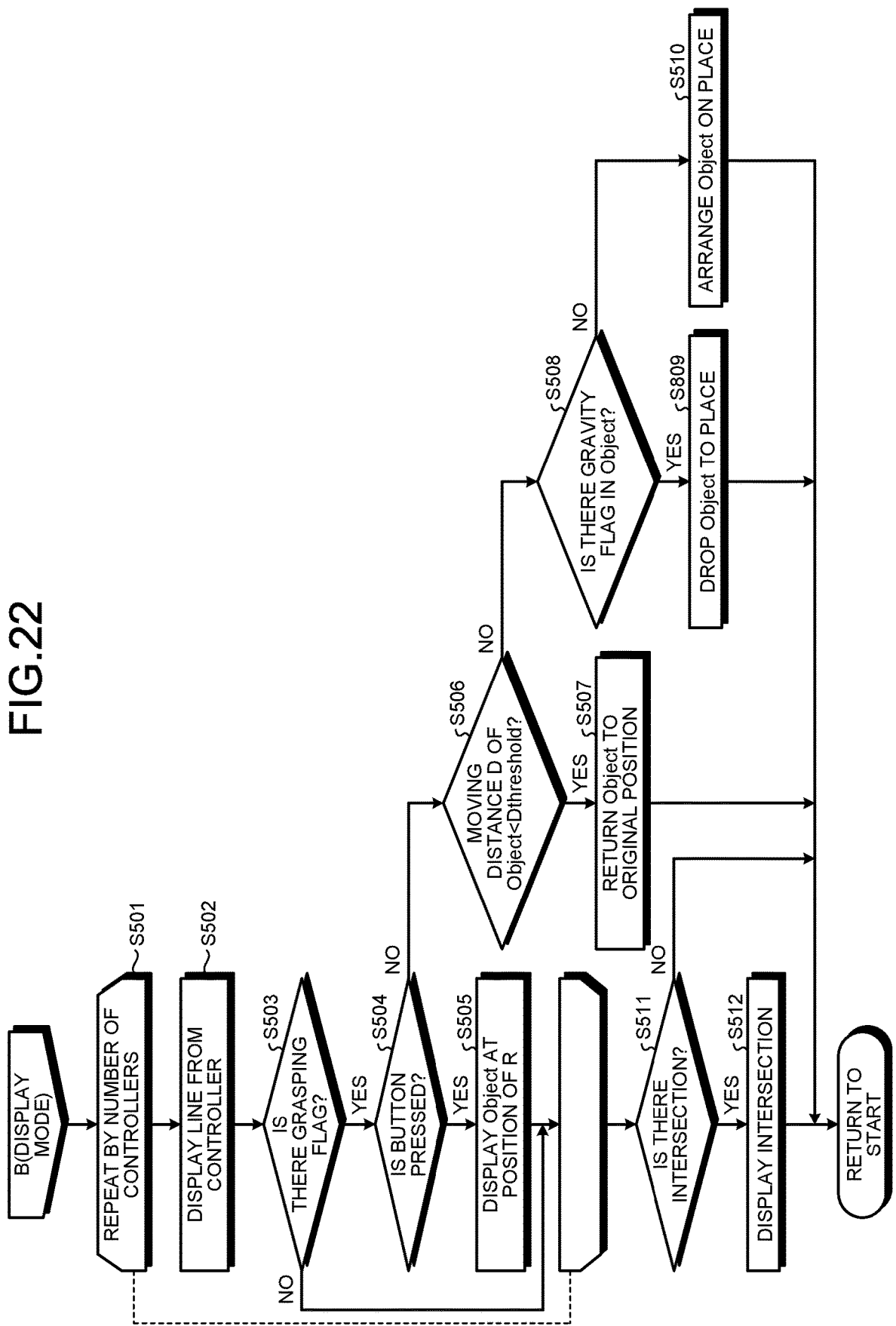
FIG. 22 is a flowchart illustrating a procedure of virtual object movement according to the present disclosure.
Figure 23:
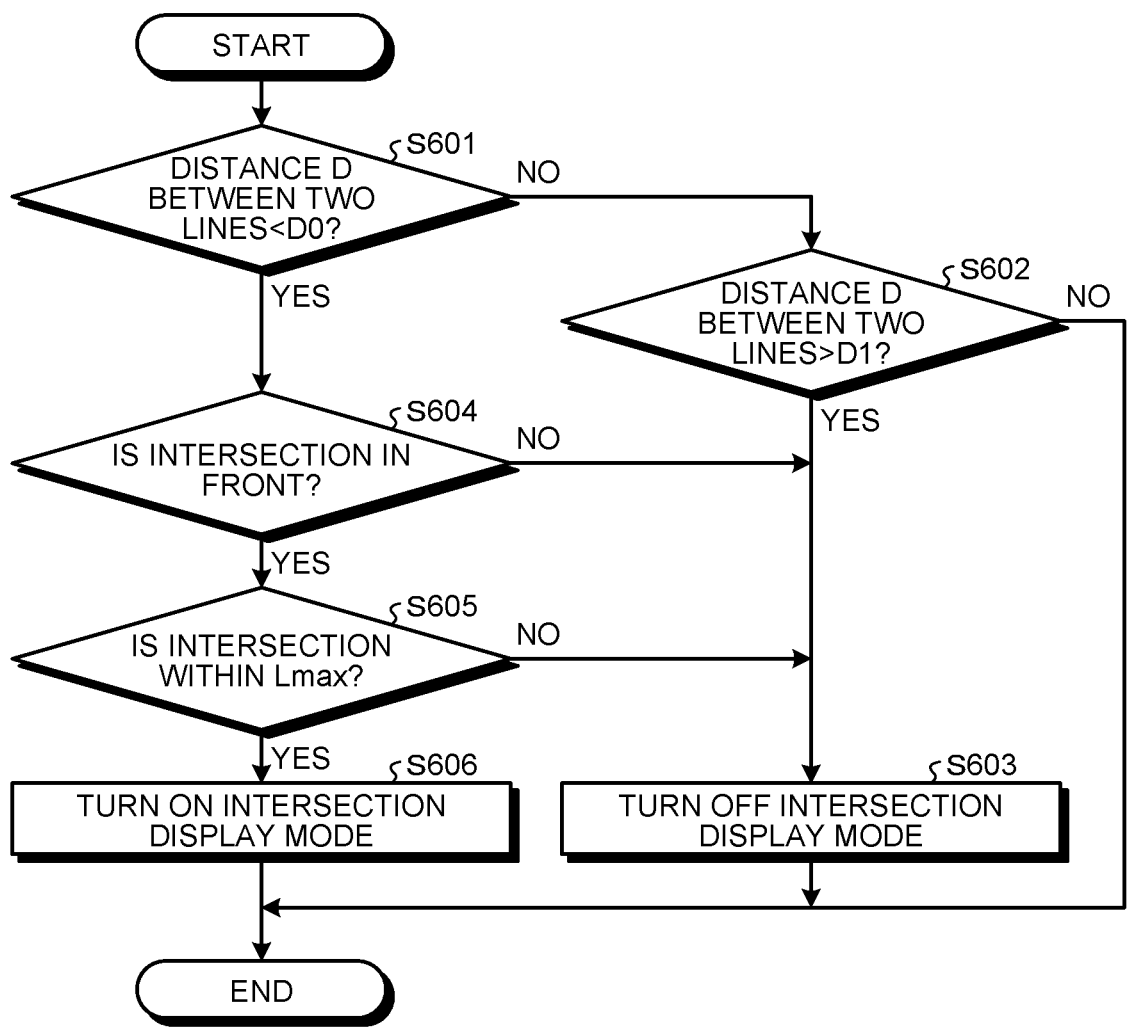
FIG. 23 is a flowchart illustrating a procedure of intersection mode processing of the present disclosure.

Next, a procedure of moving a virtual object will be described with reference to FIGS. 20 to 23. FIGS. 20 to 22 are flowcharts illustrating a procedure of virtual object movement according to the present disclosure. FIG. 23 is a flowchart illustrating a procedure of intersection mode processing of the present disclosure. Specifically, FIG. 23 is a flowchart illustrating details of the intersection mode processing illustrated in FIG. 21. Note that, in the following description, the information processing system 1 will be described as a main body of processing, but each processing illustrated in FIGS. 20 to 23 may be performed by any device included in the information processing system 1 such as the information processing apparatus 100 or the display device 10 according to the device configuration of the information processing system 1.

In the information processing system 1, the control unit 130 repeats the processing of Steps S302 to S304 by the number of controllers (Step S301). First, the information processing system 1 acquires the direction and position of the controller (Step S302). For example, the information processing apparatus 100 acquires information indicating the direction and position of the first controller 20A.

The information processing system 1 determines whether it holds an Object (Step S303). For example, the information processing apparatus 100 determines whether the first controller 20A holds a virtual object.

If the Object is not held (Step S303: No), the information processing system 1 performs the processing of Steps S302 to S304 for the next controller.

If the Object is held (Step S303: Yes), the information processing system 1 turns on the grasping flag (Step S304). Then, the information processing system 1 performs the processing of Steps S302 to S304 for the next controller. For example, in a case where the first controller 20A holds a virtual object, the information processing apparatus 100 turns on the grasping flag of the first controller 20A. For example, the information processing apparatus 100 stores the grasping flag "ON" in association with the first controller 20A in the direction instruction information storage unit 123 (see FIG. 7).

After repeating the processing of Steps S302 to S304 by the number of controllers, the information processing system 1 repeats the processing of Steps S306 to S311 by the number of controllers (Step S305).

The information processing system 1 determines whether the grasping flag is ON (Step S306). For example, the information processing apparatus 100 determines whether the grasping flag of the first controller 20A is ON.

When the grasping flag is ON (Step S306: Yes), the information processing system 1 performs the processing of Steps S306 to S311 for the next controller. For example, in a case where the grasping flag of the first controller 20A is ON, the information processing apparatus 100 performs the processing of Steps S306 to S311 for the second controller 20B.

In a case where the grasping flag is not ON (Step S306: No), the information processing system 1 determines whether the line indicates the Object (Step S307). For example, in a case where the grasping flag of the first controller 20A is not ON, the information processing apparatus 100 determines whether the line LN1 of the first controller 20A indicates a virtual object.

In a case where the line does not point to the Object (Step S307: No), the information processing system 1 performs the processing of Steps S306 to S311 for the next controller.

In a case where the line indicates the Object (Step S307: Yes), the information processing system 1 determines whether the button is pressed (Step S308). For example, in a case where the line LN1 of the first controller 20A indicates a virtual object, the information processing apparatus 100 determines whether the button 25 of the first controller 20A is pressed.

When the button is not pressed (Step S308: No), the information processing system 1 performs the processing of Steps S306 to S311 for the next controller.

When the button is pressed (Step S308: Yes), the information processing system 1 assumes that the controller has an Object (Step S309). For example, in a case where the button 25 of the first controller 20A is pressed, the information processing apparatus 100 determines that the first controller 20A has the virtual object pointed by the line LN1.

Then, the information processing system 1 turns on the grasping flag (Step S310). For example, in a case where the first controller 20A holds a virtual object, the information processing apparatus 100 turns on the grasping flag of the first controller 20A. For example, the information processing apparatus 100 stores the grasping flag "ON" in association with the first controller 20A in the direction instruction information storage unit 123 (see FIG. 7).

Then, the information processing system 1 sets a distance from the controller to the Object as R (Step S311). For example, the information processing apparatus 100 sets a distance from the first controller 20A to the virtual object as a distance R. Then, the information processing system 1 performs the processing of Steps S306 to S311 for the next controller. After repeating the processing of Steps S306 to S311 by the number of controllers, the information processing system 1 performs the processing of Step S401 illustrated in FIG. 21.

As illustrated in FIG. 21, the information processing system 1 determines whether there are two controllers (Step S401). For example, the information processing apparatus 100 determines whether there are two controllers as instruction components.

If there are not two controllers (Step S401: No), the information processing system 1 determines whether there is one controller (Step S402). In a case where the number of controllers is not one (Step S402: No), the information processing system 1 ends the processing. In a case where there is one controller (Step S402: Yes), the information processing system 1 performs the processing of Step S501 illustrated in FIG. 22.

When the number of controllers is two (Step S401: Yes), the information processing system 1 determines whether the grasping flag is 0 (Step S403). For example, in a case where the number of controllers is two, the information processing apparatus 100 determines whether the number of controllers whose grasping flags are ON in the two controllers is "0 (zero)".

When the grasping flag is 0 (Step S403: Yes), the information processing system 1 performs the intersection mode processing (Step S404). Note that the intersection mode processing corresponds to the processes of Steps S601 to S606 illustrated in FIG. 23, and details of the intersection mode processing will be described later.

Then, the information processing system 1 determines whether the intersection display mode is ON (Step S405). For example, the information processing apparatus 100 determines whether the intersection display mode in the intersection displaying information storage unit 124 (see FIG. 8) is ON.

When the intersection display mode is ON (Step S405: Yes), the information processing system 1 sets a midpoint of the nearest points of the two lines as the intersection (Step S406). For example, in a case where the intersection display mode is ON, the information processing apparatus 100 sets the midpoint between a point PT1 which is the nearest point of the line LN1 of the first controller 20A and a point PT2 which is the nearest point of the line LN2 of the second controller 20B as the intersection IS1. Then, the information processing system 1 performs the processing of Step S501 illustrated in FIG. 22.

When the intersection display mode is not ON (Step S405: No), the information processing system 1 deletes the display of the intersection (Step S407). For example, in a case where the intersection display mode is OFF, the information processing apparatus 100 maintains the intersection non-display in a case where the intersection is non-display, and deletes the display of the intersection in a case where the intersection is being displayed. Then, the information processing system 1 performs the processing of Step S501 illustrated in FIG. 22.

If the grasping flag is not 0 (Step S403: No), the information processing system 1 determines whether the grasping flag is 1 (Step S408). For example, in a case where the number of controllers is two, the information processing apparatus 100 determines whether the number of controllers whose grasping flags are ON in the two controllers is "1".

In a case where the grasping flag is not 1 (Step S408: No), the information processing system 1 performs the processing of Step S501 illustrated in FIG. 22.

When the grasping flag is 1 (Step S408: Yes), the information processing system 1 sets the grasping flag on as a main controller (Step S409). That is, the information processing system 1 sets the controller whose grasping flag is ON as the main controller. For example, the information processing apparatus 100 determines, as the main controller, the first controller 20A whose grasping flag is ON among the first controller 20A and the second controller 20B. In this case, the information processing apparatus 100 changes the master-subordinate relationship in the intersection displaying information storage unit 124 (see FIG. 8) to "present", stores "20A" in the main instruction component, and stores "20B" in the subordinate instruction component.

Then, the information processing system 1 performs intersection mode processing (Step S410). The information processing system 1 determines whether the intersection display mode is ON (Step S411). For example, the information processing apparatus 100 determines whether the intersection display mode in the intersection displaying information storage unit 124 (see FIG. 8) is ON.

When the intersection display mode is not ON (Step S411: No), the information processing system 1 deletes the display of the intersection (Step S412). For example, in a case where the intersection display mode is OFF, the information processing apparatus 100 maintains the intersection non-display in a case where the intersection is non-display, and deletes the display of the intersection in a case where the intersection is being displayed. Then, the information processing system 1 performs the processing of Step S501 illustrated in FIG. 22.

When the intersection display mode is ON (Step S411: Yes), the information processing system 1 sets the closest point on the main controller as the intersection (Step S413). For example, in a case where the main controller is the first controller 20A, the information processing apparatus 100 sets the nearest point of the line LN1 of the first controller 20A as an intersection.

The information processing system 1 sets the distance between the main controller and the intersection as Rtemp (Step S414). For example, in a case where the main controller is the first controller 20A, the information processing apparatus 100 sets the distance from the first controller 20A to the virtual object as the distance Rtemp.

The information processing system 1 determines whether the distance Rtemp is greater than the threshold Rmin and less than the threshold Rmax (Step S415). For example, the information processing apparatus 100 determines whether the distance Rtemp is within a range between the threshold Rmin and the threshold Rmax.

In a case where the distance Rtemp is greater than the threshold Rmin and less than the threshold Rmax (Step S415: Yes), the information processing system 1 sets the distance R from the main controller to the Object as Rtemp (Step S416). For example, in a case where the main controller is the first controller 20A, the information processing apparatus 100 sets the distance R from the first controller 20A to the virtual object as the distance Rtemp. Then, the information processing system 1 performs the processing of Step S501 illustrated in FIG. 22.

In a case where the distance Rtemp is greater than the threshold Rmin and not less than the threshold Rmax (Step S415: No), the information processing system 1 determines whether the distance Rtemp is equal to or greater than the threshold Rmax (Step S417). For example, in a case where the distance Rtemp is equal to or less than the threshold Rmin or equal to or more than the threshold Rmax, the information processing apparatus 100 determines whether the distance Rtemp is equal to or more than the threshold Rmax.

In a case where the distance Rtemp is not equal to or more than the threshold Rmax (Step S417: No), the information processing system 1 sets the distance R as the threshold Rmin (Step S418). For example, in a case where the distance Rtemp is equal to or less than the threshold Rmin, the information processing apparatus 100 sets the distance R from the first controller 20A to the virtual object to the threshold Rmin. Then, the information processing system 1 performs the processing of Step S501 illustrated in FIG. 22.

In a case where the distance Rtemp is equal to or more than the threshold Rmax (Step S417: Yes), the information processing system 1 sets the distance R as the threshold Rmax (Step S419). For example, in a case where the distance Rtemp is equal to or greater than the threshold Rmax, the information processing apparatus 100 sets the distance R from the first controller 20A to the virtual object to the threshold Rmax. Then, the information processing system 1 performs the processing of Step S501 illustrated in FIG. 22.

As illustrated in FIG. 22, the control unit 130 repeats the processing of Steps S502 to S305 by the number of controllers (Step S501). First, the information processing system 1 displays a line from the controller (Step S502). For example, the information processing apparatus 100 displays a line LN1 from the first controller 20A.

The information processing system 1 determines whether there is a grasping flag (Step S503). For example, the information processing apparatus 100 determines whether the grasping flag of the first controller 20A is ON.

When there is no grasping flag (Step S503: No), the information processing system 1 performs the processing of Steps S502 to S505 for the next controller.

When there is the grasping flag (Step S503: Yes), the information processing system 1 determines whether the button is pressed (Step S504). For example, in a case where the line LN1 of the first controller 20A indicates a virtual object, the information processing apparatus 100 determines whether the button 25 of the first controller 20A is pressed.

When the button is pressed (Step S504: Yes), the information processing system 1 displays the Object at the position of R (Step S505). For example, in a case where the button 25 of the first controller 20A is pressed, the information processing apparatus 100 displays the virtual object at the position of the distance R. Then, the information processing system 1 performs the processing of Steps S502 to S505 for the next controller.

In a case where the button is not pressed (Step S504: No), the information processing system 1 determines whether the moving distance D of the Object is smaller than the threshold Dthreshold (Step S506).

In a case where the moving distance D of the Object is smaller than the threshold Dthreshold (Step S506: Yes), the information processing system 1 returns the Object to the original position (Step S507). For example, in a case where the moving distance D of the virtual object is smaller than the threshold Dthreshold, the information processing apparatus 100 displays the virtual object at the original position. Then, the information processing system 1 returns to the start. For example, the information processing system 1 returns to Step S301 and repeats the processing.

In a case where the moving distance D of the Object is not smaller than the threshold Dthreshold (Step S506: No), the information processing system 1 determines whether there is a gravity flag in the Object (Step S508). The information processing system 1 determines whether the gravity flag of the virtual object is given. For example, the information processing apparatus 100 determines whether the gravity flag corresponding to the virtual object in the object information storage unit 125 (see FIG. 9) is "1".

In a case where there is a gravity flag in the Object (Step S508: Yes), the information processing system 1 drops the Object to the place (Step S509). For example, in a case where the gravity flag corresponding to the virtual object in the object information storage unit 125 (see FIG. 9) is "1", the information processing apparatus 100 places the virtual object on the place and arranges the virtual object at a position affected by gravity. Then, the information processing system 1 returns to the start. For example, the information processing system 1 returns to Step S301 and repeats the processing.

In a case where there is no gravity flag in the Object (Step S508: No), the information processing system 1 arranges the Object on the place (Step S510). For example, in a case where the gravity flag corresponding to the virtual object in the object information storage unit 125 (see FIG. 9) is "0", the information processing apparatus 100 arranges the virtual object on the place. Then, the information processing system 1 returns to the start. For example, the information processing system 1 returns to Step S301 and repeats the processing.

After repeating the processing of Steps S502 to S505 as many as the number of controllers, the information processing system 1 determines whether there is an intersection (Step S511).

In a case where there is no intersection (Step S511: No), the information processing system 1 returns to the start. For example, the information processing system 1 returns to Step S301 and repeats the processing.

If there is an intersection (Step S511: Yes), the information processing system 1 displays the intersection (Step S512). Then, the information processing system 1 returns to the start. For example, the information processing system 1 returns to Step S301 and repeats the processing.

Here, a procedure related to the intersection mode processing will be described with reference to FIG. 23. The intersection mode processing illustrated in FIG. 23 illustrates details of the intersection mode processing of Step S404 and Step S410. The information processing system 1 executes the processing of Steps S601 to S606 in the intersection mode processing of Steps S404 and S410.

The information processing system 1 determines whether the distance D between the two lines is less than the threshold D0 (Step S601). For example, the information processing apparatus 100 determines whether the distance D between the line LN1 of the first controller 20A and the line LN2 of the second controller 20B is less than the threshold D0.

In a case where the distance D between the two lines is not less than the threshold D0 (Step S601: No), the information processing system 1 determines whether the distance D between the two lines is larger than the threshold D1 (Step S602). For example, in a case where the distance D between the line LN1 of the first controller 20A and the line LN2 of the second controller 20B is equal to or larger than the threshold D0, the information processing apparatus 100 determines whether the distance D is larger than the threshold D1.

In a case where the distance D between the two lines is not larger than the threshold D1 (Step S602: No), the information processing system 1 ends the intersection mode processing. That is, in a case where the distance D between the two lines is equal to or less than the threshold D1, the information processing system 1 maintains ON when the intersection display mode is ON, maintains OFF when the intersection display mode is OFF, and ends the intersection mode processing. For example, in a case where the distance D between the line LN1 of the first controller 20A and the line LN2 of the second controller 20B is equal to or less than the threshold D1, the information processing apparatus 100 ends the intersection mode processing.

When the distance D between the two lines is larger than the threshold D1 (Step S602: Yes), the information processing system 1 turns off the intersection display mode (Step S603), and then ends the intersection mode processing. For example, in a case where the distance D between the two lines is larger than the threshold D1, the information processing apparatus 100 changes to OFF if the intersection display mode is ON, maintains OFF if the intersection display mode is OFF, and ends the intersection mode processing.

In a case where the distance D between the two lines is less than the threshold D0 (Step S601: Yes), the information processing system 1 determines whether the intersection is in front (Step S604). For example, in a case where the distance D between the two lines is less than the threshold D0, the information processing apparatus 100 determines whether the intersection IS1 is in front of the first controller 20A. For example, in a case where the distance D between the two lines is less than the threshold D0, the information processing apparatus 100 may determine whether the intersection IS1 is in front of the second controller 20B.

In a case where the intersection is not in front (Step S604: No), the information processing system 1 turns off the intersection display mode (Step S603), and then ends the intersection mode processing. For example, in a case where the intersection IS1 is not in front of the first controller 20A, the information processing apparatus 100 changes to OFF if the intersection display mode is ON, maintains OFF if the intersection display mode is OFF, and ends the intersection mode processing.

In a case where the intersection is in front (Step S604: Yes), the information processing system 1 determines whether the intersection is within Lmax (Step S605). For example, in a case where the intersection IS1 is in front of the first controller 20A, the information processing apparatus 100 determines whether a distance from the first controller 20A to the intersection IS1 is within the threshold Lmax.

If the intersection is not within Lmax (Step S605: No), the information processing system 1 turns off the intersection display mode (Step S603), and then ends the intersection mode processing. For example, in a case where the distance from the first controller 20A to the intersection IS1 is larger than the threshold Lmax, the information processing apparatus 100 changes to OFF if the intersection display mode is ON, maintains OFF if the intersection display mode is OFF, and ends the intersection mode processing.

When the intersection is within Lmax (Step S605: Yes), the information processing system 1 turns on the intersection display mode (Step S606). For example, in a case where the distance from the first controller 20A to the intersection IS1 is within the threshold Lmax, the information processing apparatus 100 turns on the intersection display mode.

[1-7-6. Controller and Line of Sight]

Note that, in the processing for the virtual object described above, the instruction component is not limited to the controller, and other devices, the body (hand or eye) of the user, or the like may be used. For example, the controller 20 and a line of sight of the eyes 51 of the user 50 may be an instruction component. Hereinafter, processing of this point will be described. A case where a virtual object is selected with one line and the virtual object is arranged at an intersection with the line of sight will be described.

Note that the processing for the virtual object described above is similar to the processing for the virtual object described above except that the instruction component is changed from the controller 20 to the eye 51 (line of sight) of the user 50, and thus description thereof is appropriately omitted. Furthermore, in the following description, the information processing system 1 will be described as a main body of processing, but each processing may be performed by any device included in the information processing system 1 such as the information processing apparatus 100 or the display device 10 according to the device configuration of the information processing system 1.

The user 50 points to a virtual object to be selected by the controller 20. Then, the user 50 presses the button 25 of the controller 20 to select a virtual object. As a result, the information processing apparatus 100 determines that the controller 20 has grasped the virtual object.

Then, the user 50 points in the direction of a position desired to be designated by the controller 20. Note that the virtual object is arranged ahead of (the line of) the controller 20.

Then, the user 50 directs the line of sight to the position to be moved on (the line of) the controller 20, and creates the intersection display mode. When the two lines come closer than a certain distance (threshold D0) in front of the controller 20, the virtual object moves to the intersection. For example, when determining that the two lines are closer than a certain distance (threshold D0) in front of the controller 20, the information processing apparatus 100 causes the display device 10 to display a virtual object at the intersection.

When an intersection is created far away, the position of the virtual object rapidly changes, and thus the information processing apparatus 100 creates an intersection within a certain range from the controller 20. For the certain range, the distance may be changed between the front side and the back side of the virtual object. Since the line of sight always moves slightly, the information processing apparatus 100 displays an intersection at the nearest point on the line of the controller. In addition, since focusing cannot be performed in a place where there is nothing due to a human visual adjustment mechanism, the information processing apparatus 100 first displays a line of the controller 20 so that the user can specify a position by a line of sight.

Then, the user 50 adjusts the position of the intersection with two lines. In this case, the intersection moves on a line of controller 20. Furthermore, when the controllers become parallel, the information processing apparatus 100 sets the maximum distance (threshold Lmax) in advance since the distance becomes infinite.

In response to the adjustment of the position of the intersection by the user 50, the information processing apparatus 100 causes the display device 10 to display the virtual object at the position of the intersection. The user 50 having arranged the virtual object at the position desired to be arranged releases the finger from the button 25 of the controller 20 and arranges the virtual object at the designated position. As a result, the information processing apparatus 100 determines that the holding of the virtual object by the controller 20 has been released.

[1-8. Line Representation]

Note that the instruction component is not limited to the above, and may be various elements such as a palm, an arm, and a front of a face or a head. That is, examples of the object that emits a line include various objects capable of indicating a direction, such as a controller, a finger, a hand, a palm, an arm, a line of sight, and a front of a face or a head.

In addition, even when there is no functional difference between the two lines, the two lines may have a master-subordinate relationship. The information processing apparatus 100 may determine the master-subordinate relationship between the instruction components by appropriately using various information. Furthermore, the information processing apparatus 100 may change the color density, shape, and the like of each line in order to indicate the master-subordinate relationship.

The information processing apparatus 100 may determine an instruction component estimated to be preferentially used as a main instruction component (main instruction component). For example, the information processing apparatus 100 sets an instruction component corresponding to the user's right hand as a main instruction component. Furthermore, for example, the information processing apparatus 100 may have a thing (device) as the main instruction component. For example, in a case where the information processing apparatus 100 holds things (devices) only in one hand, the device may be used as the main instruction component.

The information processing apparatus 100 may determine the main instruction component according to a predetermined order. The information processing apparatus 100 may determine the main instruction component according to the order in which a beam state is set. For example, the information processing apparatus 100 may determine the instruction component that has been initially set in the beam state as the main instruction component.

The information processing apparatus 100 may determine the main instruction component according to the way of movement. For example, the information processing apparatus 100 may determine an instruction component that has been moved largely or moved previously as a main instruction component.

The representation of the lines may also be of various objects. For example, when the user becomes accustomed to the operation, the display of the line becomes unnecessary, and thus, only the intersection may be displayed. Furthermore, for example, the information processing apparatus 100 may express a line so that it is easy to create an intersection when two lines are separated. For example, the information processing apparatus 100 may increase the thickness of the line.

Figure 24A:
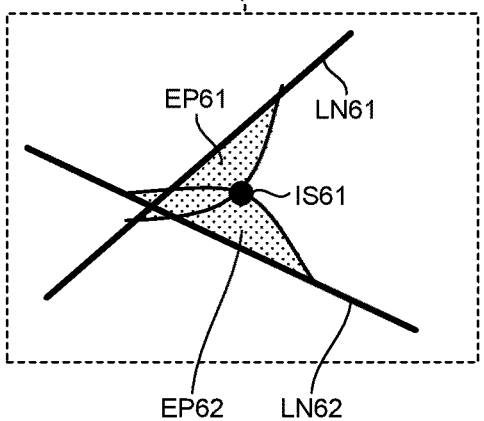
FIG. 24A is a view illustrating an example of display of a line of the present disclosure.
Figure 24B:
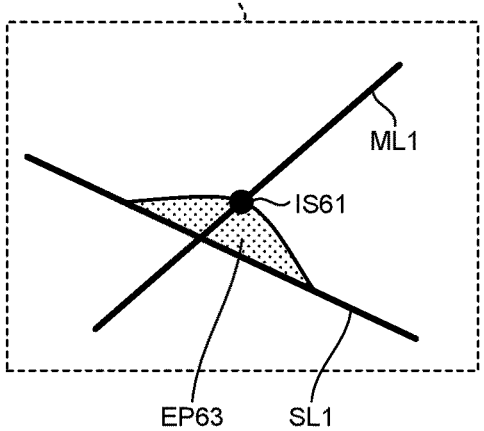
FIG. 24B is a view illustrating an example of display of a line of the present disclosure.
Figure 24C:
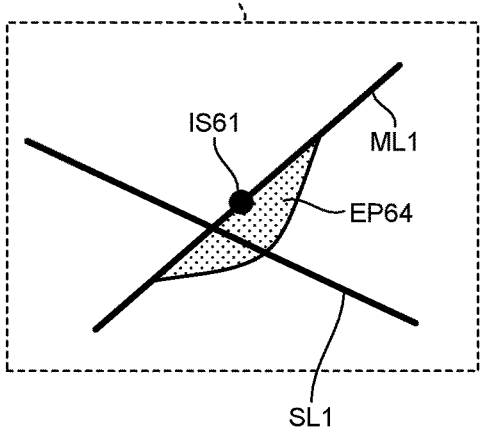
FIG. 24C is a view illustrating an example of display of a line of the present disclosure.

Furthermore, the information processing apparatus 100 may express the line such that the vicinity of the intersection bulges or bulges toward the nearest point. This point will be described with reference to FIGS. 24A, 24B, and 24C. FIGS. 24A, 24B, and 24C are diagrams illustrating an example of display of lines of the present disclosure. Specifically, FIGS. 24A, 24B, and 24C are diagrams illustrating examples of representation of lines that are examples of geometric targets.

Each of FIGS. 24A, 24B, and 24C illustrate an example of expression of a line according to the master-subordinate relationship. Specifically, FIG. 24A illustrates an example of expression of a line in a case where there is no master-subordinate relationship. In addition, each of FIGS. 24B and 24C illustrates an example of expression of a line in a case where there is a master-subordinate relationship.

First, expression of lines in a case where there is no master-subordinate relationship will be described with reference to FIG. 24A. As illustrated in FIG. 24A, in a case where there is no master-subordinate relationship, the information processing apparatus 100 displays both the line LN61 and the line LN62 so as to bulge toward an intersection IS61. The information processing apparatus 100 causes the display device 10 to display the line LN61 including an expansion portion EP61 and the line LN62 including an expansion portion EP62.

Next, expression of lines in a case where there is a master-subordinate relationship will be described with reference to FIG. 24B. As illustrated in FIG. 24B, in a case where there is the master-subordinate relationship, the information processing apparatus 100 displays a subordinate line SL1, which is a line of the subordinate instruction component, to bulge toward the intersection IS61 on a main line ML1, which is a line of the main instruction component. The information processing apparatus 100 causes the display device 10 to display the main line ML1 and the subordinate line SL1 including an expansion portion EP63.

Next, expression of lines in a case where there is a master-subordinate relationship will be described with reference to FIG. 24C. As illustrated in FIG. 24C, in a case where there is the master-subordinate relationship, the information processing apparatus 100 displays a main line ML1, which is a line of the main instruction component, to bulge toward the nearest point of a subordinate line SL1, which is a line of the subordinate instruction component. The information processing apparatus 100 causes the display device 10 to display the main line ML1 including an expansion portion EP64 and the subordinate line SL1.

Further, the direction may be expressed not only by a line but also by a plane or in a plane. The plane may be either master or subordinate. In addition, the direction of the plane may be a horizontal direction or a vertical direction. In addition, the direction of the plane may be a direction in which a controller or the like is moved.

In addition, the width of the plane may be set according to the distance from a controller, a hand, or the like of the operator to the intersection or the virtual object. For example, the width is set to about the threshold D1. In addition, a minimum width of about several centimeters may be determined in preparation for a case where the intersection is near.

In addition, in the expression of the plane or the in-plane, the line may have a neck bend like a straw in the plane between the operator and the object. In addition, a line may extend from the object toward the operator so that the object can be easily selected. Further, when the line is drawn from the controller or the finger of the operator, the line may be displayed with a slight gap.

Figure 25:
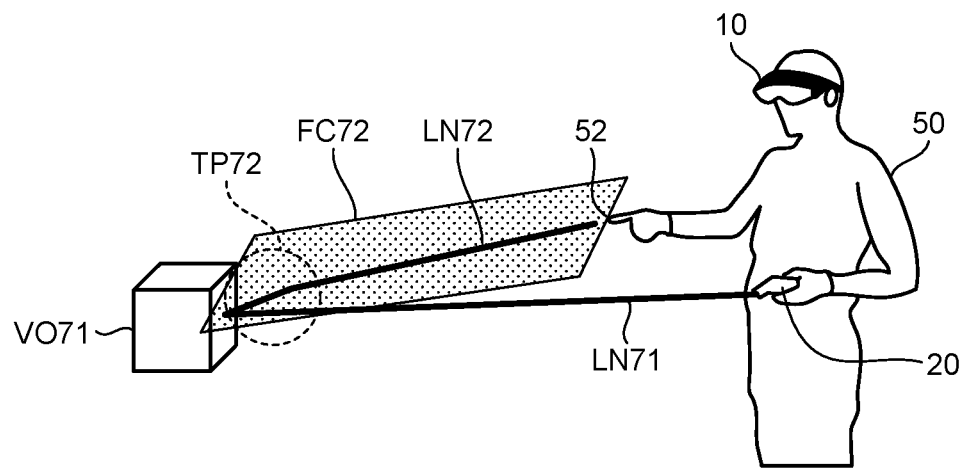
FIG. 25 is a view illustrating an example of display of a line of the present disclosure.
Figure 26:
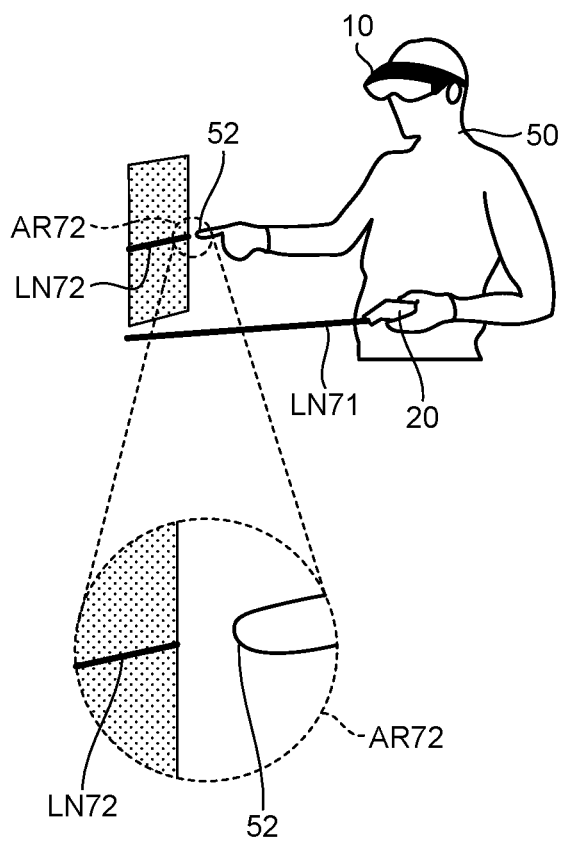
FIG. 26 is a view illustrating an example of display of a line of the present disclosure.

The above-described points will be specifically described with reference to FIGS. 25 and 26. FIGS. 25 and 26 are diagrams illustrating an example of display of lines of the present disclosure. Note that descriptions of the same points as those described above will be omitted as appropriate.

First, the neck folding of the line will be described with reference to FIG. 25. FIG. 25 illustrates a state in which the user 50 gives an instruction on a virtual object VO71 using the controller 20 on the left and the finger 52 of the right hand. The information processing apparatus 100 causes the display device 10 to display the line LN71 of the controller 20 and the line LN72 of the finger 52 of the right hand. The information processing apparatus 100 may cause the display device 10 to display the plane FC72 including the line LN72 of the finger 52 of the right hand. In the example of FIG. 25, the line LN72 of the finger 52 includes a bent portion TP72 of which the neck is bent near the virtual object VO71. The information processing apparatus 100 may cause the display device 10 to display the line LN72 located in the plane FC72 and including the bent portion TP72.

In this manner, the information processing apparatus 100 can allow the user 50 to intuitively recognize that the line LN72 gives an instruction on the virtual object VO71 by expressing the line LN72 such that the line LN72 is attracted to the virtual object VO71.

Next, with reference to FIG. 26, expressions with gaps between instruction components such as the controller 20 and the finger 52 and geometric targets such as lines will be described. FIG. 26 illustrates a case where a gap is formed between finger 52 of right hand of the user 50 and line LN72. As illustrated in an enlarged portion AR72 in FIG. 26, the information processing apparatus 100 causes the display device 10 to display a line LN72 with a gap from the finger 52 of the right hand of the user 50. As a result, even if a slight deviation occurs in the direction between the operator and the object, it is allowable.

[1-9. Others]

The present invention is not limited to the above, and various display patterns may be used. In the above-described example, the operation in a case where there is one user has been described. However, a plurality of users (a plurality of users) may wear the display device 10 such as the AR device, the VR device, or the MR device, which may be operated by a plurality of users while watching the same video. In this case, when one person is operating the virtual object, the other person can adjust the position.

Figure 27:
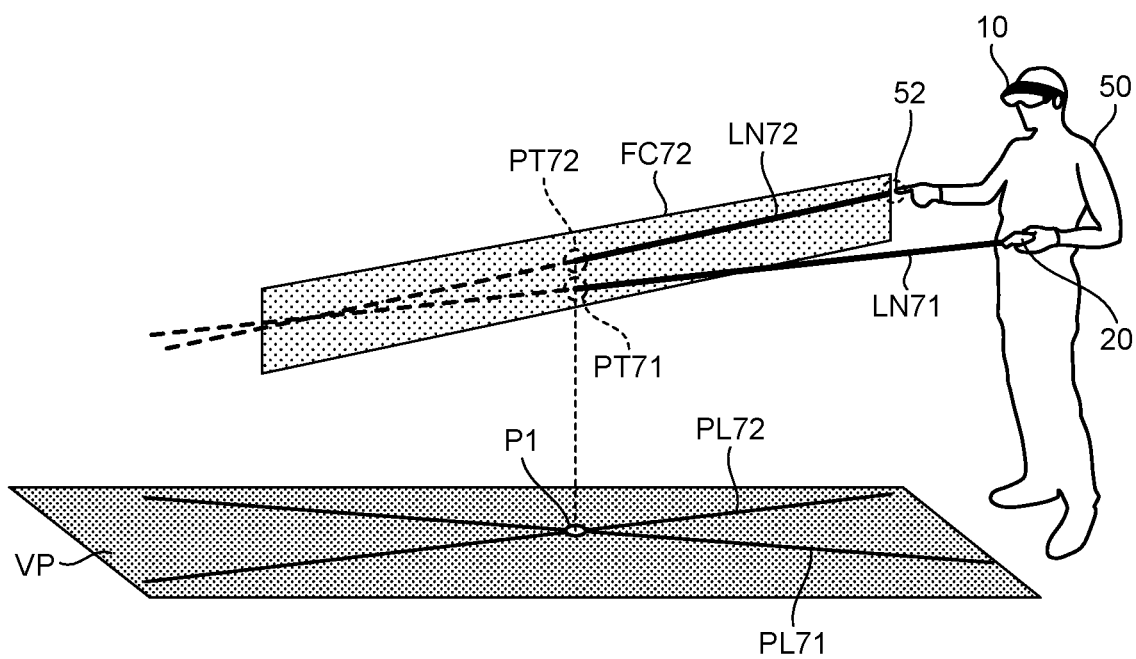
FIG. 27 is a view illustrating an example of intersection display of the present disclosure.

Furthermore, with respect to the intersection, the information processing apparatus 100 may transmit the state by applying vibration, pressure, sound, or the like when entering the intersection mode or performing fine adjustment in the intersection mode. For example, the information processing apparatus 100 may transmit a state such as when an intersection is likely to be formed, when an intersection is formed, when an intersection is present, when a line is likely to be separated, or when a line is separated. For easy understanding of the position of the intersection, the information processing apparatus 100 may provide a virtual plane on a floor, a desk, a height of a waist, or the like and display a shadow obtained by projecting the intersection, or a line connecting the intersection and the shadow. This point will be described with reference to FIG. 27. FIG. 27 is a view illustrating an example of intersection display of the present disclosure. Note that descriptions of the same points as those described above will be omitted as appropriate.

FIG. 27 illustrates a case where information such as a line LN71 and a line LN72 is projected on the virtual plane VP. A projection line PL71 in the virtual plane VP of FIG. 27 indicates a line obtained by projecting the line LN71 onto the virtual plane VP. A projection line PL72 in the virtual plane VP in FIG. 27 indicates a line obtained by projecting the line LN72 onto the virtual plane VP. In addition, the projection point PI in the virtual plane VP of FIG. 27 indicates a point obtained by projecting an intersection of the nearest point PT71 of the line LN71 and the nearest point PT72 of the line LN72. The information processing apparatus 100 causes the display device 10 to display the projection lines PL71 and PL72 and the projection points PI as illustrated in FIG. 27. As a result, the information processing apparatus 100 can cause the user 50 to recognize the position of the intersection.

Furthermore, the information processing apparatus 100 may perform various types of processing on the virtual object. The information processing apparatus 100 may provide a movable area, line, or the like of the virtual object so that the virtual object can move only within the range. In a case where the virtual object or the intersection is to be arranged at a place hidden by the object in the real space, the information processing apparatus 100 may not go deeper than the object or may pass through the object. The information processing apparatus 100 may display supplementary information such as a moving distance and an angle of the virtual object and a distance and an angle from the real object.

Furthermore, the information processing apparatus 100 may perform various processes for displaying the spatial coordinates. The information processing apparatus 100 may display spatial coordinates or a grid so that the intersection and the coordinate position of the virtual object can be easily understood. When displaying the space coordinates, the information processing apparatus 100 may display a coordinate system from the position of the operator, a coordinate system from a specific person, an object, or a position, a person other than the operator, a specific object such as a real object or a virtual object, an absolute coordinate system of a space such as a specific position, or the like.

[1-10. Other Geometric Targets (Planes)]

Figure 28:
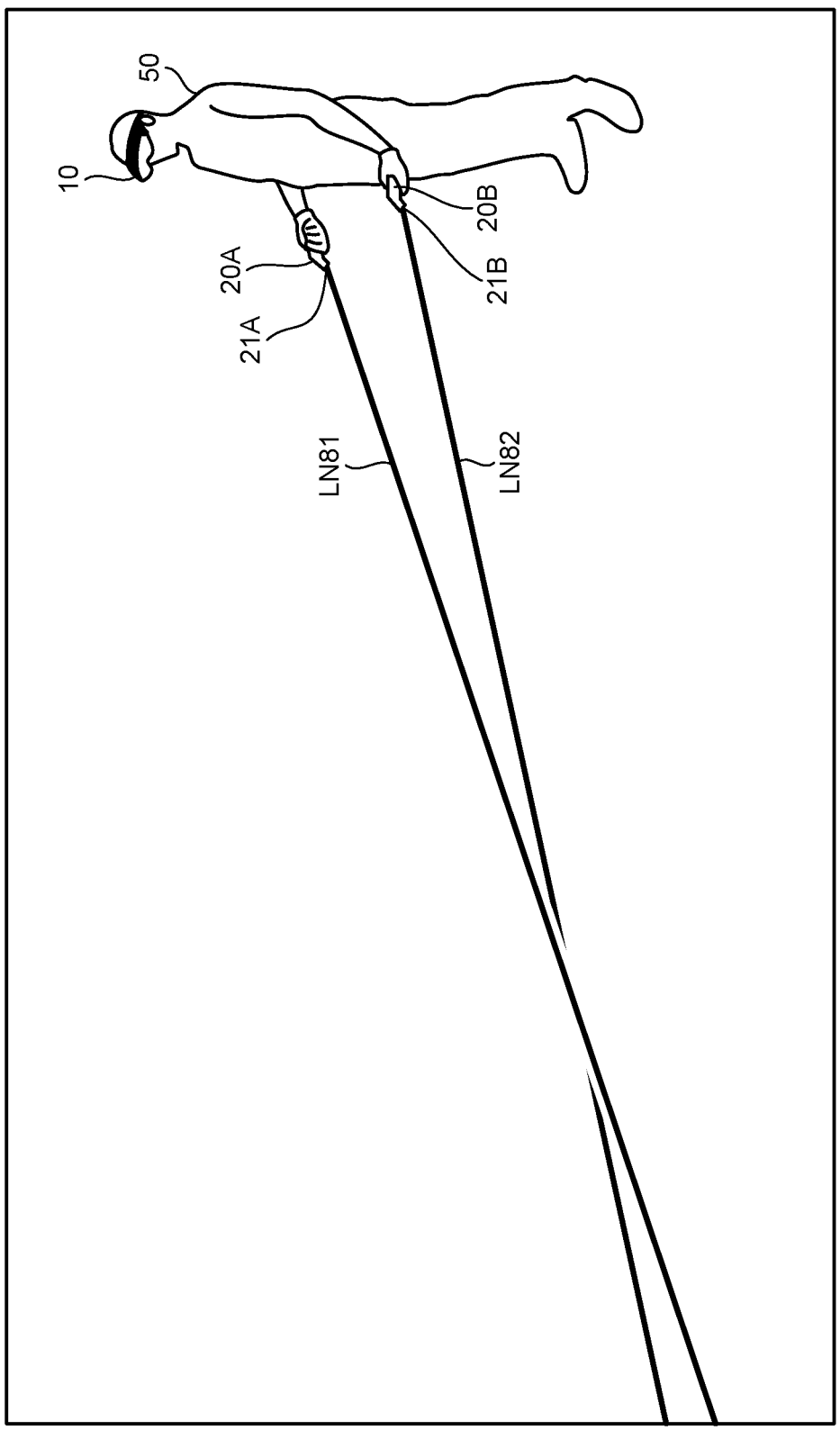
FIG. 28 is a view illustrating an example of another display of the present disclosure.
Figure 29:
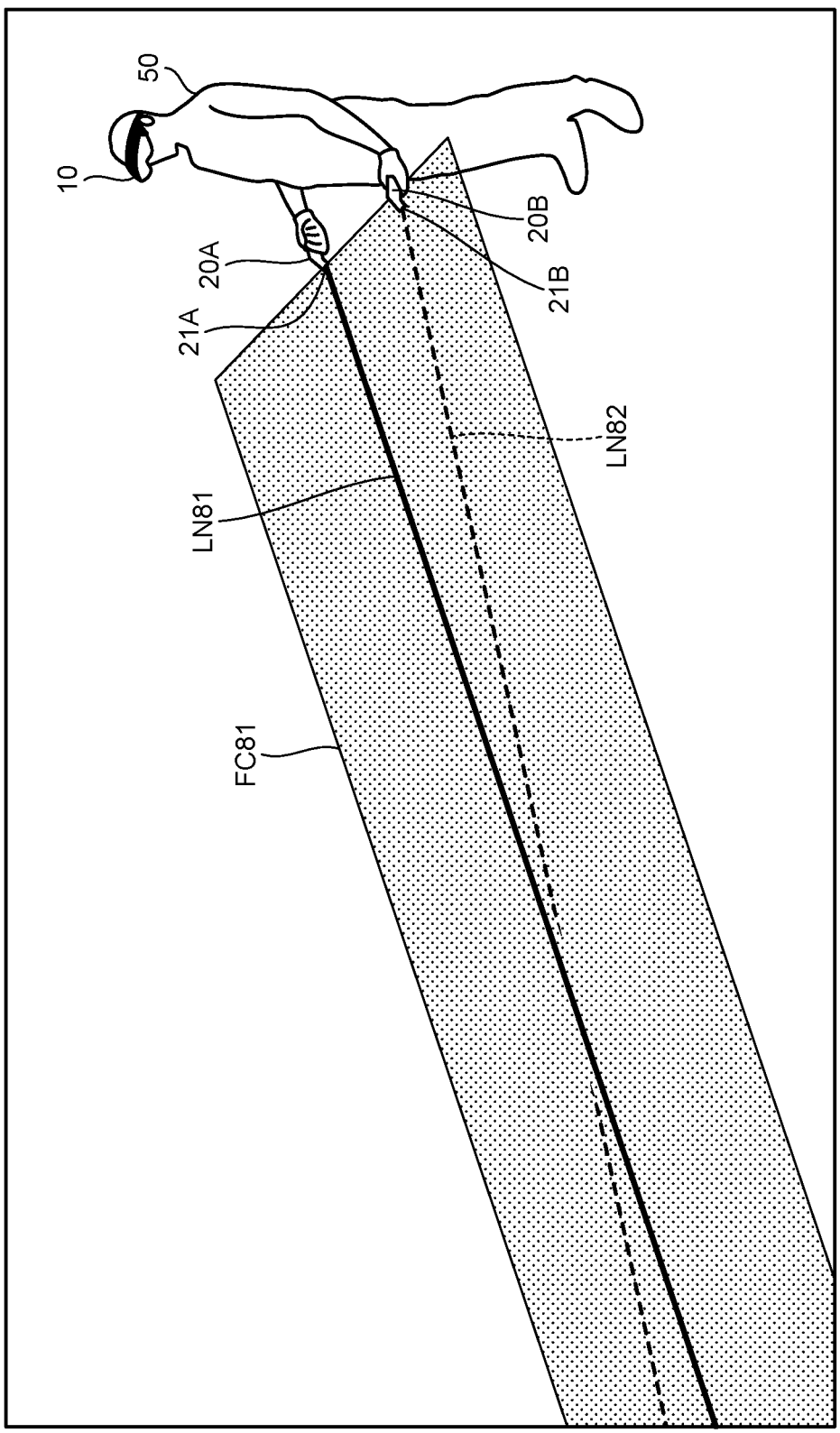
FIG. 29 is a view illustrating an example of another display of the present disclosure.
Figure 30:
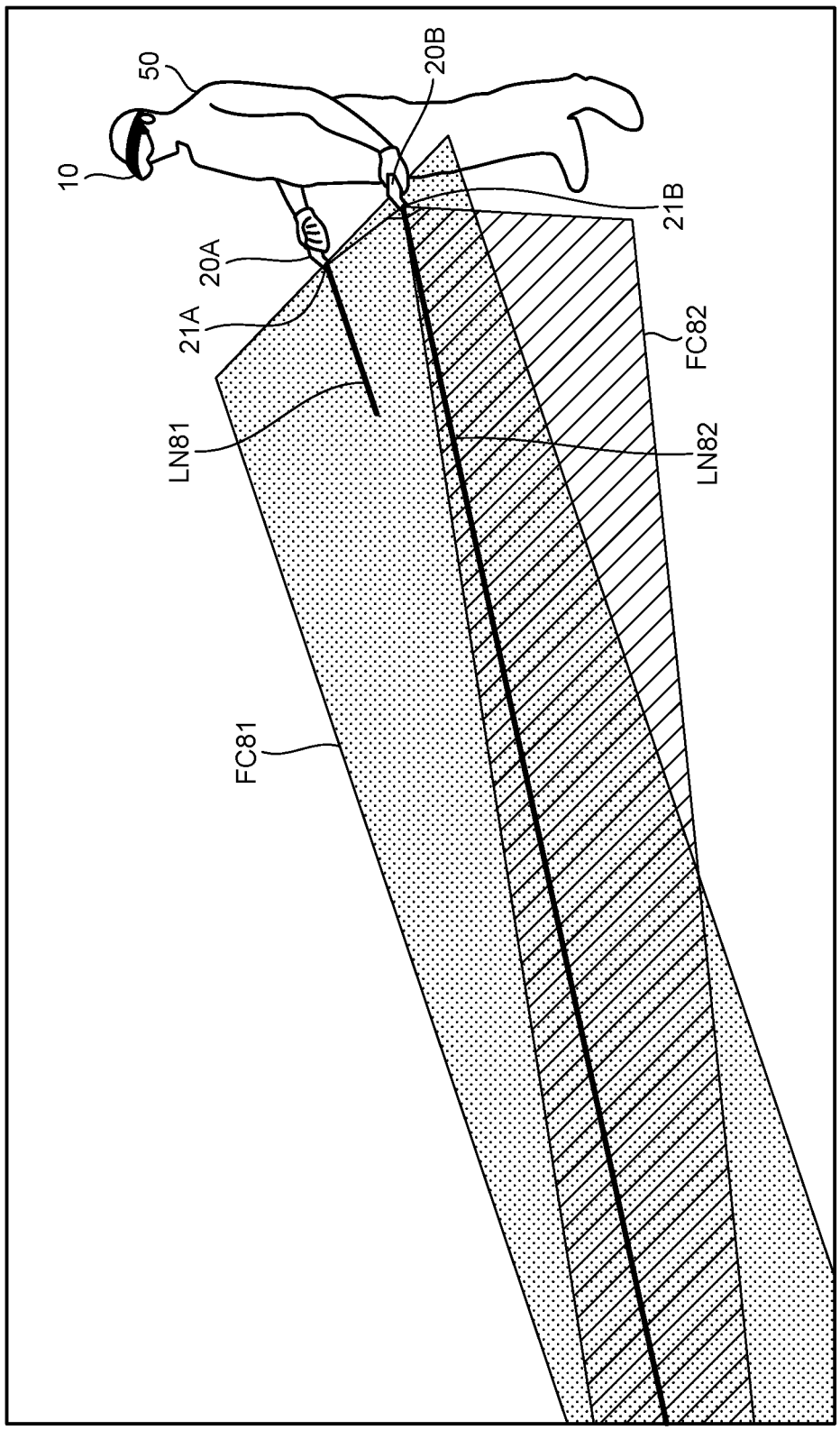
FIG. 30 is a view illustrating an example of another display of the present disclosure.
Figure 31:
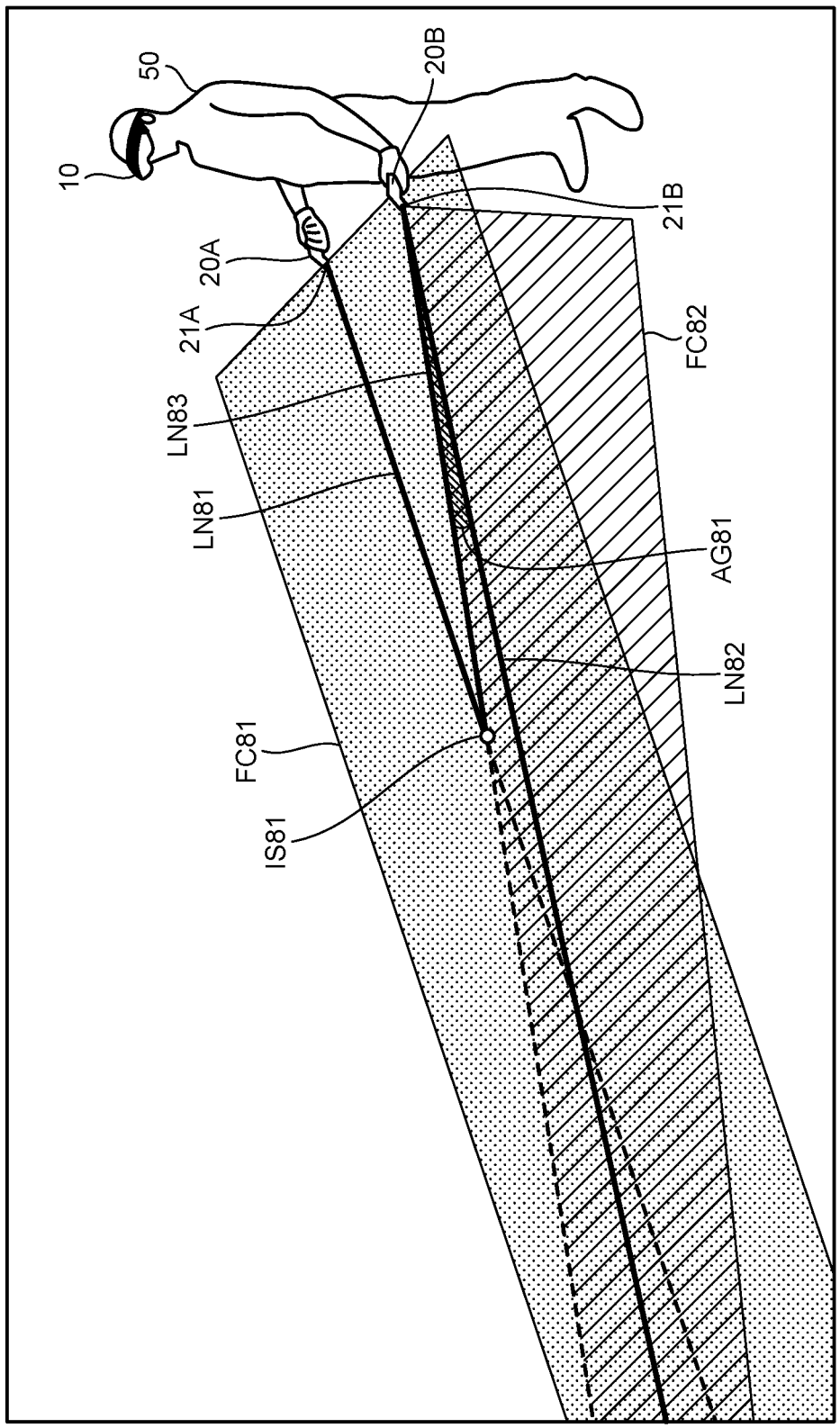
FIG. 31 is a view illustrating an example of another intersection display of the present disclosure.

As described above, the geometric target is not limited to a line, and may be a plane. For example, the information processing apparatus 100 may display an intersection on the basis of a positional relationship of planes that are geometric targets. This point will be described with reference to FIGS. 28 to 31. FIGS. 28 to 30 are diagrams illustrating an example of another display of the present disclosure. FIG. 31 is a view illustrating an example of another intersection display of the present disclosure. Note that descriptions of the same points as those described above will be omitted as appropriate.

FIGS. 28 to 31 illustrate a case where the user 50 holds the first controller 20A as the main instruction component in the right hand as the dominant hand, and holds the second controller 20B as the subordinate instruction component in the left hand. Note that the second controller 20B held by the user 50 in the left hand may be the main instruction component, and the first controller 20A held by the right hand may be the subordinate instruction component. As such, the left hand side of the user 50 may be the main instruction component and the right hand side may be the subordinate instruction component. That is, either the right hand side or the left hand side of the user 50 may be the main instruction component. Furthermore, the instruction component is not limited to the controller 20, and may be any instruction component as long as the instruction component is used by the user to indicate a direction, such as the finger 52 (see FIG. 25). Furthermore, the geometric targets such as the lines LN81 to LN83 and the planes FC81 and FC82 described below are for intersection display, and all of them may not be displayed so as to be visible to the user, but this point will be described later.

As illustrated in FIG. 28, a line extends from each controller 20 along an axis passing through a predetermined position (origin) of the controller 20. Specifically, the line LN81 extends from the first controller 20A along an axis passing through the origin 21A of the first controller 20A. A line LN82 extends from the second controller 20B along an axis passing through the origin 21B of the second controller 20B. For example, the information processing apparatus 100 calculates the line LN81 on the basis of the position and direction of the first controller 20A, and calculates the line LN82 on the basis of the position and direction of the second controller 20B. The information processing apparatus 100 calculates the line LN81 on the basis of the axis of the first controller 20A and the origin 21A, and calculates the line LN82 on the basis of the axis of the second controller 20B and the origin 21B. Hereinafter, the line LN81 extending from the origin 21A of the first controller 20A, which is the main instruction component, is also referred to as a main line, and the line LN82 extending from the origin 21B of the second controller 20B, which is the subordinate instruction component, is also referred to as a sub line.

As illustrated in FIG. 29, a plane including the line LN81 as a main line and the origin 21B of the line LN82 as a sub line is defined as a plane FC81. Hereinafter, the plane FC81 is also referred to as a reference plane. The plane FC81, which is a reference plane, is a plane including the line LN81, which is a main line, and the origin 21B of the line LN82, which is a sub line. In other words, the line LN81 passes through the plane FC81, and the origin 21B is located in the plane FC81. In this manner, the plane FC81 as the reference plane is determined by the line LN81 as the main line and the origin 21B of the line LN82 as the sub line. For example, the information processing apparatus 100 calculates the plane FC81 on the basis of the position of the line LN81 and the position of the origin 21B. The information processing apparatus 100 calculates a plane including the line LN81 as the main line and the origin 21B of the line LN82 as the sub line as the plane FC81.

As illustrated in FIG. 30, a plane in which the plane FC81 serving as the reference plane is perpendicular to the origin 21B of the line LN82 serving as the sub line as the center is defined as a plane FC82. Hereinafter, the plane FC82 is also referred to as an operation plane. As described above, the plane FC82 which is the operation plane is a plane which passes through the origin 21B and is orthogonal to the plane FC81. The line LN82, which is a sub line, moves on the plane FC82. The plane FC82 is provided with the line LN82. In other words, the line LN82 passes through the plane FC82. That is, the plane FC82 is a plane including the origin 21B of the line LN82 and orthogonal to the plane FC81. In this manner, the plane FC82 which is the operation plane is determined by the plane FC81 which is the reference plane, the line LN82 which is the sub line, and the origin 21B. For example, the information processing apparatus 100 calculates the plane FC81 on the basis of the position of the plane FC82, the position of the line LN82, and the position of the origin 21B. The information processing apparatus 100 calculates a plane orthogonal to the plane FC81 as a reference plane and including the line LN82 as a sub line and the origin 21B as the plane FC82.

As illustrated in FIG. 31, a point at which the line LN81 as the main line intersects the plane FC82 as the operation plane is defined as an intersection IS81. The information processing apparatus 100 calculates the intersection IS81 based on the position of the line LN81 and the position of the plane FC82. For example, the information processing apparatus 100 calculates a point at which the line LN81 and the plane FC82 intersect as the intersection IS81.

Further, a line connecting the origin 21B of the line LN82, which is the sub line, and the intersection IS81 is defined as a line LN83. Hereinafter, the line LN83 is also referred to as an operation line. The line LN83, which is the operation line, may be closer to the color of the line LN82, which is the sub line, as the line is farther away. For example, the information processing apparatus 100 may control the display device 10 such that the color of the line LN83 becomes closer to the color of the line LN82 as the sub line and is displayed as the line LN83 is separated from the line LN81.

Note that, among the geometric targets such as the lines LN81 to LN83 and the planes FC81 and FC82 described above, only the line LN81 as the main line and the line LN83 as the operation line may be visible to the user. That is, the information processing apparatus 100 may cause the display device 10 to display the line LN81 as the main line and the line LN83 as the operation line. In this case, the display device 10 displays only the line LN81 that is the main line and the line LN83 that is the operation line among the geometric targets such as the lines LN81 to LN83 and the planes FC81 and FC82.

Furthermore, the information processing apparatus 100 may use the appearance condition of the intersection to cause the intersection to appear (display) in a case where the appearance condition is satisfied. For example, the information processing apparatus 100 may cause an intersection to appear in a case where an angle AG81 that is an opening angle between the line LN82 that is the sub line and the line LN83 that is the operation line is equal to or less than a predetermined threshold. In a case where the angle AG81 of the angle formed by the line LN82 and the line LN83 is equal to or less than a predetermined threshold (for example, 10 degrees, 15 degrees, or the like), the information processing apparatus 100 may cause the intersection IS81 to appear. Furthermore, the information processing apparatus 100 may control the display such that the line is attracted in a case where the appearance condition of the intersection is satisfied. In a case where the appearance condition of the intersection is satisfied, the information processing apparatus 100 may control the display such that the line LN83, which is the operation line, is attracted. For example, in a case where the appearance condition of the intersection is satisfied, the information processing apparatus 100 may control the display of the line LN83 such that the line LN83, which is the operation line, bends at the vicinity of the virtual object and is attracted to the virtual object. Furthermore, the information processing apparatus 100 may forcibly attract the user during the grab. In a case where the information processing apparatus 100 has a virtual object, the information processing apparatus may control the display of the line LN83 such that the line LN83 bends in the vicinity of the virtual object and is attracted to the virtual object.

2. Other Configuration Examples

Note that the above-described system configuration is an example, and the information processing system may have any system configuration as long as the above-described processing can be realized. For example, although the case where the information processing apparatus 100 and the display device 10 are separate bodies has been described, the information processing apparatus 100 and the display device 10 may be integrated.

Among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the document and the drawings can be arbitrarily changed unless otherwise specified. For example, the various information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the above-described embodiments and modifications can be appropriately combined within a range not contradicting processing contents.

Furthermore, the effects described in the present specification are merely examples and are not limited, and other effects may be provided.

3. Effects According to the Present Disclosure

As described above, the information processing apparatus (the information processing apparatus 100 in the embodiment) according to the present disclosure includes the display control unit (the display control unit 134 in the embodiment). The display control unit causes the display device (the display device 10 in the embodiment) to display a mark for a virtual object at an instruction position that is a position determined on the basis of a plurality of directions indicated by the user.

As a result, the information processing apparatus according to the present disclosure can cause the display device to display the mark for the virtual object at the instruction position, which is the position determined on the basis of the plurality of directions indicated by the user, and thus, can enable flexible display according to the instruction of the user. Furthermore, according to the information processing apparatus, since the position is determined in a plurality of directions indicated by the user, an appropriate position according to an instruction of the user can be determined.

Furthermore, the display control unit causes the display device to display a mark at an instruction position determined on the basis of a plurality of geometric targets corresponding to each of a plurality of directions. As a result, the information processing apparatus can cause the display device to display the mark for the virtual object at the instruction position determined on the basis of the plurality of geometric targets such as the line and the plane corresponding to each direction, and thus, it is possible to enable flexible display according to the instruction of the user by the plurality of geometric targets such as the line and the plane.

In addition, the display control unit causes the display device to display a mark at an instruction position determined on the basis of a positional relationship among a plurality of geometric targets. As a result, the information processing apparatus can cause the display device to display the mark for the virtual object at the instruction position determined on the basis of the positional relationship among the plurality of geometric targets, and thus, it is possible to enable flexible display according to the user's instruction based on the positional relationship among the geometric targets.

In addition, the display control unit causes the display device to display a mark at an instruction position determined based on two geometric targets corresponding to each of a plurality of directions which are two directions. As a result, the information processing apparatus can cause the display device to display the mark for the virtual object at the instruction position determined on the basis of the two geometric targets corresponding to each of the plurality of directions that are the two directions. Therefore, flexible display according to the user's instruction in the two directions can be enabled.

In addition, the display control unit causes the display device to display the mark at an instruction position determined based on the first geometric target along the first direction and second geometric target along the second direction among a plurality of directions which are two directions. As a result, the information processing apparatus can cause the display device to display the mark for the virtual object at the instruction position determined on the basis of the first direction and the second direction, so that flexible display according to the user's instruction in two directions can be enabled.

Furthermore, the information processing apparatus according to the present disclosure includes a determination unit (the determination unit 133 in the embodiment). The determination unit determines whether to display the mark based on the positional relationship between the two geometric targets. The display control unit causes the display device to display the mark when the determination unit determines to display the mark. As a result, the information processing apparatus can determine the display of the mark according to the determination result based on the positional relationship between the two geometric targets, and thus, can enable appropriate display according to the positional relationship between the two geometric targets.

In addition, the determination unit determines not to display the mark when a target distance, which is the distance between the two geometric targets, is the first threshold (the threshold D0 in the embodiment) or more. As a result, the information processing apparatus does not display the mark in a case where the distance between the two geometric targets is long, thereby enabling flexible display according to the user's instruction.

In addition, at the time of displaying the mark, the determination unit determines to continue displaying the mark in a case where the target distance is equal to or less than a second threshold (threshold D1 in the embodiment) larger than the first threshold, and determines not to display the mark in a case where the target distance exceeds the second threshold. As a result, in a case where the mark is displayed once, the information processing apparatus can continuously display the mark, can suppress the mark from being hidden or blinking due to a camera shake, an error, or the like of the user, and can enable flexible display according to an instruction of the user.

In addition, the determination unit determines whether to display the mark on the basis of a display distance that is a distance between an instruction component giving an instruction on one of two directions and an instruction position. As a result, the information processing apparatus can appropriately display or hide the mark according to the distance between the user and the instruction position, and can enable flexible display according to the instruction of the user.

When the display distance exceeds a third threshold (threshold Lmax in the embodiment), the determination unit determines not to display the mark. As a result, the information processing apparatus does not display the mark in a case where the instruction position is away from the user, thereby enabling flexible display according to the instruction of the user. For example, the information processing apparatus does not display the mark in a case where the geometric target such as the line becomes parallel or nearly parallel, and the instruction position (intersection) becomes far, for example, infinity, and the like, so that it is possible to suppress the display of the mark k at a position not intended by the user.

In addition, the display control unit causes the display device to display the virtual object at the instruction position based on the relationship between the two geometric targets. As a result, the information processing apparatus can cause the display device to display the virtual object at the instruction position based on the relationship between the two geometric targets, and thus can enable appropriate display of the virtual object according to the instruction of the user.

In addition, the display control unit causes the display device to display a mark at an instruction position determined on the basis of two points determined from each of the two geometric targets. As a result, the information processing apparatus can cause the display device to display the mark at the instruction position based on the two points of the two geometric targets, and thus can display the mark at an appropriate position according to the user's instruction.

In addition, the display control unit causes the display device to display a mark at an instruction position determined on the basis of two points at which a distance between two geometric targets is the closest. As a result, the information processing apparatus can cause the display device to display the mark at the instruction position based on the two points (nearest point) at which the distance between the two geometric targets is the closest, and thus can display the mark at an appropriate position according to the user's instruction.

Further, when the positions of the two points coincide with each other, the display control unit causes the display device to display the mark by using the positions of the two points as instruction positions. As a result, in a case where two geometric targets overlap, the information processing apparatus can cause the display device to display the mark at the position, and thus can display the mark at an appropriate position according to an instruction of the user.

Furthermore, in a case where the positions of the two points are different, the display control unit causes the display device to display a mark by using a position on a line segment connecting the two points as an instruction position. As a result, even in a case where the two geometric targets do not overlap, the information processing apparatus can cause the display device to display the mark at the position on the line segment connecting the two points, so that the mark can be displayed at an appropriate position according to the instruction of the user.

Furthermore, the display control unit causes the display device to display the virtual object at an arrangement position that is a position based on the instruction position. As a result, the information processing apparatus can cause the display device to display the virtual object at the arrangement position based on the instruction position, so that it is possible to appropriately display the virtual object according to the instruction of the user.

In addition, when the instruction position is located between a first distance (threshold Rmin in the embodiment), which is a distance from the instruction component giving an instruction on any of the plurality of directions to the first position, and a second distance (threshold Rmax in the embodiment), which is a distance from the instruction component to the second position farther than the first position, the display control unit causes the display device to display the virtual object with the instruction position as the arrangement position. As a result, in a case where the instruction position is located within the predetermined range, the information processing apparatus can cause the display device to display the virtual object at the position, and thus, can enable appropriate display of the virtual object according to the instruction of the user.

Furthermore, in a case where the instruction position is equal to or less than the first distance, the display control unit causes the display device to display the virtual object with the first position as the arrangement position. As a result, in a case where the instruction position is too close, the information processing apparatus can cause the display device to display the virtual object at a position separated to some extent, and thus, can enable appropriate display of the virtual object according to the instruction of the user.

Furthermore, in a case where the instruction position is the second distance or more, the display control unit causes the display device to display the virtual object with the second position as the arrangement position. As a result, in a case where the instruction position is too far, the information processing apparatus can cause the display device to display the virtual object at a position that is not too far away, and thus, can enable appropriate display of the virtual object according to the instruction of the user.

Furthermore, the display control unit causes the display device to display a mark at an instruction position determined on the basis of a plurality of lines corresponding to each of a plurality of directions. As a result, the information processing apparatus can cause the display device to display the mark for the virtual object at the instruction position determined on the basis of the plurality of lines corresponding to each direction, and thus, it is possible to enable flexible display according to the instruction of the user by the line.

In addition, the display control unit causes the display device to display a mark at an instruction position determined based on a plurality of geometric targets including a plane corresponding to at least one direction among a plurality of directions. As a result, the information processing apparatus can cause the display device to display the mark for the virtual object at the instruction position determined on the basis of the geometric target including the plane, and thus, it is possible to enable flexible display according to the instruction of the user by the geometric target including the plane.

Furthermore, the display control unit causes the display device to display the mark at an instruction position determined on the basis of a plurality of directions including at least one direction on which an instruction is given by the controller held by the user. As a result, the information processing apparatus can cause the display device to display the mark for the virtual object according to the instruction by the controller held by the user, and thus, it is possible to enable flexible display according to the instruction of the user.

Furthermore, the display control unit causes the display device to display a mark at an instruction position determined on the basis of a plurality of directions including at least one direction on which an instruction is given by the body of the user. As a result, the information processing apparatus can cause the display device to display the mark for the virtual object according to the instruction by the body of the user, and thus, it is possible to enable flexible display according to the instruction of the user.

Furthermore, the display control unit causes the display device to display a mark at an instruction position determined on the basis of a plurality of directions including at least one direction on which an instruction is given by the line of sight of the user. As a result, the information processing apparatus can cause the display device to display the mark for the virtual object according to the instruction by the line of sight of the user, and thus, can enable flexible display according to the instruction of the user.

Furthermore, the display control unit causes the display device to display a mark at an instruction position determined on the basis of a plurality of directions including at least one direction on which an instruction is given by the user's finger. As a result, the information processing apparatus can cause the display device to display the mark for the virtual object in accordance with the instruction by the user's finger, and thus, can enable flexible display in accordance with the instruction of the user.

4. Hardware Configuration

Figure 32:
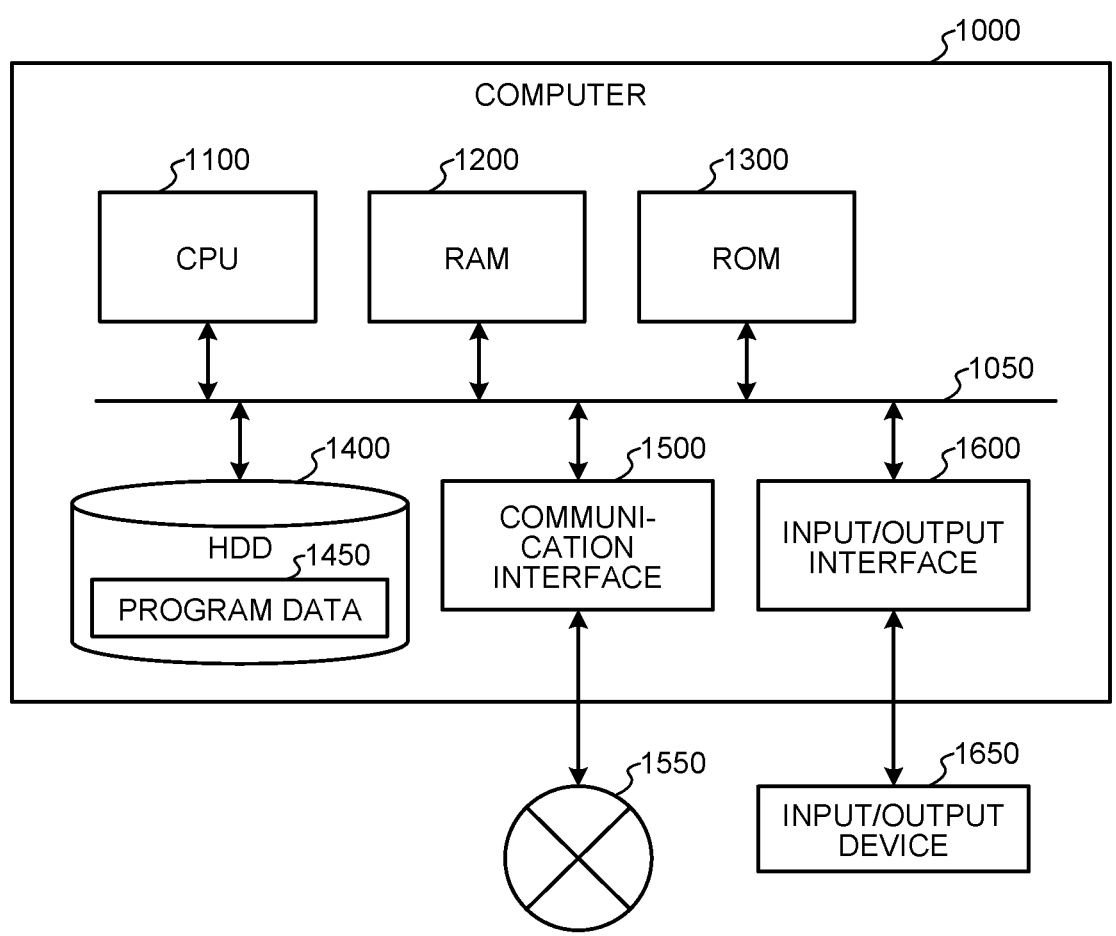
FIG. 32 is a hardware configuration diagram illustrating an example of a computer that realizes an information processing apparatus or implements functions of the information processing apparatus.

The information device such as the information processing apparatus 100 according to each of the above-described embodiments and modifications is realized by, for example, the computer 1000 having a configuration as illustrated in FIG. 32. FIG. 32 is a hardware configuration diagram illustrating an example of the computer 1000 that implements the functions of the information processing apparatus such as the information processing apparatus 100. Hereinafter, the information processing apparatus 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of the program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 100 according to the embodiment, the CPU 1100 of the computer 1000 implements the functions of the control unit 130 and the like by executing the information processing program loaded on the RAM 1200. In addition, the HDD 1400 stores an information processing program according to the present disclosure and data in the storage unit 120. Note that the CPU 1100 reads the program data 1450 from the HDD 1400 and executes the program data, but as another example, these programs may be acquired from another device via the external network 1550.

Note that the present technology can also have the following configurations.

(1)
An information processing apparatus comprising a display control unit that causes a display device to display a mark for a virtual object at an instruction position that is a position determined based on a plurality of directions indicated by a user.

(2)
The information processing apparatus recited in (1), wherein
the display control unit causes the display device to display the mark at the instruction position determined based on a plurality of geometric targets corresponding to each of the plurality of directions.

(3)
The information processing apparatus recited in (2), wherein
the display control unit causes the display device to display the mark at the instruction position determined based on a positional relationship among the plurality of geometric targets.

(4)
The information processing apparatus recited in (2) or (3), wherein
the display control unit causes the display device to display the mark at the instruction position determined based on two geometric targets corresponding to each of the plurality of directions which are two directions.

(5)
The information processing apparatus recited in (4), wherein
the display control unit causes the display device to display the mark at the instruction position determined based on a first geometric target along a first direction and a second geometric target along a second direction among the plurality of directions which are two directions.

(6)
The information processing apparatus recited in (4) or (5), further comprising a determination unit that determines whether to display the mark based on a positional relationship between the two geometric targets,
wherein the display control unit causes the display device to display the mark when the determination unit determines to display the mark.

(7)
The information processing apparatus recited in (6), wherein
the determination unit determines to display the mark when a target distance, which is a distance between the two geometric targets, is less than a first threshold.

(8)
The information processing apparatus recited in (7), wherein
when the mark is displayed, in a case where the target distance is equal to or less than a second threshold larger than the first threshold, the determination unit determines to continue displaying the mark, and in a case where the target distance exceeds the second threshold, determines not to display the mark.

(9)

The information processing apparatus recited in any one of (6) to (8), wherein
the determination unit determines whether to display the mark based on a display distance that is a distance between an instruction component giving an instruction on one of the two directions and the instruction position.

(10)

The information processing apparatus recited in (9), wherein
the determination unit determines not to display the mark when the display distance exceeds a third threshold.

(11)

The information processing apparatus recited in any one of (4) to (10), wherein
the display control unit causes the display device to display the virtual object at the instruction position based on a relationship between the two geometric targets.

(12)

The information processing apparatus recited in any one of (4) to (11), wherein
the display control unit causes the display device to display the mark at the instruction position determined based on two points determined from each of the two geometric targets.

(13)

The information processing apparatus recited in (12), wherein
the display control unit causes the display device to display the mark at the instruction position determined based on the two points at which a distance between the two geometric targets is closest.

(14)

The information processing apparatus recited in (12) or (13), wherein
the display control unit causes the display device to display the mark with the positions of the two points as the instruction position when the positions of the two points coincide with each other.

(15)

The information processing apparatus recited in (12) or (13), wherein
the display control unit causes the display device to display the mark by using a position on a line segment connecting the two points as the instruction position when positions of the two points are different.

(16)

The information processing apparatus recited in any one of (1) to (15), wherein
the display control unit causes the display device to display the virtual object at an arrangement position that is a position based on the instruction position.

(17)

The information processing apparatus recited in (16), wherein
when the instruction position is located between a first distance that is a distance from an instruction component giving an instruction on one of the plurality of directions to a first position and a second distance that is a distance from the instruction component to a second position farther than the first position, the display control unit causes the display device to display the virtual object with the instruction position as the arrangement position.

(18)

The information processing apparatus recited in (17), wherein
the display control unit causes the display device to display the virtual object with the first position as the arrangement position in a case where the instruction position is the first distance or less.

(19)

The information processing apparatus recited in (17) or (18), wherein
the display control unit causes the display device to display the virtual object with the second position as the arrangement position in a case where the instruction position is the second distance or more.

(20)

The information processing apparatus recited in any one of (1) to (19), wherein
the display control unit causes the display device to display the mark at the instruction position determined based on a plurality of lines corresponding to each of the plurality of directions.

(21)

The information processing apparatus recited in any one of (1) to (19), wherein
the display control unit causes the display device to display the mark at the instruction position determined based on a plurality of geometric targets including a plane corresponding to at least one direction among the plurality of directions.

(22)

The information processing apparatus recited in (20), wherein
the display control unit causes the display device to display the mark at the instruction position determined based on a line along a first direction and a plane along a second direction among two directions.

(23)

The information processing apparatus recited in any one of (1) to (22), wherein
the display control unit causes the display device to display the mark at the instruction position determined based on the plurality of directions including at least one direction on which an instruction is given by a controller held by the user.

(24)

The information processing apparatus recited in any one of (1) to (23), wherein
the display control unit causes the display device to display the mark at the instruction position determined based on the plurality of directions including at least one direction on which an instruction is given by a body of the user.

(25)

The information processing apparatus recited in (24), wherein
the display control unit causes the display device to display the mark at the instruction position determined based on the plurality of directions including at least one direction on which an instruction is given by a line of sight of the user.

(26)

The information processing apparatus recited in (24), wherein
the display control unit causes the display device to display the mark at the instruction position determined based on the plurality of directions including at least one direction on which an instruction is given by a finger of the user.

(27)

An information processing method in which a computer executes processing of:
  causing a display device to display a mark for a virtual object at an instruction position that is a position determined based on a plurality of directions indicated by a user.

(28)

An information processing program causing a computer to execute processing of:
  causing a display device to display a mark for a virtual object at an instruction position that is a position determined based on a plurality of directions indicated by a user.

REFERENCE SIGNS LIST

1 INFORMATION PROCESSING SYSTEM
100 INFORMATION PROCESSING APPARATUS
110 COMMUNICATION UNIT
120 STORAGE UNIT
121 INTERSECTION-RELATED THRESHOLD INFORMATION STORAGE UNIT
122 OBJECT-RELATED THRESHOLD INFORMATION STORAGE UNIT
123 DIRECTION INSTRUCTION INFORMATION STORAGE UNIT
124 INTERSECTION DISPLAYING INFORMATION STORAGE UNIT
125 OBJECT INFORMATION STORAGE UNIT
130 CONTROL UNIT
131 ACQUISITION UNIT
132 INTERSECTION CALCULATION UNIT
133 DETERMINATION UNIT
134 DISPLAY CONTROL UNIT
135 TRANSMISSION UNIT
10 DISPLAY DEVICE (HEAD MOUNTED DISPLAY)
20A FIRST CONTROLLER (INSTRUCTION COMPONENT)
20B SECOND CONTROLLER (INSTRUCTION COMPONENT)
LN1 LINE (GEOMETRIC TARGET)
LN2 LINE (GEOMETRIC TARGET)

The invention claimed is:

1. An information processing apparatus, comprising:
a Central Processing Unit (CPU) configured to:
cause a display device to display a mark for a virtual object at an instruction position, wherein
  the instruction position corresponds to a position determined based on a plurality of directions indicated by a user,
  the virtual object is associated with a real object, and
  the mark is displayed, by the display device, at the instruction position determined based on two geometric targets, of a plurality of geometric targets, corresponding to each of the plurality of directions which are two directions; and
determine whether to display the mark based on a positional relationship between the two geometric targets, wherein
  the mark is displayed by the display device when the CPU determines to display the mark.

2. The information processing apparatus according to claim 1, wherein
the CPU is further configured to cause the display device to display the mark at the instruction position determined based on a first geometric target along a first direction and a second geometric target along a second direction among the plurality of directions which are two directions, and
the two geometric targets include the first geometric target and the second geometric target.

3. The information processing apparatus according to claim 1, wherein the CPU is further configured to determine to display the mark when a target distance, which is a distance between the two geometric targets, is less than a first threshold.

4. The information processing apparatus according to claim 3, wherein
when the mark is displayed, in a case where the target distance is equal to or less than a second threshold larger than the first threshold, the CPU is further configured to determine to continue the display of the mark, and
when the mark is displayed, in a case where the target distance exceeds the second threshold, the CPU is further configured to determine not to display the mark.

5. The information processing apparatus according to claim 1, wherein the CPU is further configured to determine whether to display the mark based on a display distance that is a distance between an instruction component giving an instruction on one of the two directions and the instruction position.

6. The information processing apparatus according to claim 5, wherein the CPU is further configured to determine not to display the mark when the display distance exceeds a third threshold.

7. The information processing apparatus according to claim 1, wherein the CPU is further configured to cause the display device to display the virtual object at the instruction position based on a relationship between the two geometric targets.

8. The information processing apparatus according to claim 1, wherein the CPU is further configured to cause the display device to display the mark at the instruction position determined based on two points determined from each of the two geometric targets.

9. The information processing apparatus according to claim 8, wherein the CPU is further configured to cause the display device to display the mark at the instruction position determined based on the two points at which a distance between the two geometric targets is closest.

10. The information processing apparatus according to claim 8, wherein the CPU is further configured to cause the display device to display the mark with positions of the two points as the instruction position when the positions of the two points coincide with each other.

11. The information processing apparatus according to claim 8, wherein the CPU is further configured to cause the display device to display the mark by using a position on a line segment connecting the two points as the instruction position when positions of the two points are different.

12. The information processing apparatus according to claim 1, wherein the CPU is further configured to cause the display device to display the virtual object at an arrangement position that is a position based on the instruction position.

13. The information processing apparatus according to claim 1, wherein the CPU is further configured to cause the display device to display the mark at the instruction position determined based on a plurality of lines corresponding to each of the plurality of directions.

14. The information processing apparatus according to claim 1, wherein the CPU is configured to cause the display device to display the mark at the instruction position determined based on the plurality of geometric targets including a plane corresponding to at least one direction among the plurality of directions.

15. An information processing method, comprising:
    causing, by a Central Processing Unit (CPU), a display device to display a mark for a virtual object at an instruction position, wherein
        the instruction position corresponds to a position determined based on a plurality of directions indicated by a user,
        the virtual object is associated with a real object,
        the mark is displayed, by the display device, at the instruction position determined based on two geometric targets, of a plurality of geometric targets, corresponding to each of the plurality of directions which are two directions; and
    determining, the CPU, whether to display the mark based on a positional relationship between the two geometric targets, wherein
        the mark is displayed by the display device when the CPU determines to display the mark.

16. A non-transitory computer-readable medium having stored thereon computer-executable instructions which, when executed by a Central Processing Unit (CPU) of a computer, cause the computer to execute operations, the operations comprising:
    causing, by the CPU, a display device to display a mark for a virtual object at an instruction position, wherein
        the instruction position corresponds to a position determined based on a plurality of directions indicated by a user,
        the virtual object is associated with a real object, and
        the mark is displayed, by the display device, at the instruction position determined based on two geometric targets, of a plurality of geometric targets, corresponding to each of the plurality of directions which are two directions; and
    determining, by the CPU, whether to display the mark based on a positional relationship between the two geometric targets, wherein
        the mark is displayed by the display device when the CPU determines to display the mark.

* * * * *